(12) United States Patent
Nakazawa et al.

(10) Patent No.: US 7,116,907 B1
(45) Date of Patent: Oct. 3, 2006

(54) ACOUSTO-OPTICAL TUNABLE FILTERS CASCADED TOGETHER

(75) Inventors: Tadao Nakazawa, Kawasaki (JP); Hiroshi Onaka, Kawasaki (JP); Minoru Seino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 09/248,103

(22) Filed: Feb. 11, 1999

(30) Foreign Application Priority Data

Feb. 20, 1998 (JP) ............................. 10-038908

(51) Int. Cl.
  *H04B 10/00* (2006.01)
(52) U.S. Cl. ........................................ 398/85
(58) Field of Classification Search ............... 359/124, 359/138, 145, 117; 310/313 R; 333/193
See application file for complete search history.

(56) References Cited

U.S. PATENT DOCUMENTS

| | | | | |
|---|---|---|---|---|
| 3,755,761 A | * | 8/1973 | Hartmann | 310/313 C |
| 4,200,849 A | * | 4/1980 | Malocha | 310/313 R |
| 4,395,702 A | * | 7/1983 | Gottlieb et al. | 341/111 |
| 4,602,183 A | * | 7/1986 | Okamoto et al. | 310/313 B |
| 4,602,228 A | * | 7/1986 | Yamada | 310/313 D |
| 4,906,064 A | * | 3/1990 | Cheung | 385/16 |
| 5,276,543 A | | 1/1994 | Olshansky | |
| 5,420,448 A | * | 5/1995 | Hunsinger et al. | 257/241 |
| 5,444,528 A | | 8/1995 | Puschell | |
| 5,718,226 A | | 2/1998 | Riza | |
| 5,994,980 A | * | 11/1999 | Tada | 310/313 R |
| 6,031,852 A | * | 2/2000 | Thompson et al. | 372/20 |

FOREIGN PATENT DOCUMENTS

WO  WO 97/10658  3/1997
WO  WO 98/04954  2/1998

OTHER PUBLICATIONS

Gaudino, Robert, "A Novel AOTF-Based Multichannel Add-Drop Node and its Cascadability in WDM Ring Networks" IEEE , Sep. 1997, pp. 77-80.*
T. Nakazawa et al., "Development of Lithium-Niobate Tunable Filters", *IEICE, OPE96-123*, Dec. 1996, pp. 79-84. (Translation of Abstract only).
Hosoi et al., "Polarization Independent Tunable Filter Using a Straightly Focused Acoustic Beam on X-cut Y-propagating $LiNbO_3$", *Technical Report of IEICE, OPE97-8*, May 1997, pp. 41-46. (Translation of Abstract only).
Fukutoku, et al., "Optical Beat-Induced Crosstalk of an Acousto-Optic Tunable Filter for WDM Network Application", *Technical Report of IEICE, OCS94-38*, pp. 39-45. (Translation of Abstract only).
F. Tian, et al., "Interchannel Interference in Multiwavelength Operation of Integrated Acousto-Optical Filters and Switches", *Journal of Lightwave Technology*, Jun. 1995, vol. 13, No. 6, pp. 1146-1154.

(Continued)

*Primary Examiner*—Agustin Bello
(74) *Attorney, Agent, or Firm*—Staas & Halsey LLP

(57) ABSTRACT

A configuration of acousto-optical tunable filters (AOTF) having stable output characteristics so that the output does not significantly vary with time. The configuration includes a plurality of AOTFs cascaded together. Each AOTF generates a surface acoustic wave in an optical waveguide in accordance with RF signals applied to the AOTF. A phase of a beat generated by the RF signals applied to one of the plurality of AOTFs is different from a phase of a beat generated by the RF signals applied to a different AOTF of the plurality of AOTFs.

89 Claims, 59 Drawing Sheets

OTHER PUBLICATIONS

Perrier, et al., "Rack-mounted optical Add/Drop Multiplexers in a Self-Healing Multiwavelength Ring Network Demonstrator", *PThA4, Photonics in Switching*, Sendai, Apr. 1996.

K. Nakaya et al., "LiNbO$_3$ Acousto-optic tunable filter module with temperature control function", *The 1997 IEICE Spring Conference*, 1997, p. 370. (Complete Translation provided).

M. Misono, et al., "Wavelength Switching and Stabilization of Acousto-Optic Tunable Filter", *The 1995 IEICE Spring Conference*, 1995, p. 539. (Complete Translation provided).

M. Sakauchi, et al., "Multi-channel optical wavelength controller utilizing AO filter for WDM transmission", *The 1996 IEICE Fall Conference, Communication Society*, 1996, p. 576. (Complete Translation provided).

T. Yoshida et al., "Control of Optical Output Level of WDM Optical Fiber Amplifier", *The 1996 IEICE Fall Conference, Communication Society*, 1996, p. 581. (Complete Translation provided).

T. Hosoi et al., "Wide Tunable Range and Low Sidelobe Level of Double-stage Polarization Independent Acousto-optic Tunable Fitler", *The 1996 IEICE Spring Conference*, 1996, p. 254. (Complete Translation provided).

W. Kawakami et al., "A field experiment of WDM HUB node employing simple ADM configuration with 2R regenerators", *The 1997 IEICE Spring Conference*, 1997, p. 738. (Complete Translation provided).

K. Asahi et al., "WDM four fiber ring experiment", *The 1997 IEICE Spring Conference*, 1997, p. 739. (Complete Translation provided).

T. Sasaki et al., "8 Channel 2.4Gb/s Narrow Band-WDM Transmission Experiment with ADM In-line Amplifier over 600km fibers", *The 1997 IEICE Spring Conference*, 1997, p. 740. (Complete Translation provided).

S. Yamaguchi, et al., "Control of Add signal level for Optical ADM" *The 1997 IEICE Spring Conference*. 1997, p. 742. (Complete Translation provided).

D. Uehara, et al., "Optical add/drop multiplexer using wavelength selectable optical transmitter", *The 1997 IEICE Spring Conference*, 1997, p. 741. (Complete Translation provided).

N. Nagatsu, et al., "WDM ring architectures and networking capability", *The 1997 IEICE Fall Conference, Communication Society*, 1997, p. 382. (Complete Translation provided).

D. Uehara, "Highly Reliable and Economical WDM Ring with Optical Self-Healing and 1:N Wavelength Protection", *The 1997 IEICE Fall Conference, Communication Society*, p. 383. (Complete Translation provided).

K. Shimano, et al., Node configuration on OADM ring system, *The 1997 IEICE Fall Conference, Communication Society*, 1997, p. 384. (Complete Translation provided).

H. Takeshita, et al., "A Development of Optical Network Ssytem (1)—A Study on Alarm Monitoring and Transferring Scheme for Self-Healing Optical Path Network", *The 1997 IEICE Fall Conference, Communication Society*, 1997, p. 393. (Complete Translation provided).

H. Obara, et al., "Transmission over a 200-km single-fiber bidirectional ring network with reconfigurable WDM add/drop repeaters", *The 1997 IEICE Fall Conference, Communication Society*, 1997, p. 401. (Complete Translation provided).

M. Shigematsu, et al., "Analog Transmission Characteristics of Fiber-Bragg-Grating-Based Optical Taps", *The 1997 IEICE Fall Conference, Communication Society*, 1997, p. 365. (Complete Translation provided).

M. Yamashita, et al., "An Optical Signal Monitor Circuit for WDM Network", *The 1997 IEICE Fall Conference, Communication Society*, 1997, p. 357. (Complete Translation provided).

Chang et al., "Multiwavelength Reconfigurable WDM/ATM/SONET Network Testbed", *Journal of Lightwave Technology*, Vo. 14, No. 6, Jun. 1996, pp. 1320-1340.

Shibata, "Position of high-density wavelength multiplexing optical communication", *Special edition: Technology related to high-density wavelength division multiplexing optical communication, O plus E*, Oct. 1997, No. 215, pp. 88-89. (Complete Translation provided).

K. Sato et al., "Photonic network and wavelength multiplexing technology", *Special edition: Technology related to high-density wavelength division multiplexing optical communication, O plus E*, Oct. 1997, No. 215, pp. 90-99. (Complete Translation provided).

M. Saruwatari, "Wavelength multiplexing system technology aiming at a large capacity and a long distance", *Special edition: Technology related to high-density wavelength division multiplexing optical communication, O plus E*, Oct. 1997, No. 215, pp. 100-108. (Complete Translation provided).

M. Suzuki, "Optical soliton and wavelength multiplexing", *Special edition: Technology related to high-density wavelength division multiplexing optical communication, O plus E*, Oct. 1997, No. 215, pp. 109-120. (Complete Translation provided).

Y. Inoue, "Optical fiber non-linear property and wavelength mulitplexing process", *Special edition: Technology related to high-density wavelength division multiplexing optical communication, O plus E*, Oct. 1997, No. 215, pp. 121-127. (Complete Translation provided).

K. Tsujimura, "Apparatus configuration of wavelength-multiplexing optical communication system", *Special edition: Technology related to high-density wavelength division multiplexing optical communication, O plus E*, Oct. 1997, No. 215, pp. 128-135. (Complete Translation provided).

K. Oguchi, "Standaridization Trend on Optical Networking", *Special edition: Technology related to high-density wavelength division multiplexing optical communication (2), O plus E*, No. 216, pp. 109-118. (Complete Translation provided).

K. Okamoto, "Optical Multiplexing and Demultiplexing Components for Wavelength Multiplexing", *Special edition: Technology related to high-density wavelength division multiplexing optical communication (2), O plus E*, No. 216, pp. 119-126. (Complete Translation provided).

S. Sudo, "Optical Amplifiers for Wavelength Multiplexing", *Special edition: Technology related to high-density wavelength division multiplexing optical communication (2), O plus E*, No. 216, pp. 127-134. (Complete Translation provided).

Y. Yoshikuni, "Optical Semiconductor Components", *Special edition: Technology related to high-density wavelength division multiplexing optical communication (2), O plus E*, No. 216, pp. 135-142. (Complete Translation provided).

M. Nishimura, "Optical Fiber for Wavelength Division Multiplexing", *Special edition: Technology related to high-density wavelength division multiplexing optical communication (2), O plus E*, No. 216, pp. 143-148. (Complete Translation provided).

Smith et al. "Integrated-Optic Acoustically-Tunable Filters for WDM Networks" IEEE Journal on Selected Areas in Communications, vol. 8, No. 6, Aug. 1990, pp. 1151-1159.

Tian et al. "Interchannel Interference in Multiwavelength Operation of Integrated Acousto-Optical Filters and Switches" Journal of Lightwave Technology, vol. 13, No. 6, Jun. 1995, pp. 1146-1154.

Yun et al. "All-fiber acousto-optic tunable filter" OFC '95 Technical Digest, Wednesday Afternoon, WP16, 5:00 pm, pp. 186-187.

Kim et al. "Single-mode-fiber acousto-optic tunable notch filter with variable spectral profile" Korea Advanced Institute of Science and Technology, PD7-1 to PD7-4.

Hwang et al. "All-fiber-optic nonreciprocal modulator" Optics Letters, vol. 22, No. 8, Apr. 15, 1997, pp. 507-509.

Östling et al. "Narrow-band acousto-optic tunable filtering in a two-mode fiber" Optics Letters, vol. 20, No. 11, Jun. 1, 1995, pp. 1247-1249.

U.S. Appl. No. 09/080,399, filed May 18, 1998, Hiroshi Onaka et al., Fujitsu Limited.

* cited by examiner

FIG. 15

|  | f1 | f3 |
|---|---|---|
| AOTF1 | 0° | 0° |
| AOTF2<br>AOTF3 | 0° | 180°<br>(122-2) |

FIG. 24

|  | f1 | f2 | f3 | f4 |
|---|---|---|---|---|
| AOTF1 | 0° (P11) | 0° (P12) | 0° (P13) | 0° (P14) |
| AOTF2 AOTF3 | 0° (P24) | 180° (P23) | 0° (P22) | 180° (P21) |

FIG. 30

|  | f1 | f2 | f3 | f4 | f5 | f6 |
|---|---|---|---|---|---|---|
| AOTF1 | 0° | 0° | 0° | 0° | 0° | 0° |
| AOTF2 AOTF3 | 0° | 180° | 0° | 180° | 0° | 180° |

FIG. 34

|  | f1 | f2 |
|---|---|---|
| AOTF1 | 0° (P11) | 0° (P12) |
| AOTF2 AOTF3 | 0° (P21) | 120° (P22) |
| AOTF4 AOTF5 | 0° (P34) | 240° (P33) |

FIG. 41

|  | f1 | f2 | f3 | f4 |
|---|---|---|---|---|
| AOTF1 | 0° (P11) | 0° (P12) | 0° (P13) | 0° (P14) |
| AOTF2 AOTF3 | 0° (P21) | 120° (P22) | 240° (P23) | 0° (P24) |
| AOTF4 AOTF5 | 0° (P31) | 240° (P33) | 120° (P32) | 0° (P31) |

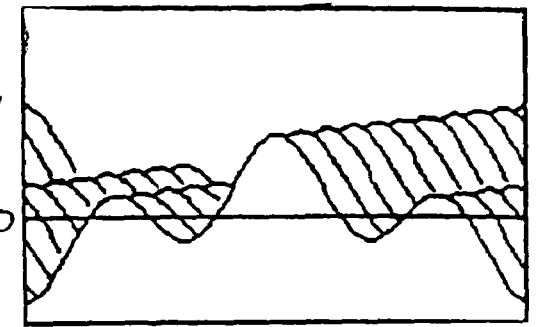
FIG. 42(A) Intensity of beat (a.u.) — Propagation direction
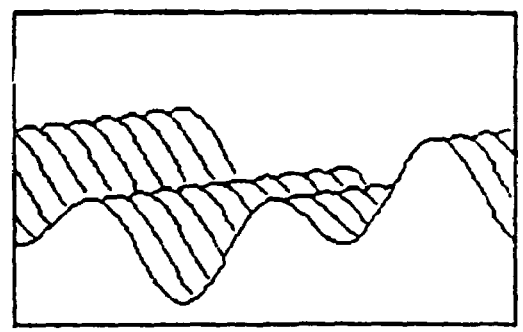
FIG. 42(B) Intensity of beat (a.u.) — Propagation direction
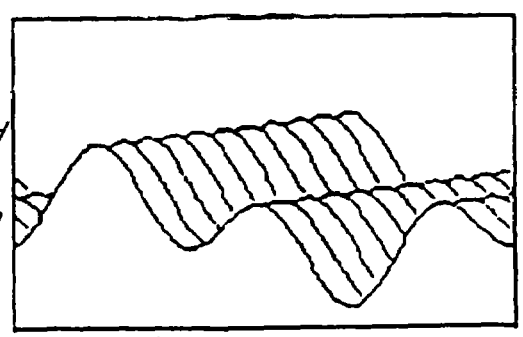
FIG. 42(C) Intensity of beat (a.u.) — Propagation direction

FIG. 47

|  | f1 | f2 | f3 | f4 | f5 | f6 | f7 |
|---|---|---|---|---|---|---|---|
| AOTF1 | 0° | 0° | 0° | 0° | 0° | 0° | 0° |
| AOTF2 AOTF3 | 0° | 120° | 240° | 0° | 120° | 240° | 0° |
| AOTF4 AOTF5 | 0° | 240° | 120° | 0° | 240° | 120° | 0° |

ACOUSTO-OPTICAL TUNABLE FILTERS CASCADED TOGETHER

CROSS-REFERENCE TO RELATED APPLICATIONS

This application is based on, and claims priority to, Japanese application 10-038908, filed Feb. 20, 1998, in Japan, and which is incorporated herein by reference.

BACKGROUND OF THE INVENTION

1. Field of the Invention

The present invention relates to acousto-optical tunable filters cascaded together. More specifically, the present invention relates to acousto-optical tunable filters cascaded together and controlled by RF signals generating beats with different phases.

2. Description of the Related Art

Optical communication systems using fiber optical transmission lines are being used to transmit relatively large amounts of information. However, as users require larger amounts of information to be rapidly transmitted, and as more users are connected to the systems, a further increase in the transmission capacity of optical communication systems is required.

Therefore, there is a continual effort in increase transmission capacity of optical communication systems. For example, through improvements in the modulation rate, optical communication systems with modulation rates in the giga-order bits per second (Gb/s) rate are now in practical use. However, optical communication systems having a transmission capacity of tera-order bits per second (Tb/s) may be required for an optical communication system to handle future demands, such as those imposed by the transmission of images. Improvements in the modulation rate will not, by itself, be enough to handle these future demands.

Therefore, wavelength division multiplexing (WDM) is becoming an indispensable technique for increasing the transmission capacity of optical communication systems. With WDM, a plurality of wavelengths (or "channels"), each carrying information, are multiplexed together and transmitted through a single optical fiber as a WDM signal. This transmitted WDM signal is then received and demultiplexed back into individual wavelengths, so that the information can be obtained from the individual wavelengths. In this manner, a plurality of wavelengths are transmitted through a single optical fiber. This can be contrasted to conventional approaches where a single wavelength is transmitted through a single optical fiber.

Some WDM optical communication systems require wavelength multiplexing such that a few wavelengths to about one-hundred (100) wavelengths are multiplexed together over a wide band. Also, some WDM optical communication systems require wavelength intervals as wide as 1 nm to tens of nm.

Acousto-optical tunable filters (AOTF) are a type of optical wavelength filter that is becoming indispensable in WDM optical communications systems. With an AOTF, wavelength characteristics of the filter can be controlled by changing an RF signal applied to the AOTF, to thereby provide a selectively tunable wavelength filter. AOTFs will be very useful in optical components such as optical add/drop multiplexers (ADM), optical cross-connects, and optical switches.

For example, FIG. 1 is a diagram illustrating an optical ADM node. Referring now to FIG. 1, an optical ADM node 100 receives a light 102 which includes optical wavelength-multiplexed signals of wavelength 1 to wavelength 8. The wavelength-multiplexed light 102 is input to a separator 104 in optical ADM node 100.

Separator 104 separates wavelength 1 to wavelength 4 from wavelength-multiplexed light 102 and permits wavelength 5 to wavelength 8 to pass therethrough.

The lights passing through separator 104 are input to a coupler 106. Coupler 106 couples lights having wavelengths 1' to 4' with the lights of 5 to 8, and outputs a wavelength-multiplexed light 108 via an output node.

An acousto-optical tunable filter (AOTF) can be used as separator 104 or coupler 108 to arbitrarily change the wavelengths to be separated or coupled, and to arbitrarily change the number of wavelengths to be separated or coupled. As a result, it is easy to modify the system configuration by external control.

FIG. 2 is a diagram illustrating a polarization-independent type AOTF, which is one type of AOTF. With this type of AOTF, the main axis of the refractive index of a waveguide is rotated in response to light of the wavelength corresponding to the frequency of a surface acoustic wave (SAW). Hence, a rotation of the polarization of the propagating light makes it possible to extract or modulate a particular wavelength.

Referring now to FIG. 2, optical waveguides 11 and 12 are formed on a LiNbO3 X-cut substrate by diffusing Ti therein. A transducer 15 that generates a SAW corresponding to an RF signal (radio frequency signal that is an electromagnetic wave equal to or lower than 3000 GHz) is formed on optical waveguides 11 and 12.

In order to extract wavelengths 1 to 4, RF signals with four frequencies corresponding to the coupled wavelengths 1 to 4 are applied to transducer 15.

An input light 1 having the wavelengths 1 to 8 is applied to a waveguide type polarization beam splitter (waveguide type PBS) 16, which separates input light 1 into a TE-mode light and a TM-mode light. The TM-mode light enters optical waveguide 11, and the TE-mode light enters optical waveguide 12.

The polarization of the light of the wavelengths (wavelength 1 to wavelength 4 in the case shown in FIG. 1) corresponding to the SAWs is rotated from the TM-mode light to the TE-mode light in optical waveguide 11, and is rotated from the TE-mode lights to the TM-mode light in optical waveguide 12.

A waveguide type PBS 17 outputs the TM-mode light in optical waveguide 11 to a pass-through light side and outputs the TE-mode light to a branching light side. Further, waveguide type PBS 17 outputs the TE-mode light in optical waveguide 12 to the pass-through light side and outputs the TM-mode light to the branching light side. Hence, a particular wavelength (wavelength 1 to wavelength 4) can be extracted or modulated.

Absorbers 19 and 20 are SAW absorbers that prevent the SAWs from being reflected by an end surface of the substrate.

The AOTF shown in FIG. 2 can also be used as the coupler shown in FIG. 1. In this case, for example, wavelength 1' to wavelength 4' are input as input light 2, while wavelength 5 to wavelength 8 from the separator are input as input light 1.

Then, waveguide type PBS 16 causes the TM-mode light of the wavelength 5 to wavelength 8 to be incident to optical waveguide 11 and causes the TE-mode light thereof to be incident to optical waveguide 12.

When the RF signals corresponding to wavelength 1' to wavelength 4' are input to transducer 15, the polarization of the corresponding lights is changed from the TE-mode light to the TM-mode light in optical waveguide 11, and is changed from the TM-mode light to the TE-mode light in optical waveguide 12.

Waveguide type PBS 17 outputs the TM-mode light in optical waveguide 11 to the pass-through light side and outputs the TE-mode light to the branching light side. Further, waveguide type PBS 17 outputs the TE-mode light in optical waveguide 12 to the pass-through light side and outputs the TM-mode light to the branching light side.

Unfortunately, with the conventional use of an AOTF, the output can undesireably vary with time. For example, in a case where the AOTF is used to extract a plurality of wavelengths (such as wavelength 1 to wavelength 4), if a plurality of frequencies are applied to transducer 15 of the AOTF, the central frequencies of the band-pass/band-rejection characteristics deviate from the target frequencies with time. Hence, the output of the AOTF varies with time although the input light has a constant power.

SUMMARY OF THE INVENTION

Accordingly, it is an object of the present invention to provide an AOTF configuration having stable output characteristics so that the output does not significantly vary with time.

Objects of the present invention are achieved by providing an apparatus which includes a plurality of acousto-optical tunable filters (AOTF) cascaded together. Each AOTF generates a surface acoustic wave in an optical waveguide in accordance with RF signals applied to the AOTF. A phase of a beat generated by the RF signals applied to one of the plurality of AOTFs is different from a phase of a beat generated by the RF signals applied to a different AOTF of the plurality of AOTFs.

Objects of the present invention are further achieved by providing an apparatus including first and second optical filters cascaded together so that the second optical filter filters light output from the first optical filter. The first and second optical filters each have filtering characteristics controlled in accordance RF signals applied thereto. Moreover, a phase of a beat generated by the RF signals applied to the first optical filter is different than a phase of a beat generated by the RF signals applied to the second optical filter.

In addition, objects of the present invention are achieved by providing an apparatus including first and second optical filters cascaded together so that the second optical filter filters light output from the first optical filter. The first and second optical filters have filtering characteristics controlled in accordance with first and second RF signals, respectively. The first RF signal has a different phase than the second RF signal.

Further, objects of the present invention are achieved by providing an apparatus having at least five optical filters (such as AOTFs) connected together in a specific configuration. More specifically, a first optical filter filters an input light including a plurality of wavelengths to output first and second output lights. The first output light excludes a wavelength of the plurality of wavelengths selected in accordance with an RF signal applied to the first optical filter for controlling filtering characteristics of the first optical filter. The second output light includes the selected wavelength. A second optical filter filters the first output light with filtering characteristics which reject the selected wavelength in accordance with an RF signal applied to the second optical filter for controlling filtering characteristics of the second optical filter. A third optical filter filters the second output light with filtering characteristics which pass the selected wavelength in accordance with an RF signal applied to the third optical filter for controlling filtering characteristics of the third optical filter. A fourth optical filter filters the filtered, first output light from the second optical filter with filtering characteristics which reject the selected wavelength in accordance with an RF signal applied to the fourth optical filter for controlling filtering characteristics of the fourth optical filter. A fifth optical filter filters the filtered, second output light from the third optical filter with filtering characteristics which pass the selected wavelength in accordance with an RF signal applied to the fifth optical filter for controlling filtering characteristics of the fifth optical filter. A phase controller controls phases of the RF signals applied to the first, second, third, fourth and fifth optical filters with respect to each other.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 15 is a diagram illustrating relative phases of RF signals applied to cascaded AOTFs, according to an embodiment of the present invention.

FIG. 24 is a diagram illustrating the relative phases of phase shifters in FIG. 23, according to an embodiment of the present invention.

FIG. 30 is a diagram illustrating phase relationships among phase shifters used when an increased number of band-pass/band-rejection wavelengths is used in the configuration shown in FIG. 23, according to an embodiment of the present invention.

FIG. 34 is a diagram illustrating a relationship between RF signals and phase shifters in the configuration shown in FIG. 33, according to an embodiment of the present invention.

FIG. 41 is a diagram illustrating a relationship between RF signals and phase shifters of a four-wavelength band-pass/band-rejection filter using the configuration shown in FIG. 33, according to an embodiment of the present invention.

FIGS. 42(A), 42(B) and 42(C) are diagrams illustrating a variation in the beat component resulting from RF signals of four wavelengths in the configuration shown in FIG. 33, according to an embodiment of the present invention.

FIG. 47 is a diagram illustrating a relationship between RF signals and phase shifters when an increased number of wavelengths are employed, according to an embodiment of the present invention.

DESCRIPTION OF THE PREFERRED EMBODIMENTS

Figure 1:
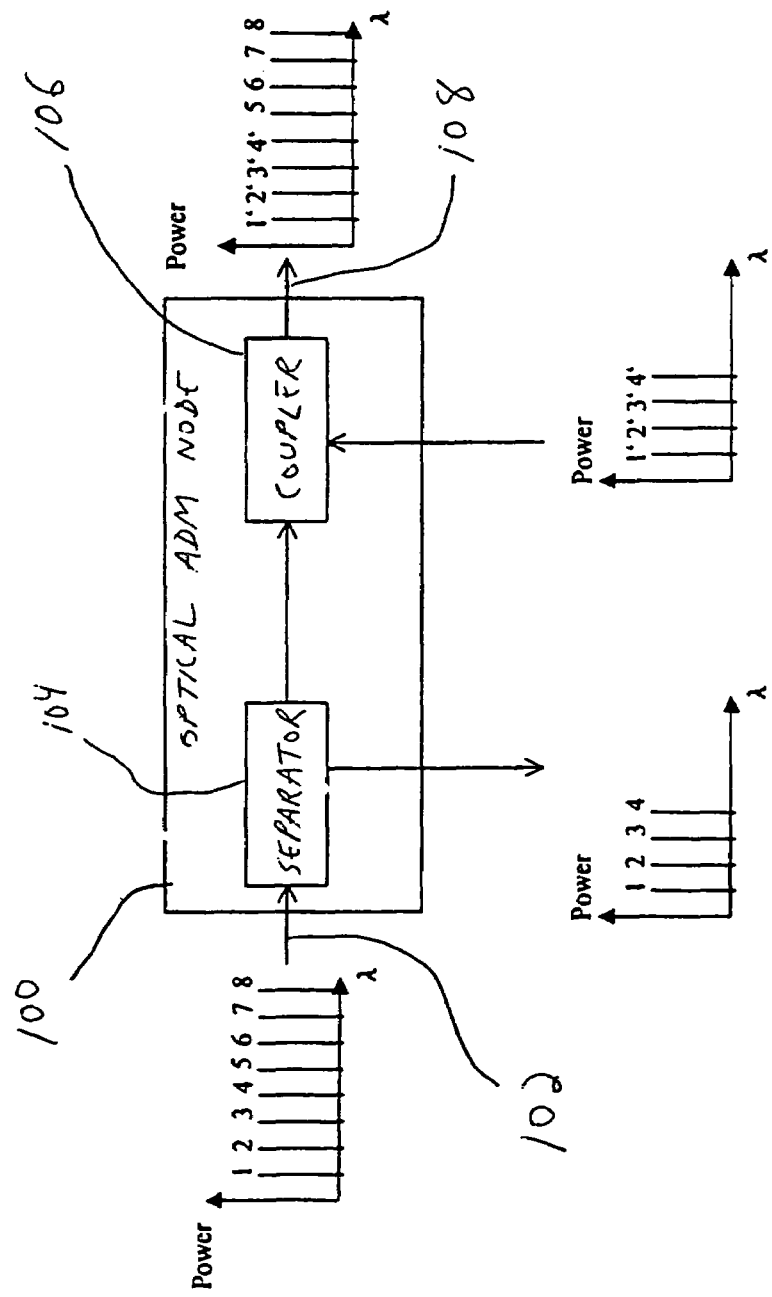
FIG. 1 (prior art) is a diagram illustrating an optical ADM node.
Figure 2:
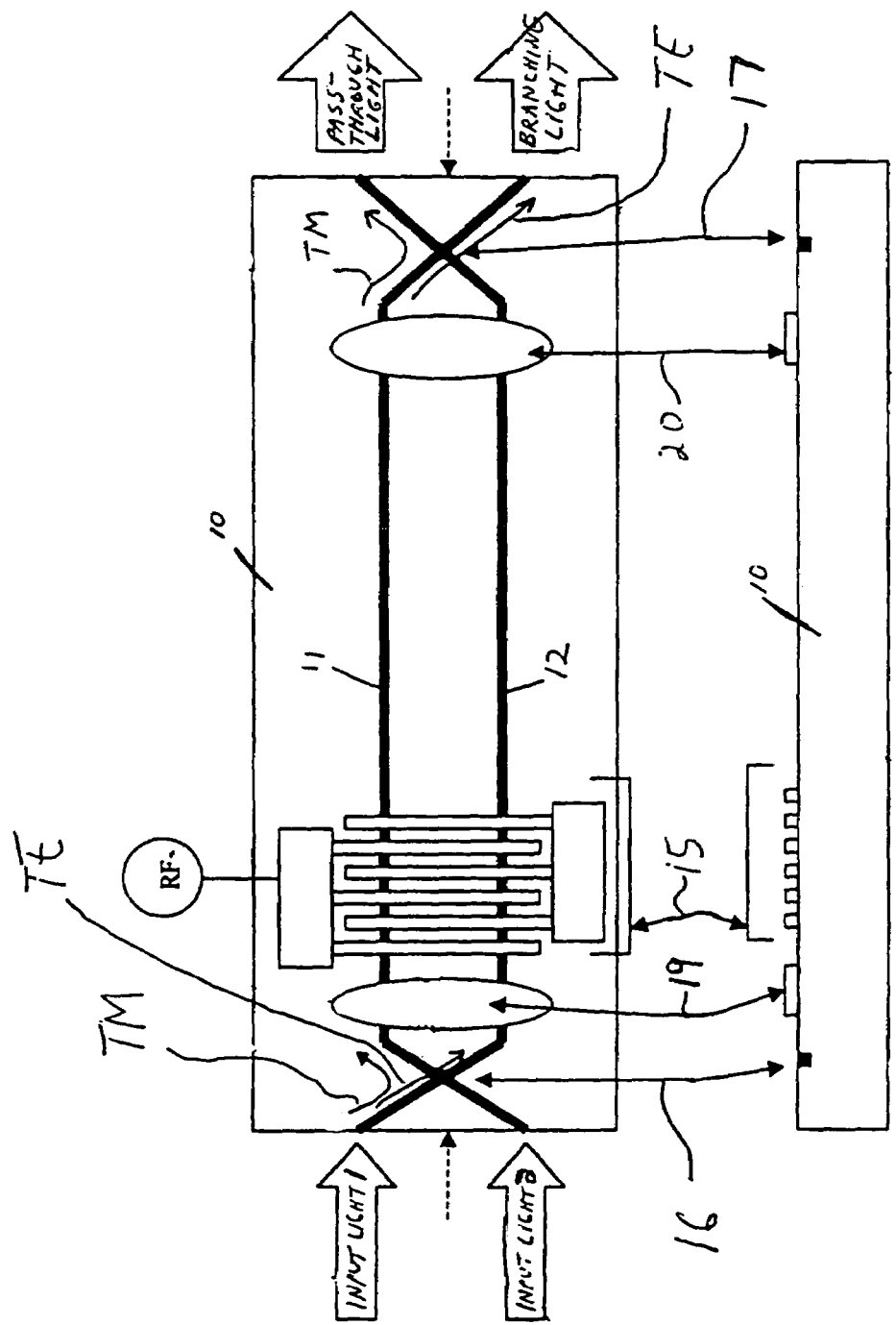
FIG. 2 (prior art) is a diagram illustrating a conventional AOTF.

Reference will now be made in detail to the present preferred embodiments of the present invention, examples of which are illustrated in the accompanying drawings, wherein like reference numerals refer to like elements throughout.

Figure 3:
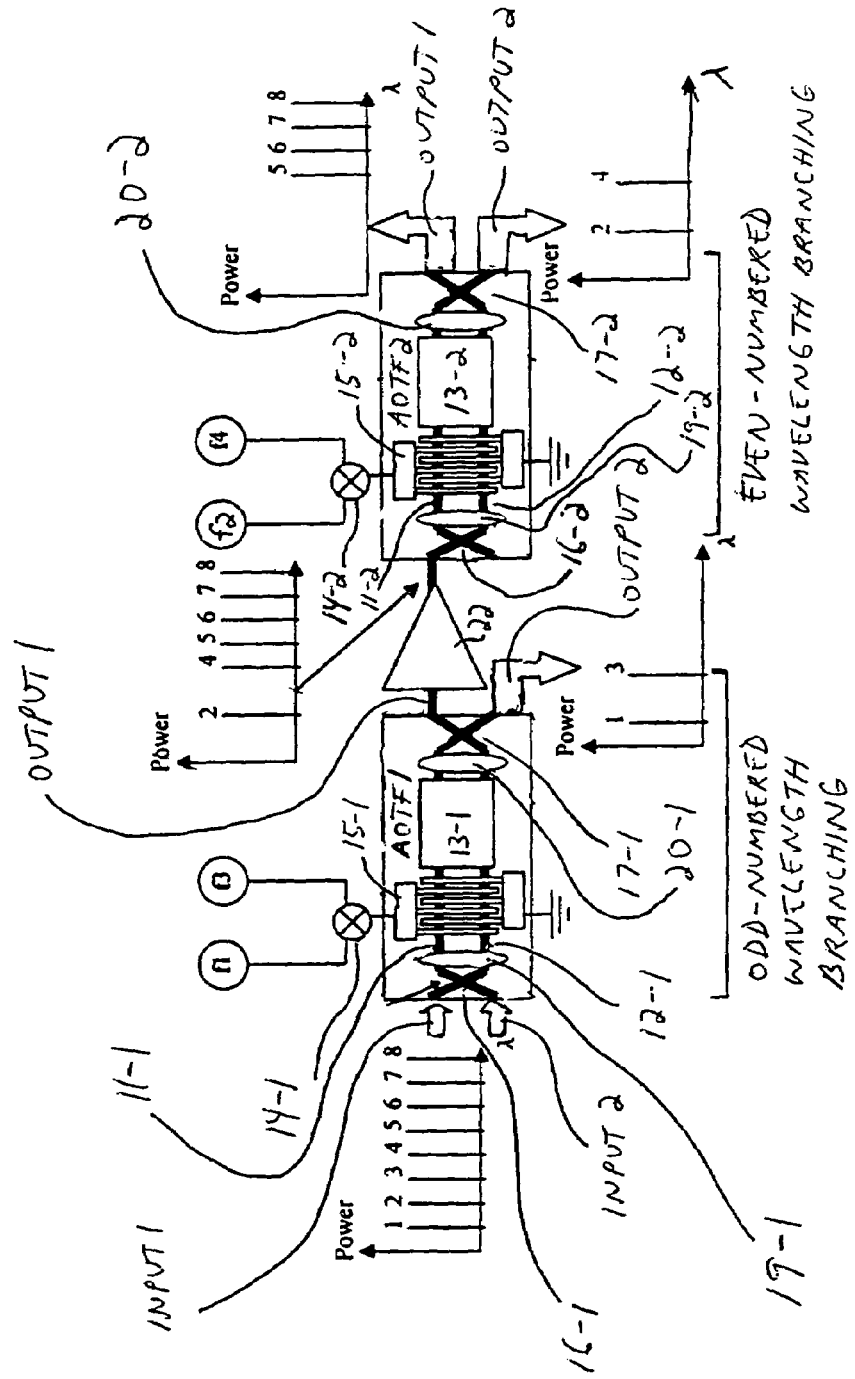
FIG. 3 is a diagram illustrating a configuration in which wavelengths arranged in order are made to branch into odd-numbered wavelengths and even-numbered wavelengths.

FIG. 3 is a diagram illustrating a configuration in which separator 104 shown in FIG. 1 is formed by two stages of AOTFs. Referring now to FIG. 3, odd-numbered wavelengths among the wavelengths arranged in order are selected by a first AOTF 1, while even-numbered wavelengths are selected by a second AOTF 2. An optical input in which wavelength 1 to wavelength 8 are multiplexed is input to first AOTF 1. In first AOTF 1, RF signals of frequencies f1 and f3 corresponding to wavelengths 1 and 3, respectively, are input to a transducer 15-1.

A waveguide type PBS 16-1 receives the light of wavelengths 1 to 8 as input light 1, and separates the input light 1 into TE-mode light and TM-mode light. The TM-mode light enters an optical wavelength path 11-1, and the TE-mode light enters an optical wavelength path 12-1.

The polarization of optical wavelengths 1 and 3 corresponding to SAWs of f1 and f3 is rotated from the TM-mode light to the TE-mode light in optical wavelength path 11-1, and is rotated from the TE-mode light to the TM-mode light in optical wavelength path 12-1.

In a wavelength type PBS 17-1, the TM-mode light in the optical wavelength path 11-1 is output to an output-1 side, and the TE-mode light existing therein is output to an output-2 side. Further, in wavelength path type PBS 17-1, the TE-mode light in optical wavelength path 12-1 is output to the output-1 side, and the TM-mode light existing therein is output to the output-2 side. Hence, wavelengths 1 and 3 are output from the output-2 side, and wavelengths 2 and 4 to 8 are output from the output-1 side.

The output 1 of first AOTF 1 is input to an optical amplifier 22 which performs a level adjustment by amplifying the light attenuated by first AOTF 1. The output of the optical amplifier is input to second AOTF 2 as input light 1.

In second AOTF 2, RF signals of frequencies f2 and f4 corresponding to wavelengths 2 and 4, respectively, are input to a transducer 15-2. A waveguide type PBS 16-2 receives the light of wavelengths 2 and 4 to 8, and separates the input light into TE-mode light and TM-mode light. The TM-mode light enters an optical waveguide 11-2, and the TE-mode light enters an optical waveguide 12-2.

The polarization of optical wavelengths 2 and 4 corresponding to SAWs of f2 and f4 is rotated from the TM-mode light to the TE-mode light in optical waveguide 11-1, and is rotated from the TE-mode light to the TM-mode light in optical waveguide 12. Hence, wavelengths 2 and 4 are output from the output-2 side, and the wavelengths 4 to 8 are output from output-1 side.

Reference numbers 13-1 and 13-2 of first AOTF 1 and second AOTF 2 indicate layers, which contain the SAWs within optical waveguides 11-1, 11-2, 12-1 and 12-2 and which are formed on the optical waveguides on the surface of the substrate.

With the above configuration, the odd-numbered wavelengths among the wavelengths arranged in order are selected by first AOTF 1 and the even-numbered wavelengths are selected by second AOTF 2, so that individual wavelengths around the particular wavelengths can be extracted even when the AOTFs have a wide pass-through wavelength range and a wide branching wavelength range.

FIGS. 4 through 7 are graphs illustrating wavelength characteristics of the band-pass/band-rejection performance of first AOTF 1. More specifically, FIGS. 4 through 7 shows results of a simulation that is conducted so that wavelength characteristics are simulated at constant intervals in a state in which frequencies f1 and f3 are applied to transducer 15-1 by setting wavelengths 1 and 3 subjected to the band-pass or band-rejection operation to 1.5484 µm and 1.5500 µm, respectively.

Figure 4:
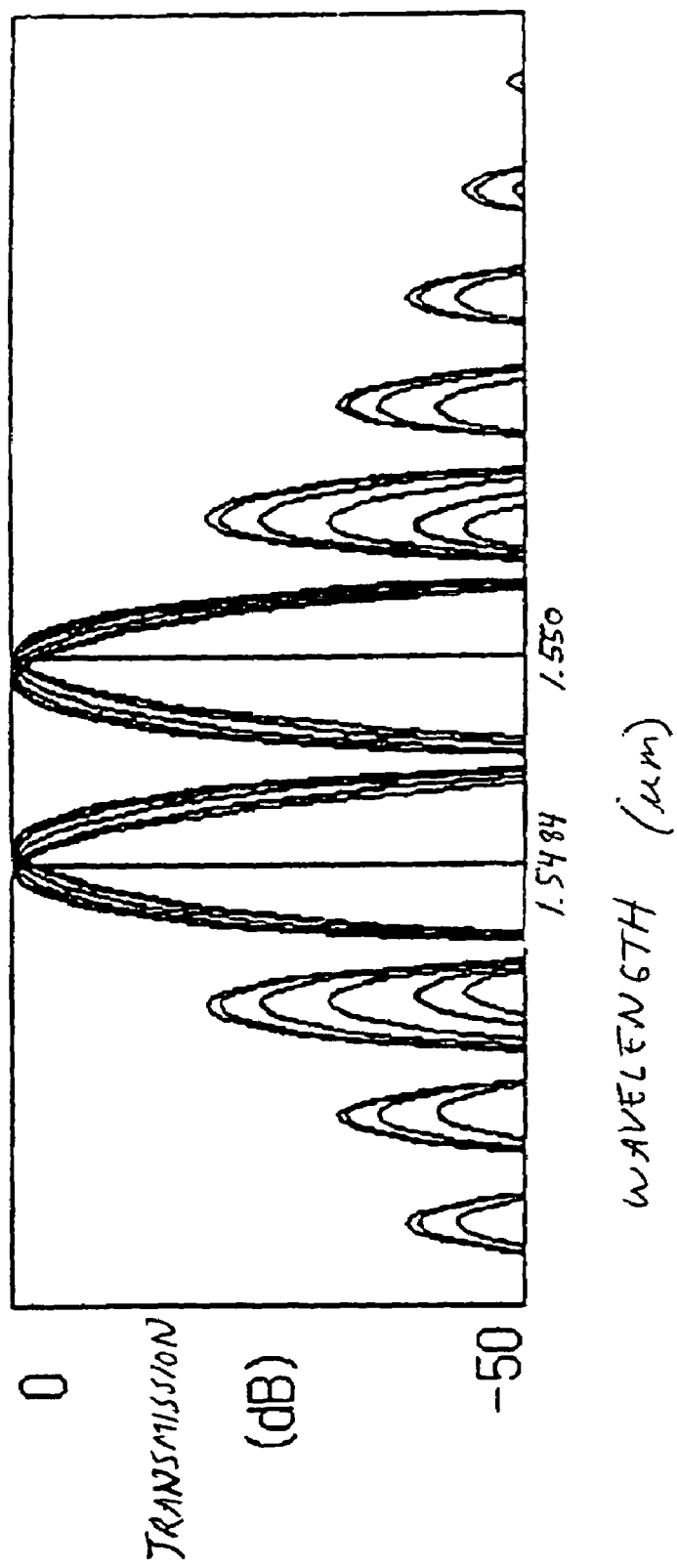
FIG. 4 is a graph illustrating band-pass filter characteristics of a first AOTF 1 shown in FIG. 3 observed at different times.
Figure 5:
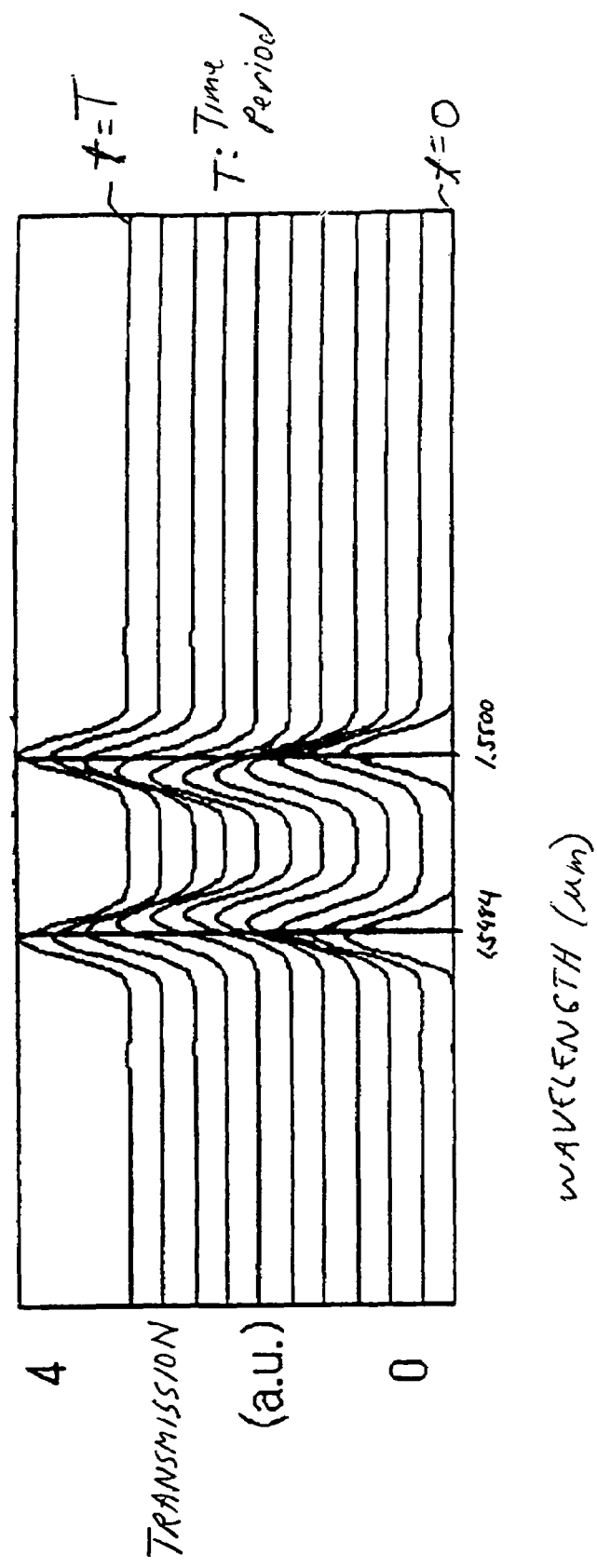
FIG. 5 is a graph illustrating band-pass filter characteristics of the first AOTF 1 shown in FIG. 3 observed at different times.

FIGS. 4 and 5 show the band-pass characteristics viewed from the output-2 side of first AOTF 1. It can be seen from the figures that the central frequencies of the filter with respect to the required wavelengths 1.5484 µm and 1.5500 µm observed at different times vary with time and that the 1.5484 µm and 1.5500 µm required to pass through the filter are attenuated with time. The above results in a level variation in the output signal. Particularly, the simulation result of FIG. 5 shows that the band-pass wavelength characteristic periodically changes with time.

Figure 6:
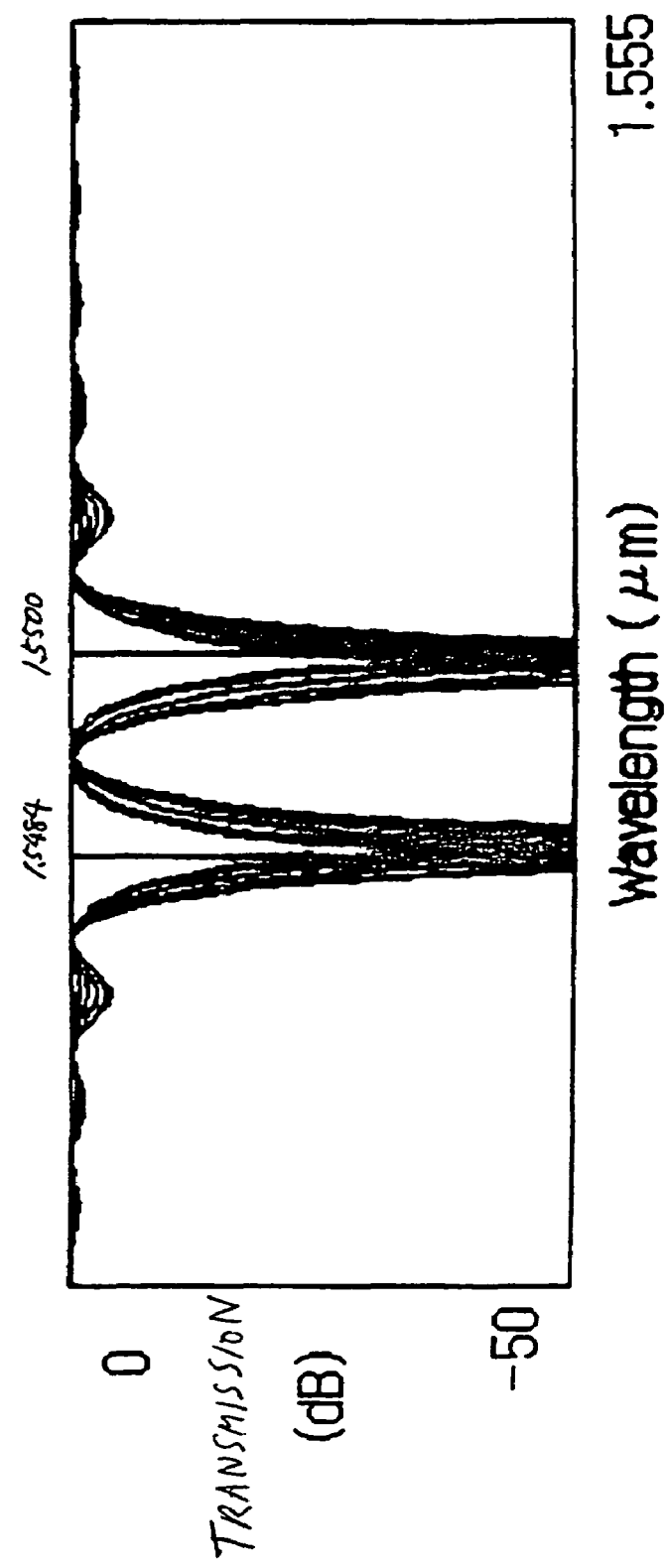
FIG. 6 is a graph illustrating band-rejection filter characteristics of the first AOTF 1 shown in FIG. 3 observed at different times.

FIG. 6 shows the band-rejection characteristic viewed from the output-1 side of first AOTF 1. Originally, an attenuation equal to or greater than −50 dB is expected at the wavelengths 1.5484 µm and 1.5500 µm, while the actual attenuation is reduced to approximately −25 dB.

Figure 7:
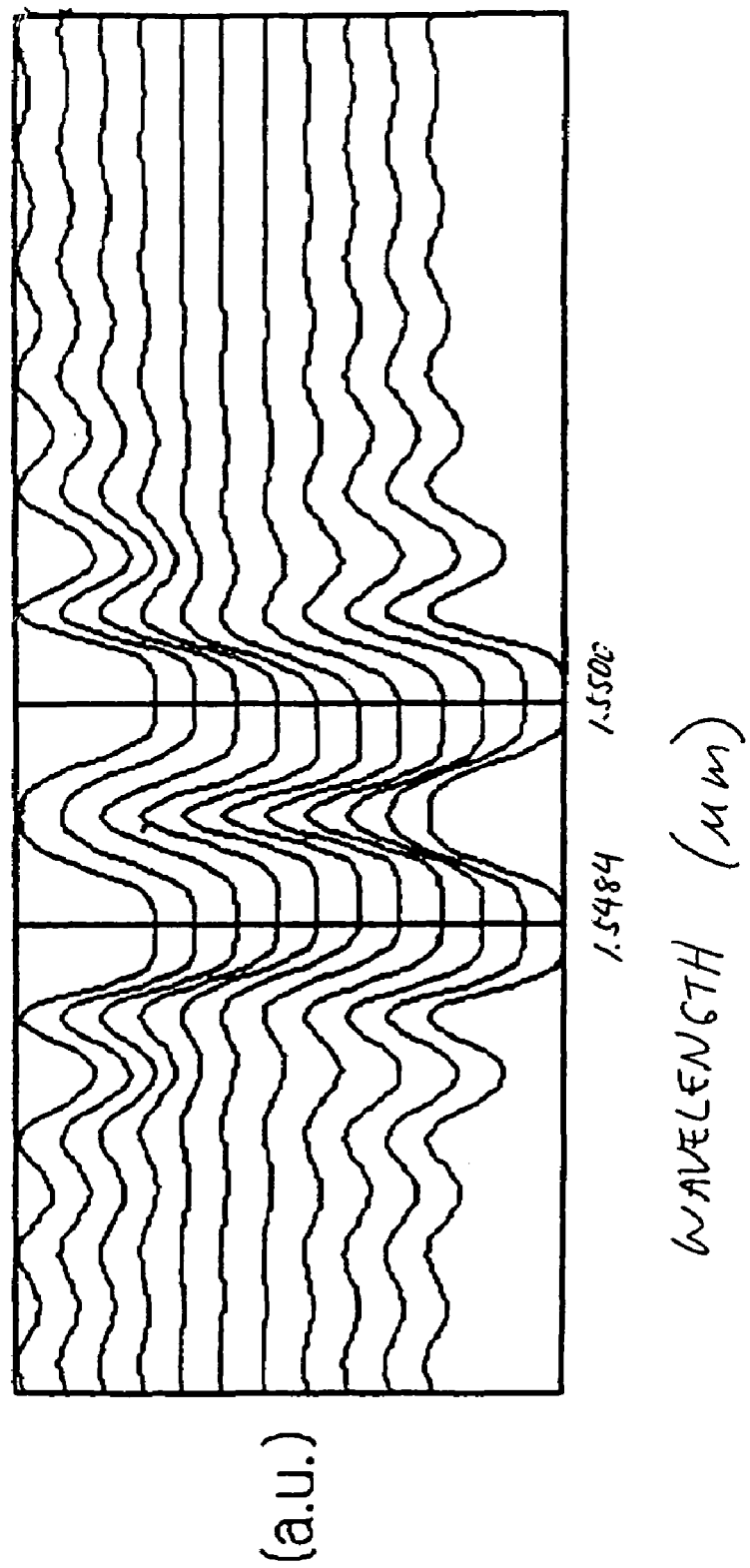
FIG. 7 is a graph illustrating band-rejection filter characteristics of the first AOTF 1 shown in FIG. 3 observed at different times.

FIG. 7 shows a characteristic obtained by extending the characteristic of FIG. 6 on the time basis. It can be seen from FIG. 7 that the wavelengths that are attenuated around the wavelengths 1.5484 µm and 1.5500 µm vary periodically with time. This phenomenon holds true for a case where an increased number of band-pass or band-rejection wavelengths are set in the AOTF.

FIGS. 8 through 11 are graphs illustrating characteristics obtained when RF signals of frequencies f1, f2, f3 and f4 are applied to the first AOTF 1, which extracts wavelengths 1 to 4.

Figure 8:
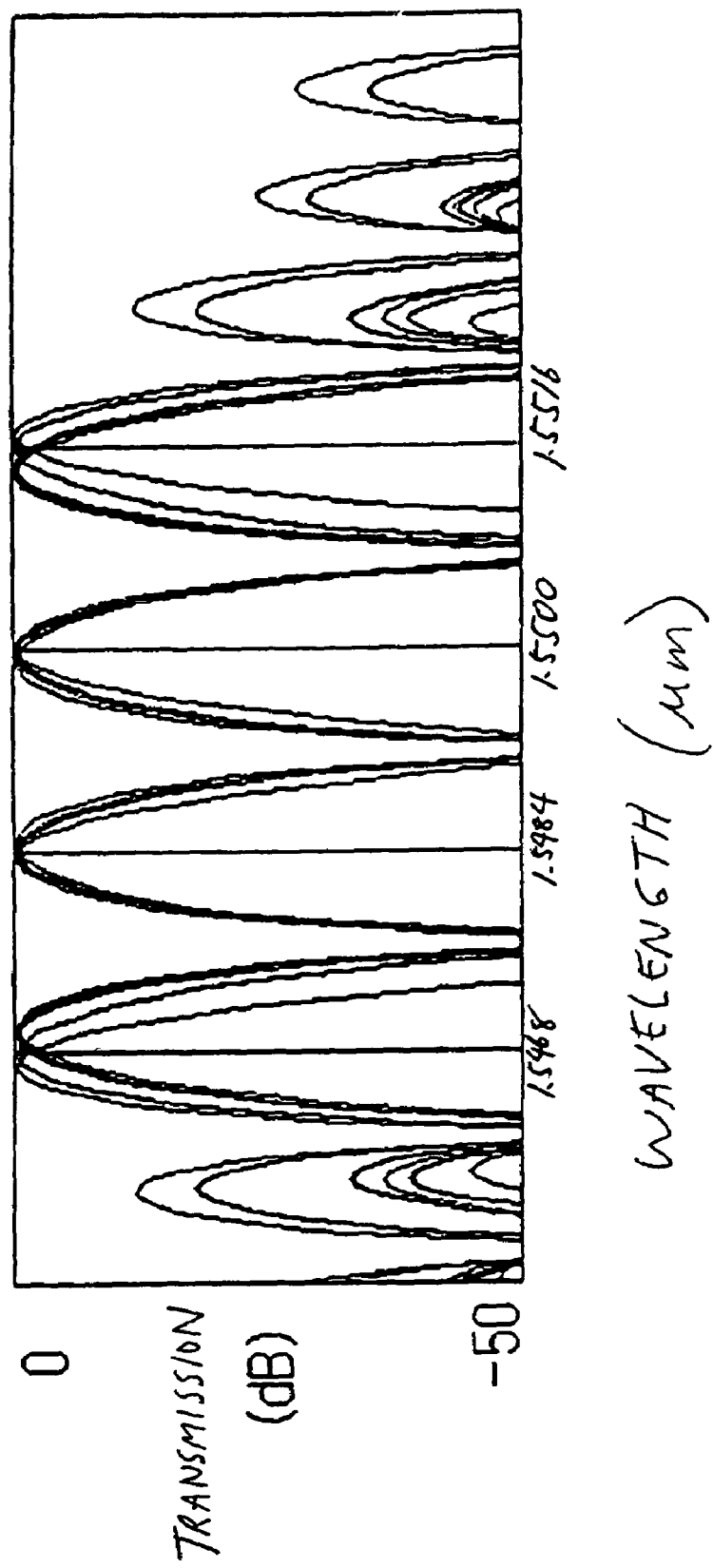
FIG. 8 is a graph illustrating band-pass filter characteristics of the first AOTF 1 shown in FIG. 3 observed at different times.
Figure 9:
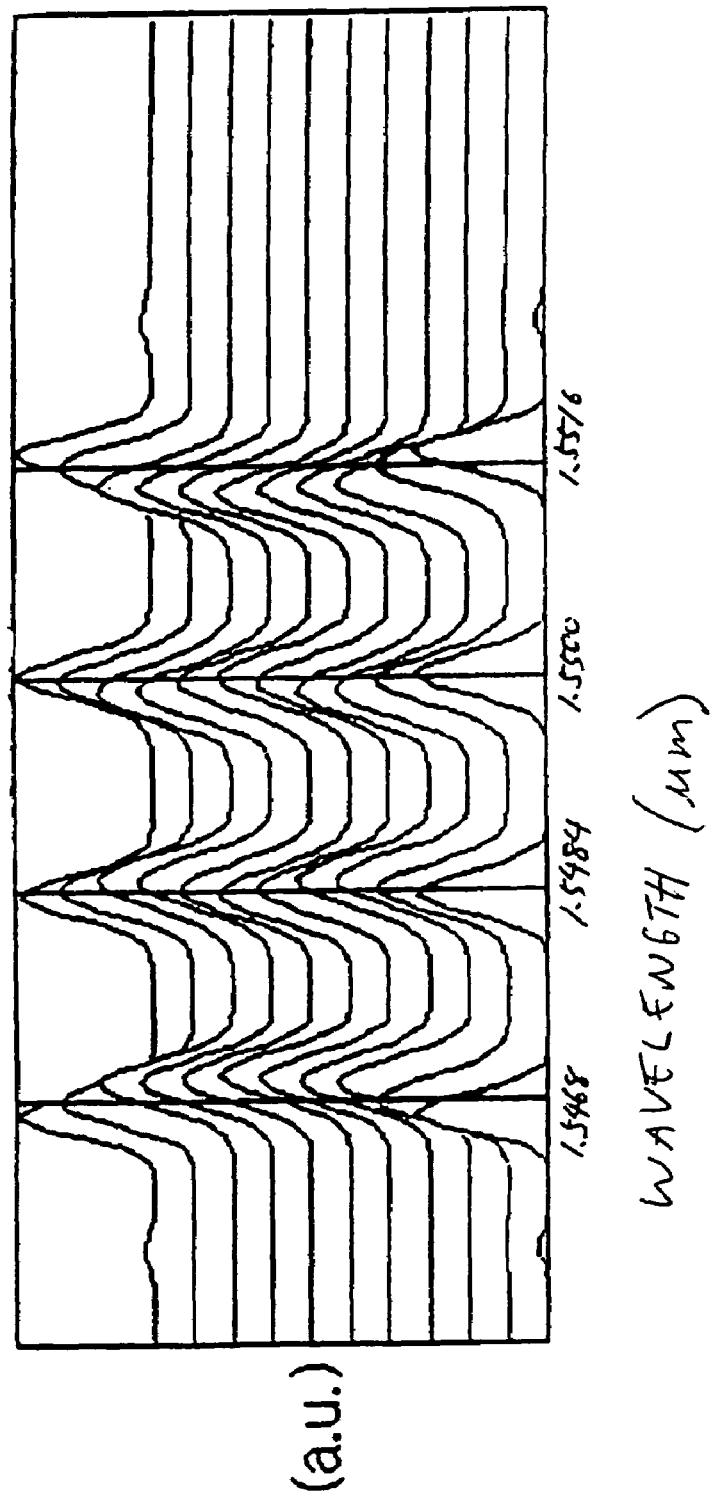
FIG. 9 is a graph illustrating band-pass filter characteristics of the first AOTF 1 shown in FIG. 3 observed at different times.

FIGS. 8 and 9 show band-pass characteristics viewed from the output-2 side. The following can be seen from FIG. 8 in which first AOTF 1 allows wavelengths 1.5468 µm, 1.5484 µm, 1.5500 µm and 1.5516 µm to pass therethrough. The pass-through level changes with time and the band-pass wavelengths shift to positions other than the peaks of the filter characteristic. Thus, the optical signals having the wanted wavelengths are attenuated.

FIG. 9 shows a characteristic obtained by extending the characteristic of FIG. 8 on the time basis. The wavelengths allowed to pass through first AOTF 1 change periodically with time around the wavelengths 1.5468 µm, 1.5484 µm, 1.5500 µm and 1.5516 µm.

Figure 10:
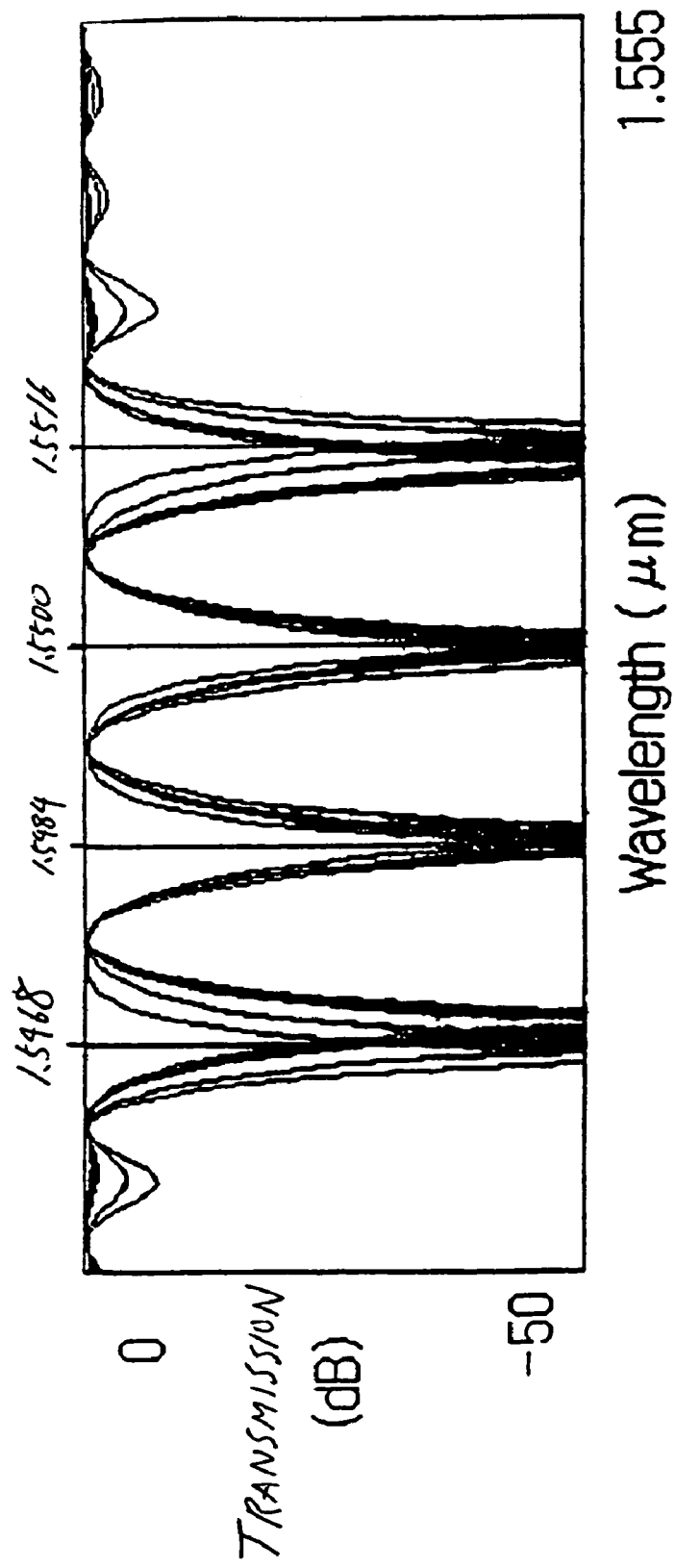
FIG. 10 is a graph illustrating band-rejection filter characteristics of the first AOTF 1 shown in FIG. 3 observed at different times.

FIG. 10 shows a band-rejection wavelength characteristic viewed from the output-1 side. Originally, an attenuation equal to or greater than −50 dB is expected at the wavelengths 1.5468 µm, 1.5484 µm, 1.5500 µm and 1.5516 µm, while the actual attenuation is reduced to approximately −25 dB.

Figure 11:
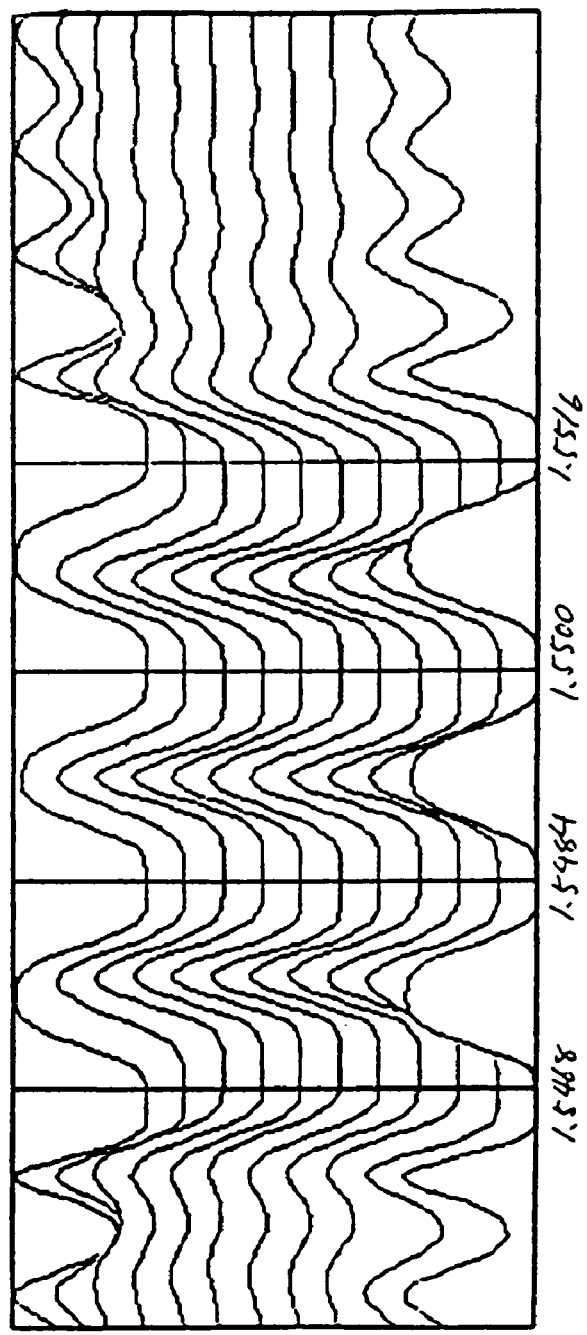
FIG. 11 is a graph illustrating band-rejection filter characteristics of the first AOTF 1 shown in FIG. 3 observed at different times.

FIG. 11 shows a characteristic obtained by extending the characteristic of FIG. 10 on the time basis. It can be seen from FIG. 11 that the wavelengths attenuated change periodically around the wavelengths 1.5468 µm, 1.5484 µm, 1.5500 µm and 1.5516 µm.

It can be seen from the above that the band-pass/band-rejection wavelength characteristics can periodically be changed when a plurality of RF signals are applied to the AOTF in order to select a plurality of desired wavelengths.

Figure 12:
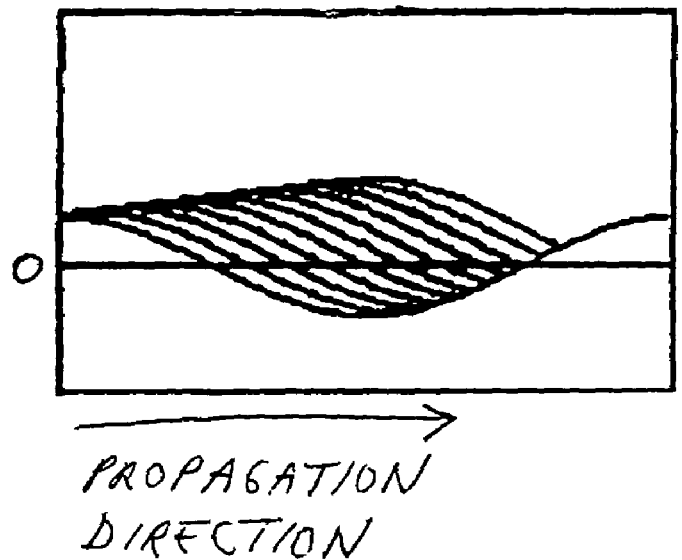
FIG. 12 is a diagram illustrating a time-based characteristic of a beat signal resulting from two RF signals.

FIG. 12 is a diagram illustrating a result of a simulation conducted so that the intensity of a beat component of the SAWs obtained by applying two RF signals to first AOTF 1 in order to select two wavelengths is simulated at constant intervals. Thus, FIG. 12 shows a simulation for the first stage of the AOTF configuration.

Figure 13:
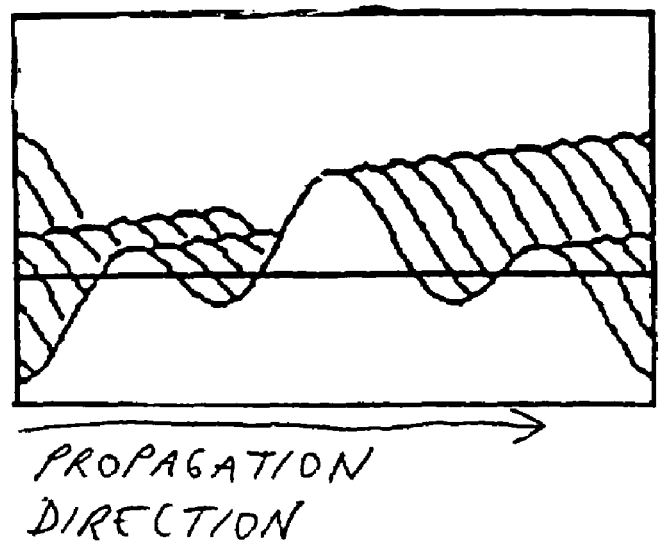
FIG. 13 is a diagram illustrating a time-based characteristic of a beat signal resulting from four RF signals.

FIG. 13 is a diagram illustrating a result of a simulation conducted so that the intensity of the beat component of the SAWs observed when four wavelengths are selected by first AOTF 1 is simulated at constant intervals. Thus, FIG. 13 shows a simulation for the first stage of the AOTF configuration.

It can be seen from FIGS. 12 and 13 that the intensity of the beat component shifts with a constant period.

Figure 14:
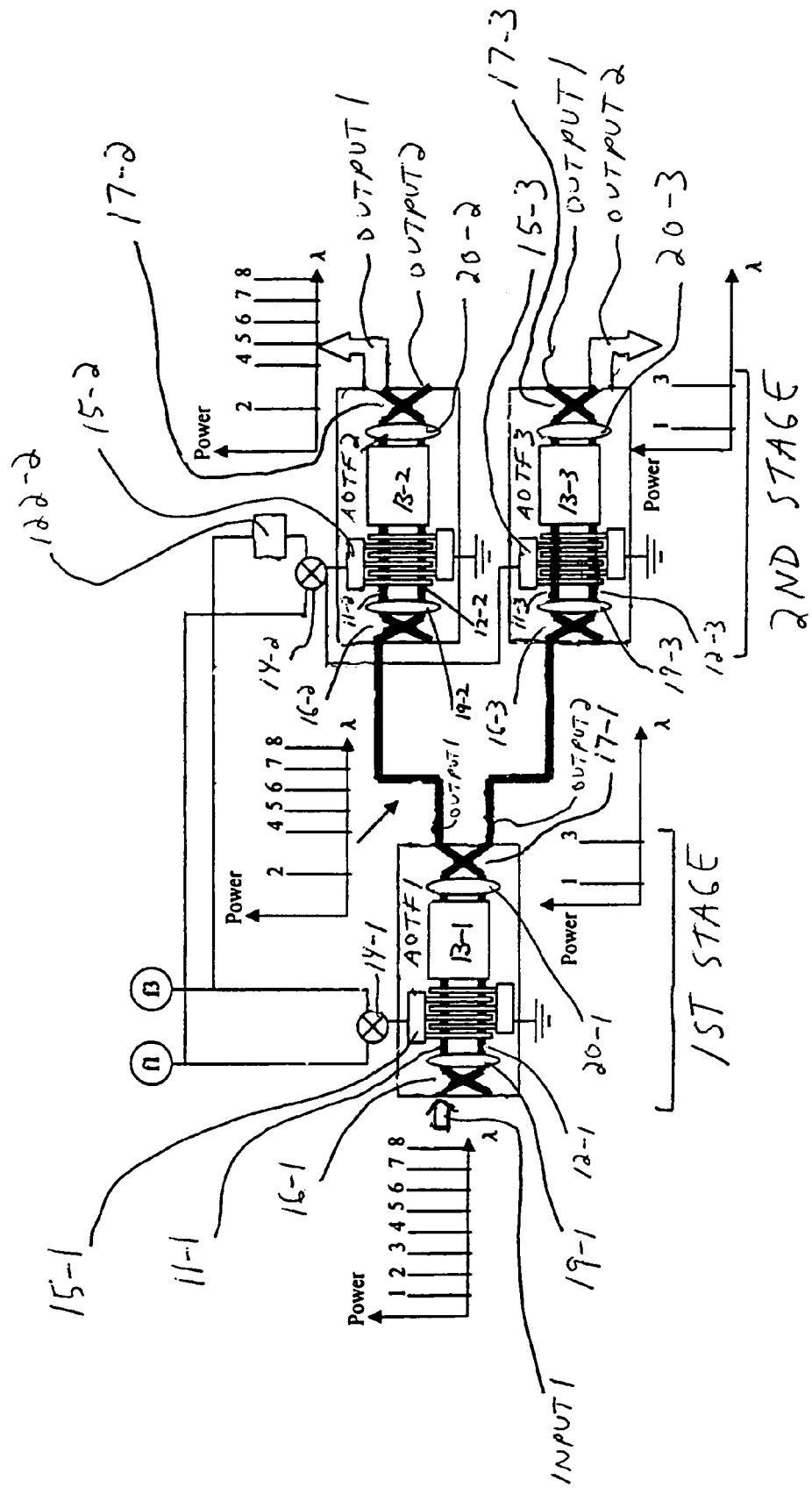
FIG. 14 is a diagram illustrating a configuration in which a band-pass/band-rejection filter is composed of two stages, according to an embodiment of the present invention.

FIG. 14 is a diagram illustrating a configuration of AOTFs directed to solving the problem that the peak of the intensity of the beat component shifts, according to an embodiment of the present invention. The configuration has two stages of AOTFs, and the phases of the beat components caused by the RF signals applied commonly to the AOTFs have a 90° offset between the first and second stages.

Referring now to FIG. 14, an optical input having multiplexed wavelengths 1 to 8 is input to AOTF 1 of the first stage. RF signals of frequencies f1 and f3 corresponding, respectively, to wavelengths 1 and 3 are applied to transducer 15-1 of first AOTF 1. The frequencies f1 and f3 of the RF signals used here are, for example, 176.795 MHz and 176.613 MHz, respectively.

Waveguide type PBS 16-1 receives the light of wavelengths 1 to 8 as input light 1, and separates the input light 1 into TE-mode light and TM-mode light. The TM-mode light enters optical wavelength path 11-1, and the TE-mode light enters optical wavelength path 12-1. The polarization of optical wavelengths 1 and 3 corresponding to SAWs of f1 and f3 is rotated from the TM-mode light to the TE-mode light in optical waveguide 11-1, and is rotated from the TE-mode light to the TM-mode light in optical waveguide 12-2.

In waveguide type PBS 17-1, the TM-mode light in optical waveguide 11-1 is output to the output-1 side, and the TE-mode light existing therein is output to the output-2 side. Further, in waveguide type PBS 17-1, the TE-mode light in optical waveguide 12-1 is output to the output 1 side, and the TM-mode light is output to output-2 side. Hence, wavelengths 1 and 3 are output from the output-2 side, and wavelengths 2 and 4 to 8 are output from output-1 side.

Waveguide type PBS 16-2 separates the received light into the TE-mode light and the TM-mode light. The TM-mode light enters optical waveguide 11-2, and the TE-mode light enters optical waveguide 12-2. At that time, the RF signal of the frequency f3 is processed by a phase shifter 122-2, which shifts the phase of the RF signal by 180 degrees with respect to the original phase thereof input to first AOTF 1. Coupler 14-2 couples the 180°-phase shifted RF signal of the frequency f3 with the RF signal of the frequency f1.

The RF signals of the frequency f1 and the 180°-phase shifted RF signal of the frequency f3 are applied to transducer 15-2 via coupler 14-2. Hence, the lights of wavelengths 1 and 3 which cannot be deleted perfectly due to time-based variations in the central frequencies of the band-rejection of first AOTF 1 have polarization which is rotated from the TM-mode light to the TE-mode light in optical waveguide 11-2 and which is rotated from the TE-mode light to the TM-mode light in optical waveguide 12-2. In waveguide type PBS 17-2, the TM-mode light and the TE-mode light in optical waveguide 11-2 are respectively output to the output-1 side and the output-2 side, and the TE-mode light and the TM-mode light in optical waveguide 12-2 are respectively output to the output-1 side and the output-2 side.

Hence, by changing the phase of the RF signal applied to second AOTF 2 by phase shifter 122-2, it is possible to shift the phase of the peak of the beat component of the RF signal and to delete, from the output of second AOTF 2, the wavelength components of wavelengths 1 and 3 which are not deleted totally at particular times by first AOTF 1. Thus, time-based variations in the amount of attenuation of the band-rejection components can be suppressed.

The output 2 of first AOTF 1 is input to input 1 of a third AOTF 3. A waveguide type PBS 16-3 separates the light into the TE-mode light and the TM-mode light, which are input to optical waveguides 12-3 and 11-3, respectively. At that time, a transducer 15-3 is supplied with the output of coupler 14-2, which is the same as the RF signal applied to second AOTF 2.

The polarization of the lights having wavelengths 1 and 3 from first AOTF 1 is changed from the TM-mode light to the TE-mode light in optical waveguide 11-3, and is changed from the TE-mode light to the TM-mode light in optical waveguide 12-3. Then, the above lights enter a waveguide type PBS 17-3.

Waveguide type PBS 17-3 outputs the TM-mode light and the TE-mode light in optical waveguide 11-3 to the output-1 side and the output-2 side, respectively, and outputs the TE-mode light and the TM-mode light in optical waveguide 12-3 to the output-1 side and the output-2 side, respectively.

Hence, even if slightly attenuated lights of wavelengths 1 and 3 with the pass-through peaks offset in first AOTF 1 and the lights of wavelengths 1 and 3 that are not attenuated at all are output at different times, the timing at which the attenuation is applied can be controlled by third AOTF 3. Hence, it is possible to provide lights of wavelengths 1 and 3 that always have an approximately identical amount of transparency.

Figure 15:
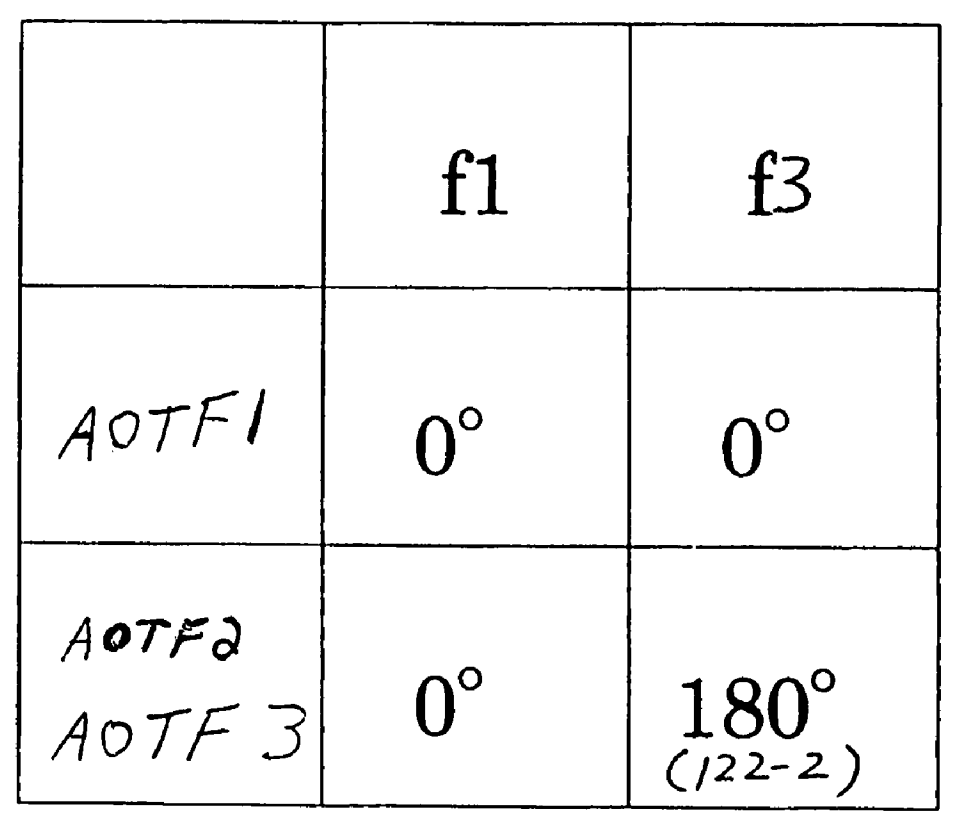

FIG. 15 is a diagram illustrating the relative phases of RF signals applied to first AOTF 1, second AOTF 2 and third AOTF 3, according to an embodiment of the present invention.

Figure 16:
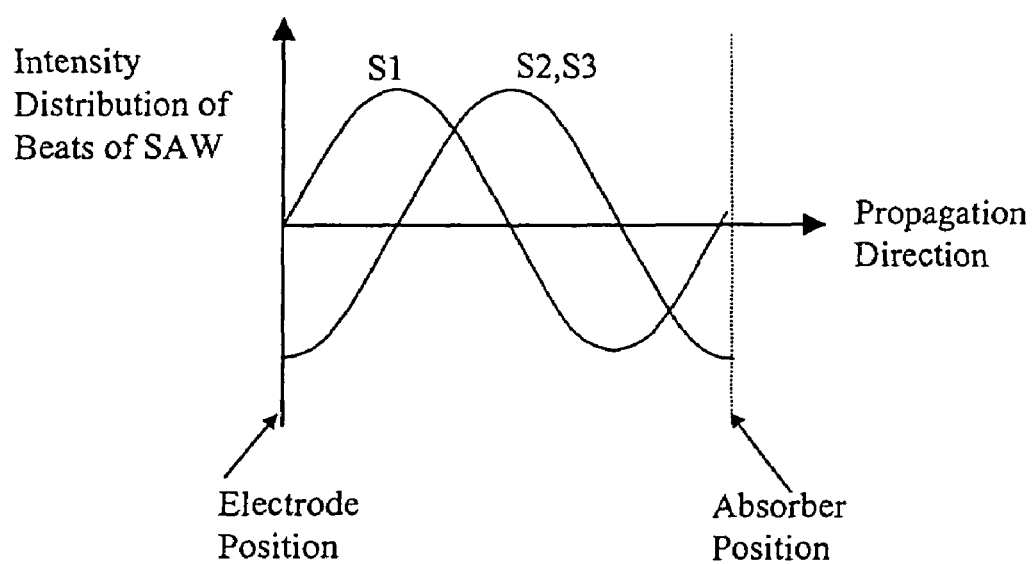
FIG. 16 is a diagram illustrating an intensity distribution of the beat of a surface acoustic wave in the configuration shown in FIG. 14, according to an embodiment of the present invention.

FIG. 16 is a diagram illustrating an intensity distribution of the phases of the RF signals applied to first AOTF 1, second AOTF 2 and third AOTF 3, according to an embodiment of the present invention. More specifically, FIG. 16 indicates the case of a two-stage AOTF configuration when two channels are selected. Referring now to FIG. 16, S1 indicates a beat intensity distribution of the surface acoustic wave propagated from the electrode of first AOTF 1 to an absorber 20-1. S2 and S3 indicate beat intensity distributions of the surface acoustic waves respectively propagated from the electrodes of second AOTF 2 and third AOTF 3 to absorber 20-1. In FIG. 16, the phase difference between beats is 90°.

Figures 17A, 17B:
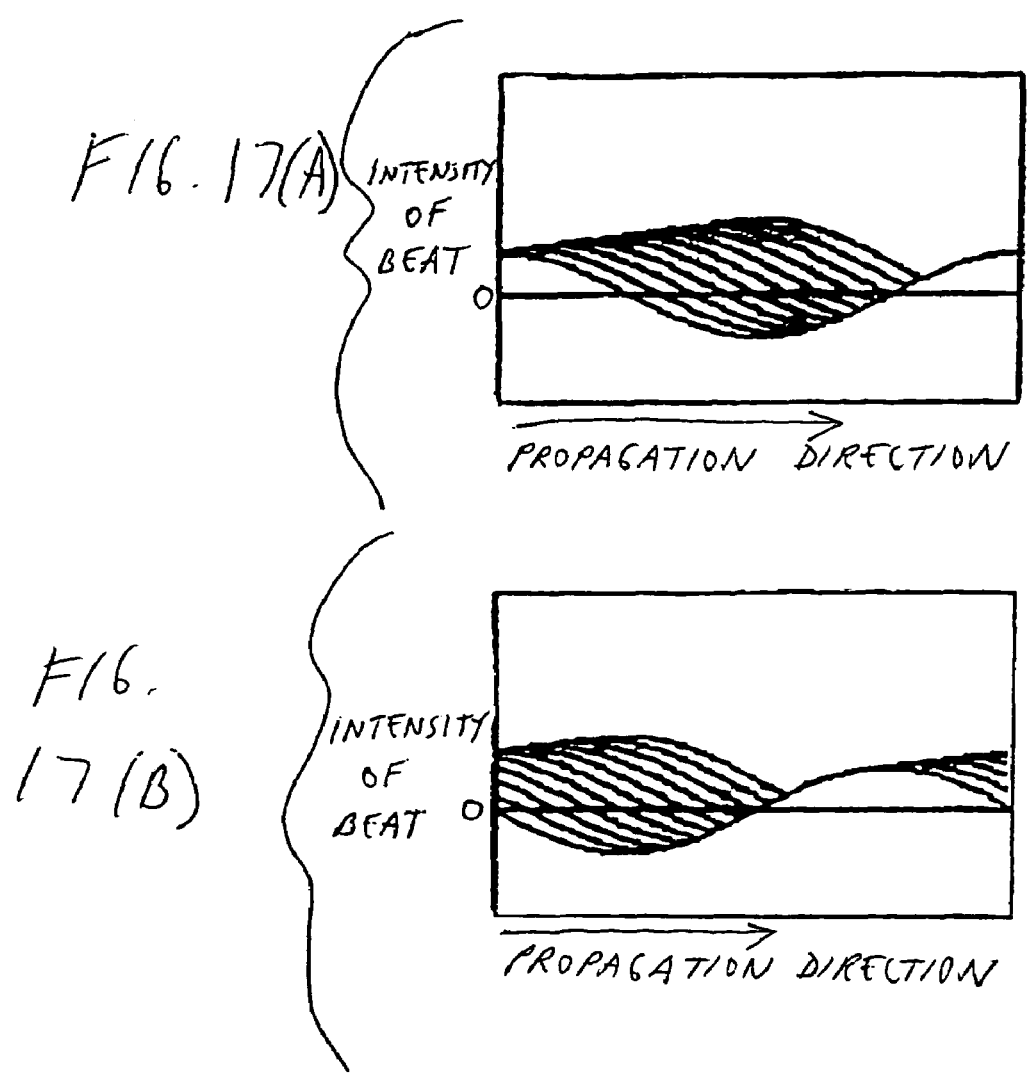
FIGS. 17(A) and 17(B) are diagrams illustrating a time-based characteristic of a beat signal resulting from two RF signals in the configuration shown in FIG. 14, according to an embodiment of the present invention.

FIGS. 17(A) and 17(B) are diagrams illustrating time-based variations in the intensities of the beat components of the RF signals applied to first AOTF 1 of the first stage shown in FIG. 14 and second AOTF 2 and third AOTF 3 of the second stage, according to an embodiment of the present invention.

More specifically, FIG. 17(A) shows a variation in the intensity of the beat component resulting from the RF signals applied to first AOTF 1 as a function of time. Thus, FIG. 17(A) shows the variation for the first stage of the AOTF configuration. FIG. 17(B) shows variations in the intensities of the beat components of the RF signals applied to second AOTF 2 and third AOTF 3 as a function of time. Thus, FIG. 17(B) shows the variation for the second stage of the AOTF configuration.

Figure 18:
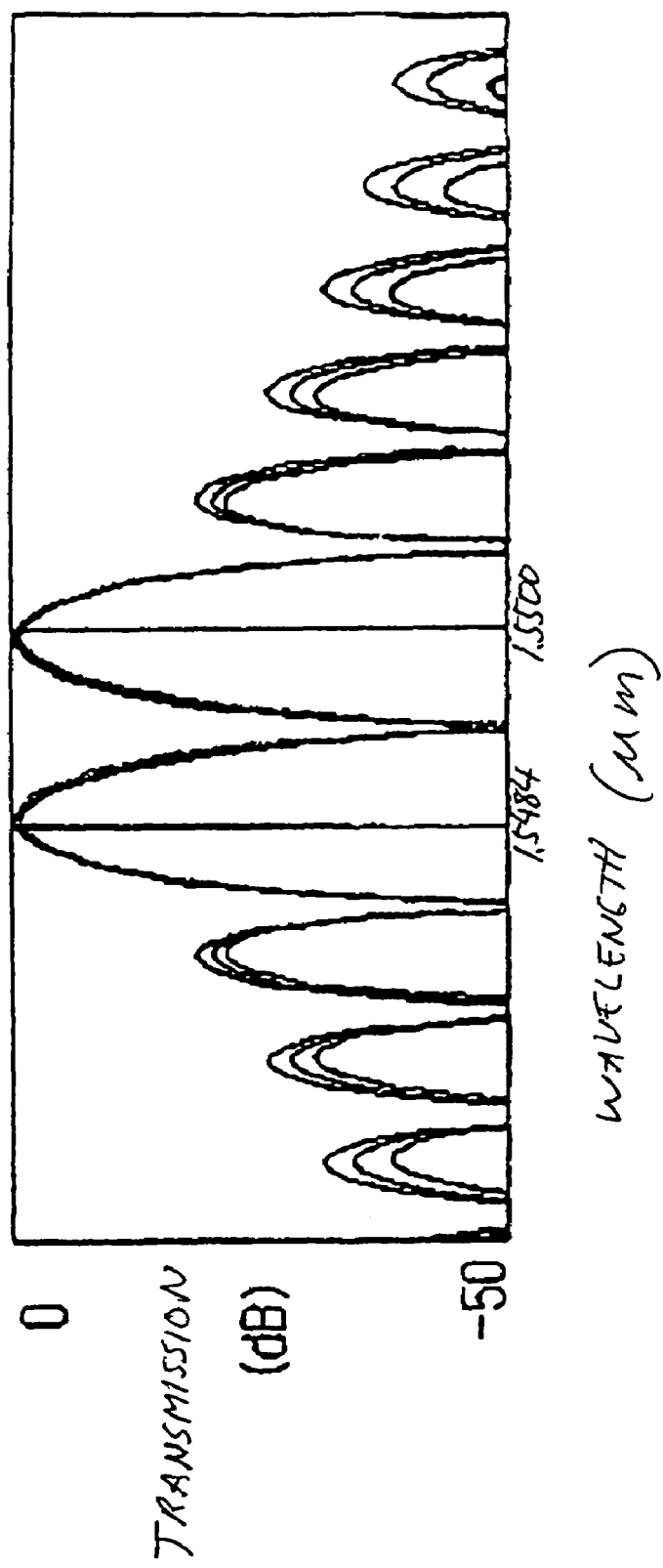
FIG. 18 is a graph illustrating band-pass filter characteristics of the first AOTF 1 shown in FIG. 14 observed at different times, according to an embodiment of the present invention.
Figure 19:
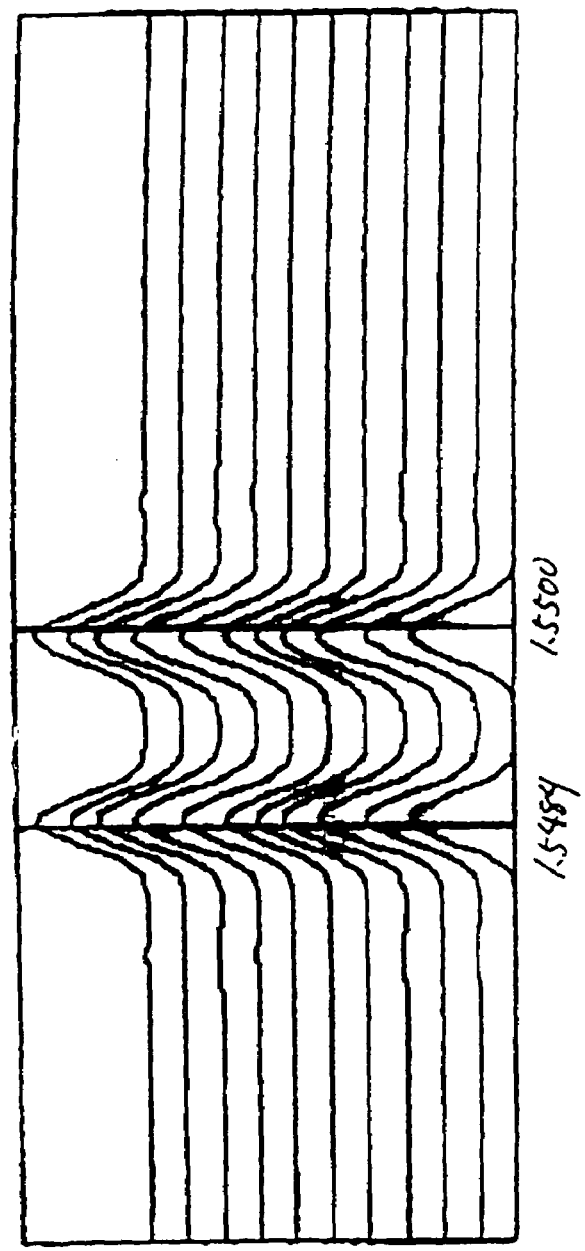
FIG. 19 is a graph illustrating band-pass filter characteristics of the first AOTF 1 shown in FIG. 14 observed at different times, according to an embodiment of the present invention.

FIGS. 18 and 19 are graphs illustrating band-pass characteristics obtained by integrating the characteristics of first AOTF 1 and third AOTF 3 shown in FIG. 14 obtained at different times, according to an embodiment of the present invention. Variations in the central frequencies shown in FIGS. 18 and 19 are less than those shown in FIGS. 4 and 5.

Figure 20:
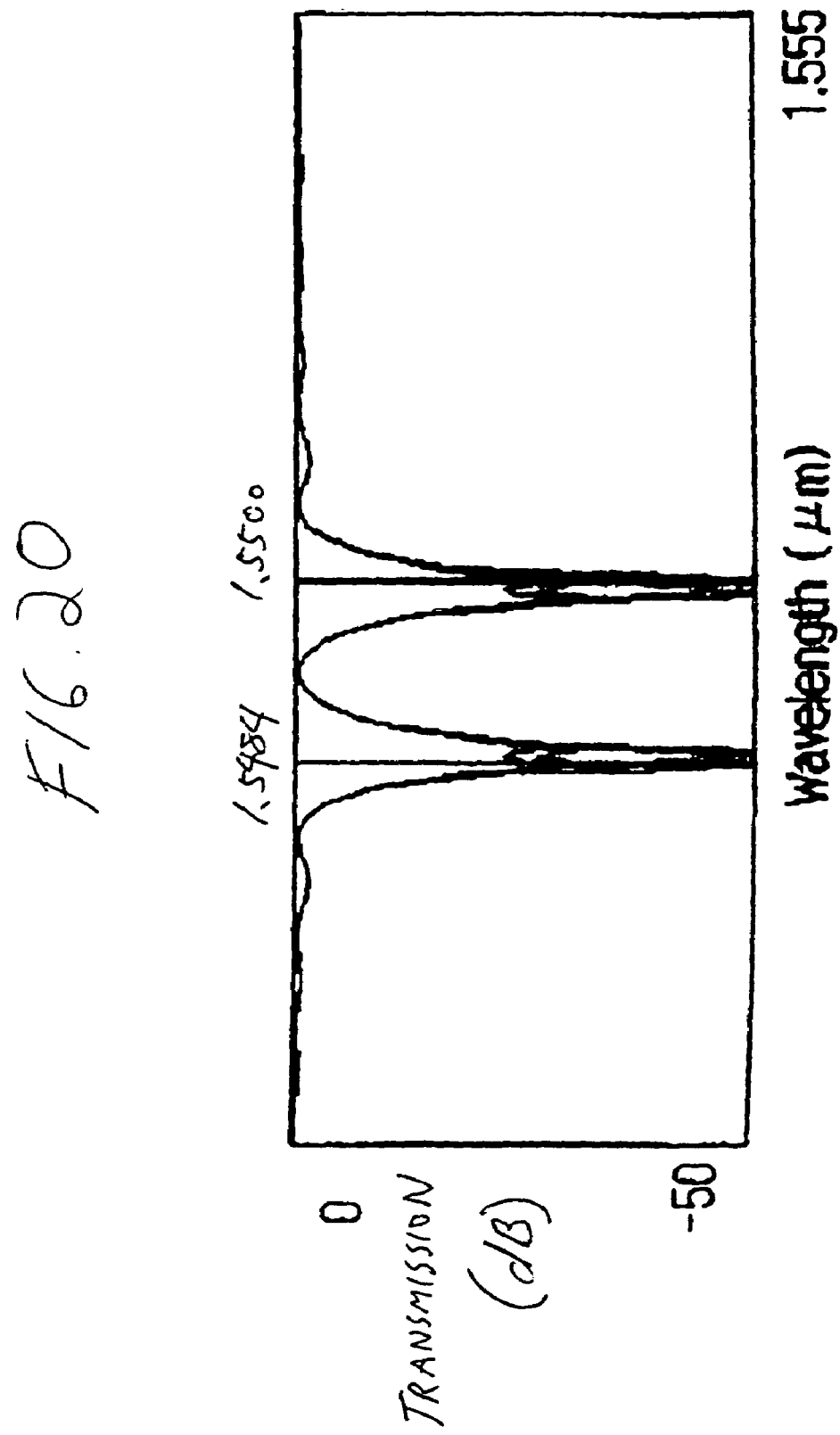
FIG. 20 is a graph illustrating band-rejection filter characteristics of the first AOTF 1 shown in FIG. 14 observed at different times, according to an embodiment of the present invention.
Figure 21:
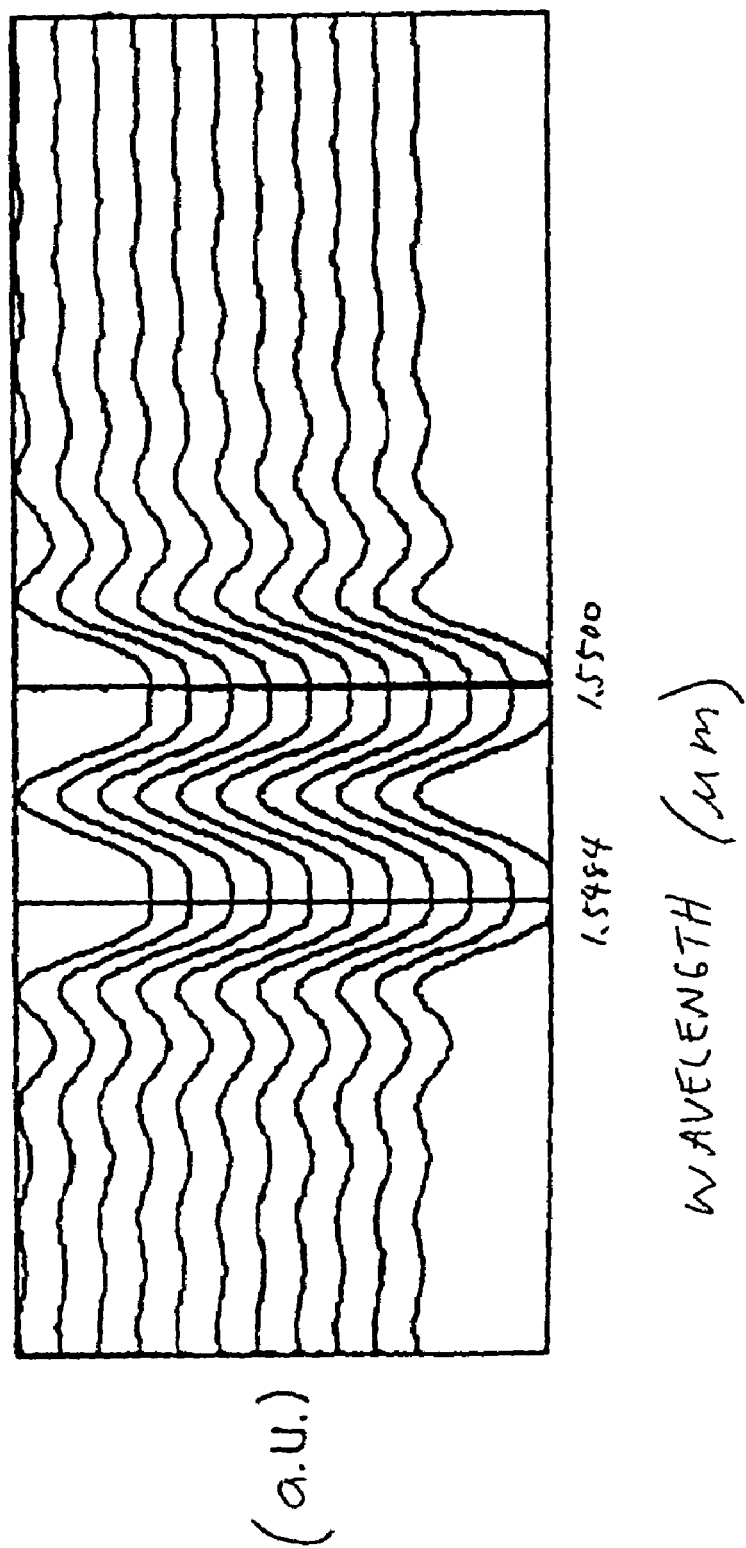
FIG. 21 is a graph illustrating band-rejection filter characteristics of the first AOTF 1 shown in FIG. 14 observed at different times, according to an embodiment of the present invention.

FIGS. 20 and 21 are graphs illustrating band-rejection characteristics obtained by integrating the characteristics of first AOTF 1 and second AOTF 2 shown in FIG. 14 obtained at different times, according to an embodiment of the present invention. Variations in the central frequencies shown in FIGS. 20 and 21 are less than those shown in FIGS. 6 and 7.

Figure 22:
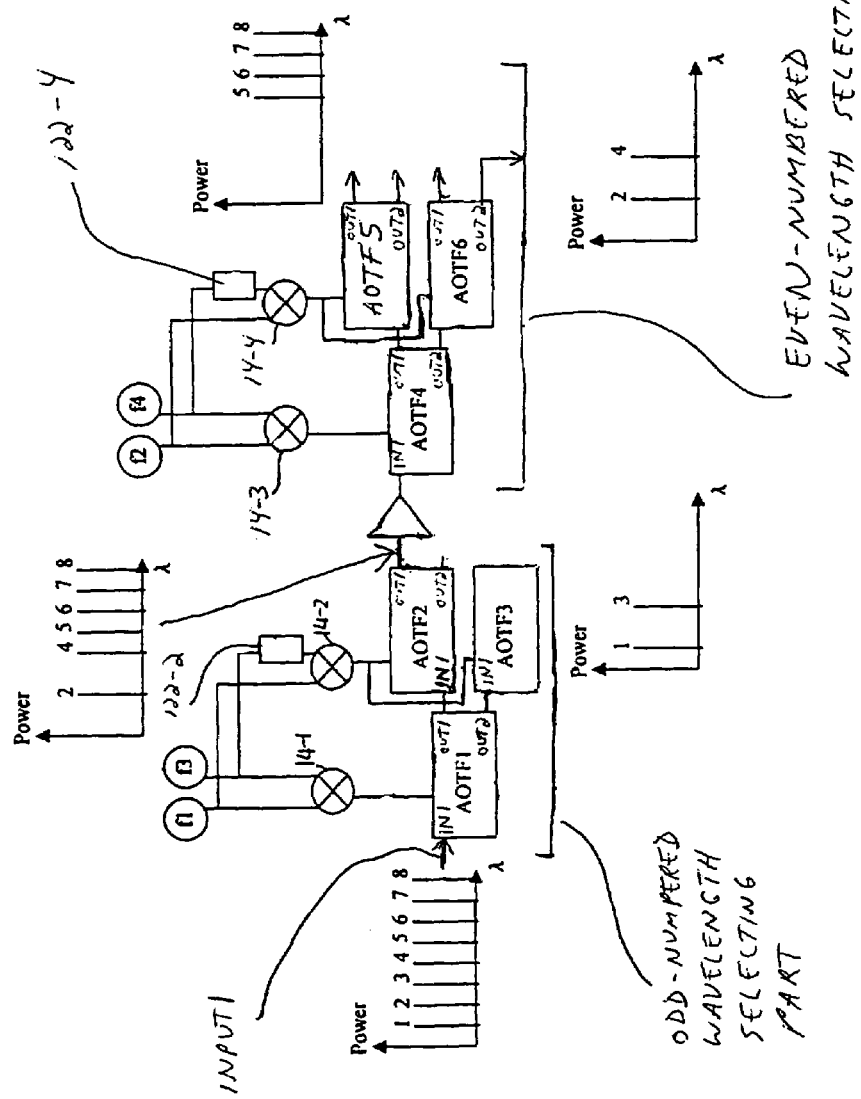
FIG. 22 is a diagram illustrating the configuration in FIG. 3 accomplished by the configuration in FIG. 14, according to an embodiment of the present invention.

FIG. 22 is a diagram illustrating an AOTF configuration which accomplishes the configuration shown in FIG. 3 by using the configuration shown in FIG. 14 which can suppress wavelength variations of the filters, according to an embodiment of the present invention. Referring now to FIG. 22, the connections from first AOTF 1 to third AOTF 3 that form the odd-numbered wavelength selecting part for selecting the odd-numbered wavelengths and the RF signals are the same as those in the configuration shown in FIG. 14.

The connections from a fourth AOTF 4 to a sixth AOTF 6 that form the even-numbered wavelength selecting part for selecting the even-numbered wavelengths are the same as shown in FIG. 14. The RF signals are directed to selecting wavelengths 2 and 4. The RF signal of the frequency f4 used for selecting wavelength 4 among the RF signals applied to the fifth and sixth AOTFs is offset by 180 degrees by a phase shifter 122-4 with respect to the original phase thereof.

With the above configuration, it is possible to individually extract any of the wavelengths while suppressing variations in the pass-through or branching wavelengths.

Figure 23:
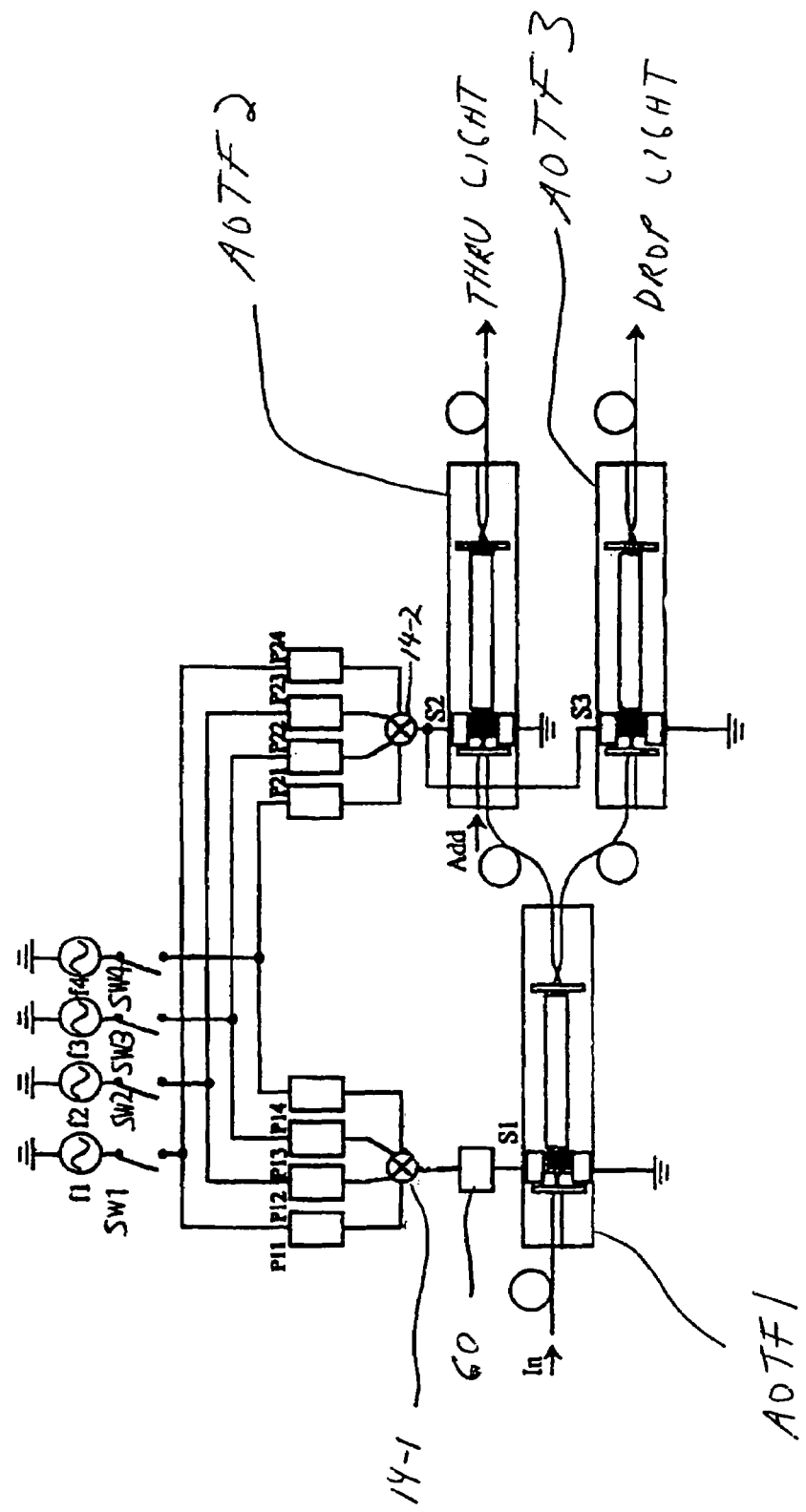
FIG. 23 is a diagram illustrating a four-wavelength band-pass/band-rejection filter using the configuration shown in FIG. 14, according to an embodiment of the present invention.

FIG. 23 is a diagram illustrating an AOTF configuration in which four wavelengths are selected by using the configuration shown in FIG. 14, according to an embodiment of the present invention. Referring now to FIG. 23, the RF signals of the frequencies f1 (176.978 MHz), f2 (176.795 MHz), f3 (176.613 MHz) and f4 (176.431 MHz) respectively corresponding to wavelengths 1.5468 μm, 1.5484 μm, 1.5500 μm and 1.5516 μm to be selected are applied to couplers 14-1 and 14-2 via switches SW1, SW2, SW3 and SW4 and phase shifters P11, P12, P13, P14, P21, P22, P23 and P24.

The output of coupler 14-1 is input to first AOTF 1 via a power control part 60. The output of coupler 14-2 is input to second AOTF 2 and third AOTF 3.

FIG. 24 is a diagram illustrating an example of the relative phases of the phase shifters in FIG. 23, according to an embodiment of the present invention. More specifically, as indicated in FIG. 24, phase shifters P23 and P21 are set so as to have an offset of 180 degrees with respect to the original phases of the RF signals having the frequencies f2 and f4. The other phase shifters are set so that the received signals are applied to the couplers without any phase offset.

Figure 25A:
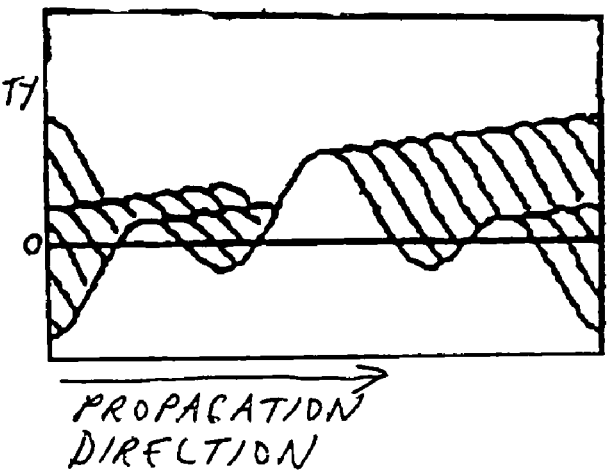
FIGS. 25(A) and 25(B) are diagrams illustrating a time-based variation in the beat signal observed when a four-wavelength band-pass/band-rejection filter is formed by the configuration shown in FIG. 23, according to an embodiment of the present invention.
Figure 25B:
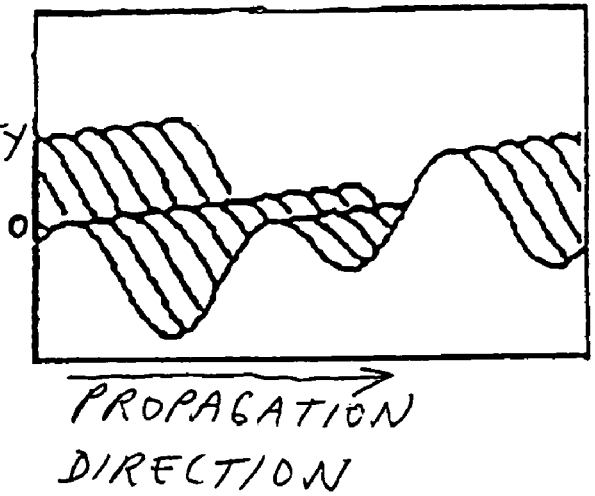

FIGS. 25(A) and 25(B) are graphs illustrating time-based variations in the peak intensities of the RF signals obtained under the phase condition shown in FIG. 24, according to an embodiment of the present invention. More specifically, FIG. 25(A) shows a variation in the peak intensity of the beat component caused by the RF signals applied to first AOTF 1 as a function of time. Thus, FIG. 25(A) shows the variation for the first stage of the AOTF configuration. FIG. 25(B) shows a variation in the peak intensities of the beat components of the RF signals applied to second AOTF 2 and third AOTF 3 as a function of time. Thus, FIG. 25(B) shows the variation for the second stage of the AOTF configuration.

Figure 26:
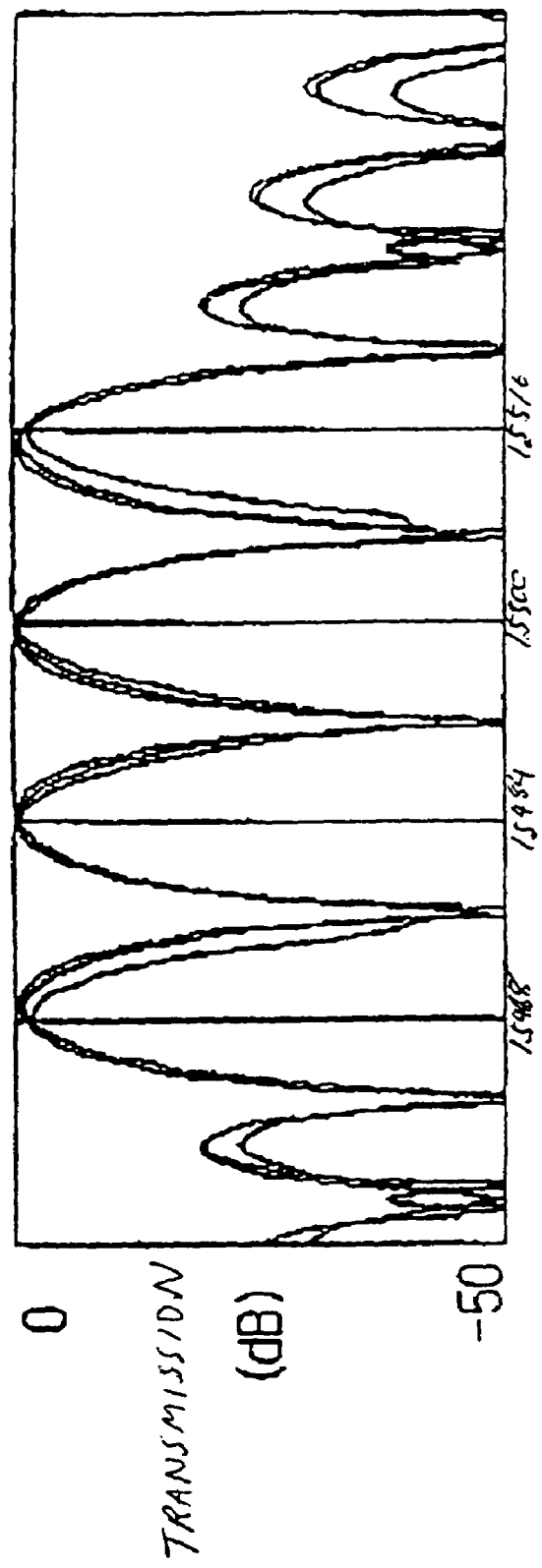
FIG. 26 is a graph illustrating a characteristic of a four-wavelength band-pass filter formed by the configuration shown in FIG. 23, according to an embodiment of the present invention.

FIG. 26 is a graph illustrating a band-pass characteristic obtained by integrating the characteristics of first AOTF 1 and third AOTF 3 shown in FIG. 23 obtained at different times, according to an embodiment of the present invention.

Figure 27:
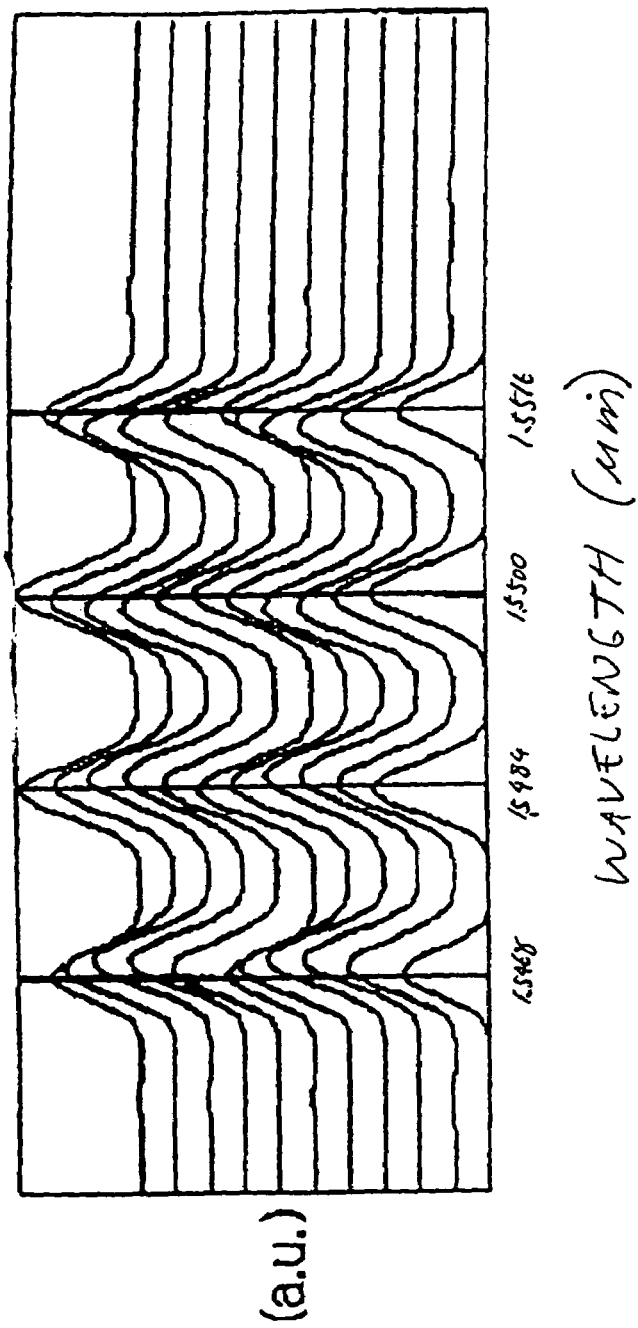
FIG. 27 is a graph illustrating the characteristic of the four-wavelength band-pass filter formed by the configuration shown in FIG. 23, according to an embodiment of the present invention.

FIG. 27 is a graph illustrating a characteristic obtained by extending the characteristic of FIG. 26 on the time basis, according to an embodiment of the present invention. Variations in the central frequencies of the band-pass filter shown in FIGS. 26 and 27 are less than those shown in FIGS. 8 and 9.

Figure 28:
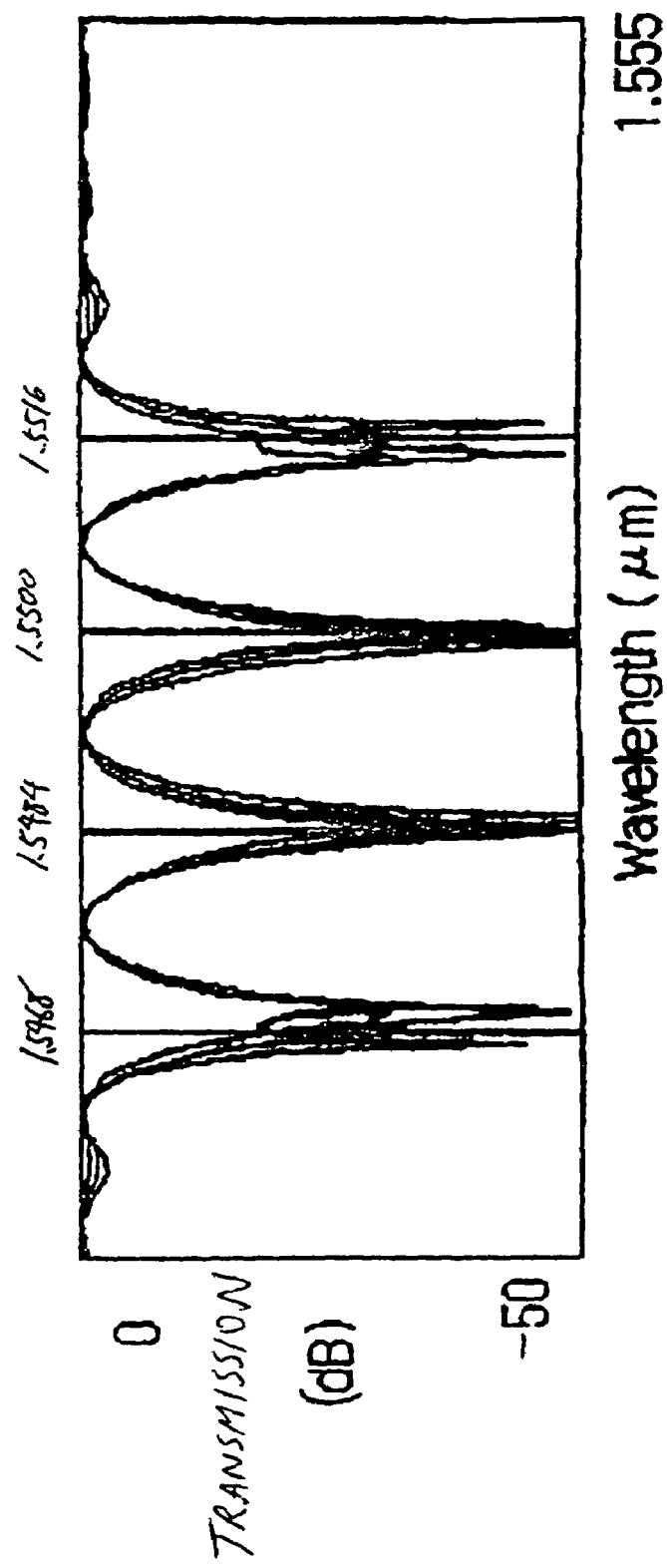
FIG. 28 is a graph illustrating a characteristic of a four-wavelength band-rejection filter formed by the configuration shown in FIG. 23, according to an embodiment of the present invention.

FIG. 28 is a graph illustrating a band-rejection characteristic obtained by integrating the characteristics of first AOTF 1 and second AOTF 2 shown in FIG. 23 obtained at different times, according to an embodiment of the present invention.

Figure 29:
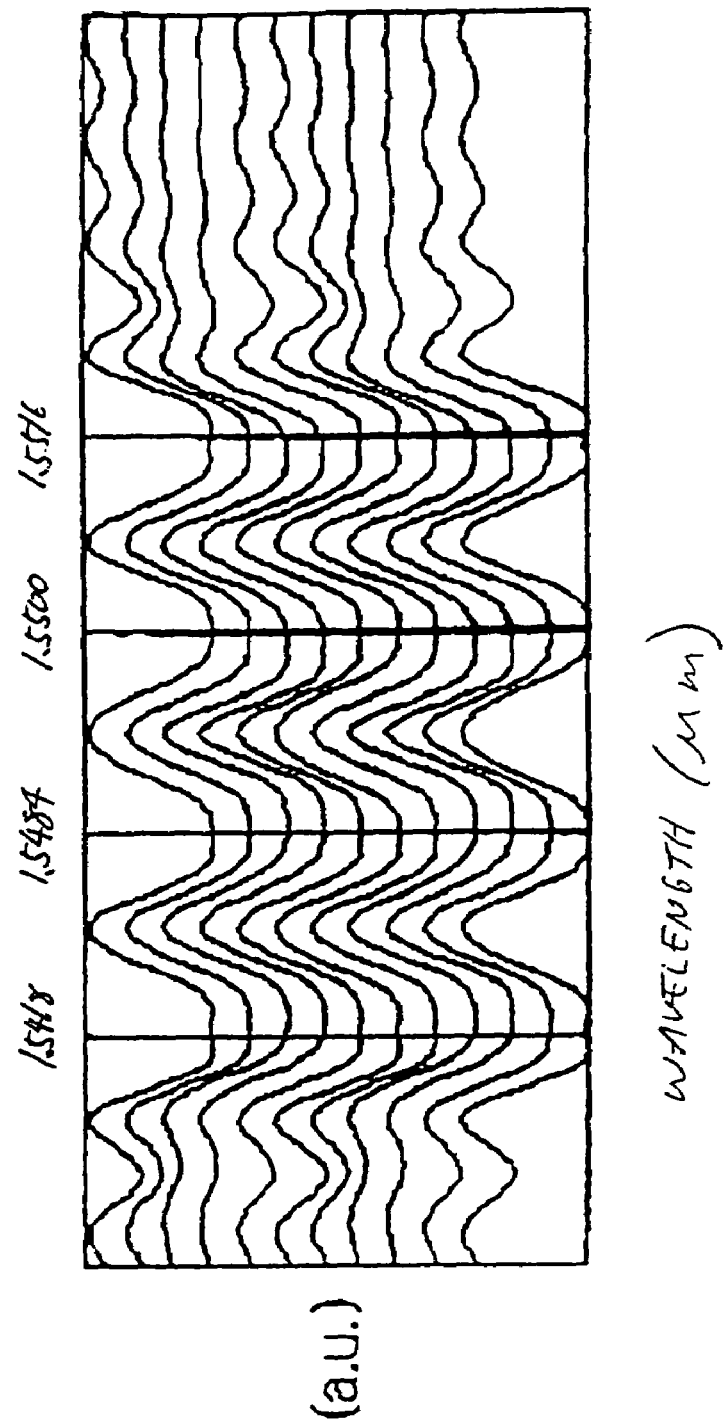
FIG. 29 is a graph illustrating characteristics of the four-wavelength band-rejection filter formed by the configuration shown in FIG. 23, according to an embodiment of the present invention.

FIG. 29 is a graph illustrating a characteristic obtained by extending the characteristic of FIG. 28 on the time basis, according to an embodiment of the present invention. Variations in the central frequencies of the band-rejection filter shown in FIGS. 28 and 29 are less than those shown in FIGS. 10 and 11.

FIG. 30 is a diagram illustrating an example of phase conditions for a case where wavelengths to be subjected to the band-pass/band-rejection operation are added to the configuration shown in FIG. 23, according to an embodiment of the present invention. The RF signals of the frequencies f5 and f6 are added, and, as indicated by FIG. 30, the phase of the RF signal of the frequency f6 applied to each of second AOTF 2 and third AOTF 3 is offset by 180 degrees with respect to the original phase thereof. It can be seen that it is enough to offset half of the RF signals applied to second AOTF 2 and third AOTF 3 by 180 degrees in order to shift the phases of the beat components of the RF signals applied to the AOTFs.

Figure 31:
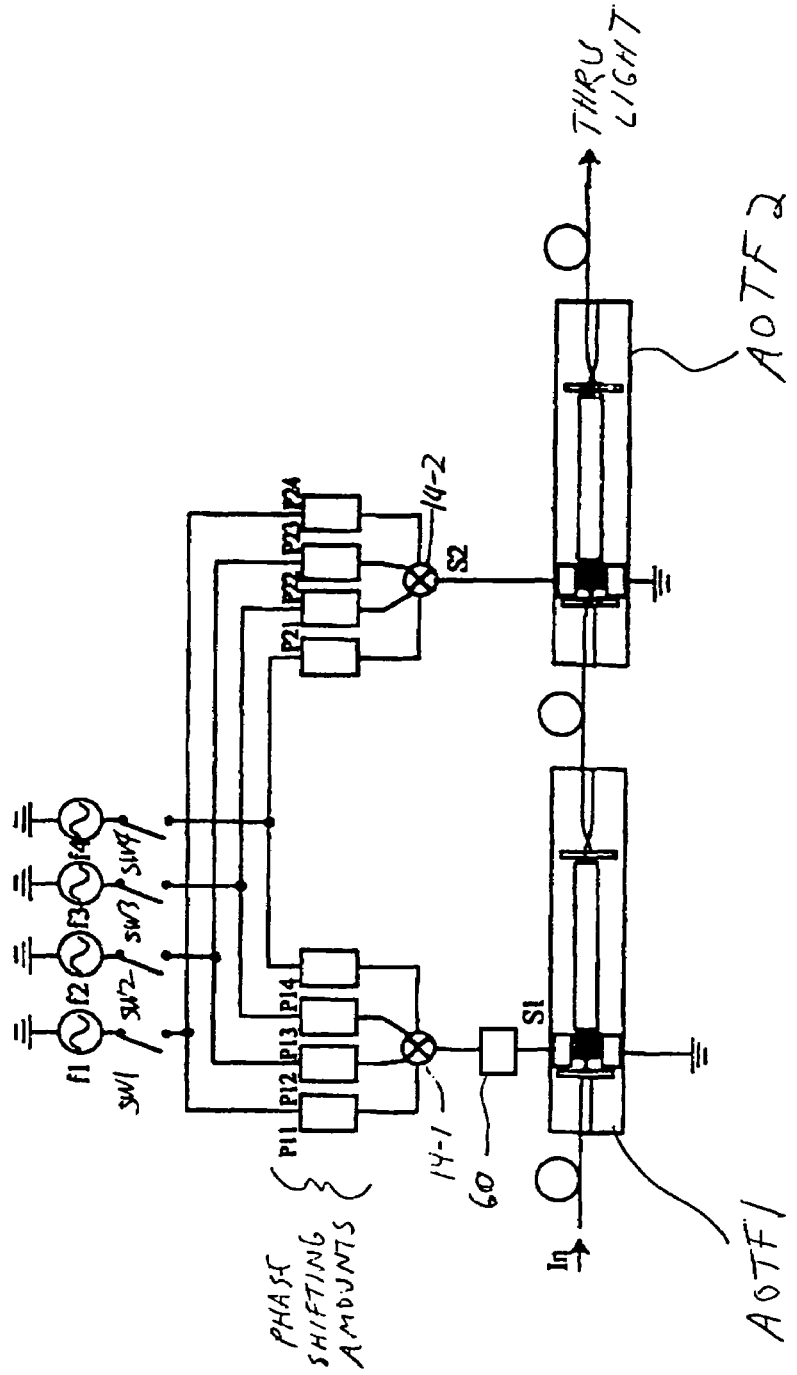
FIG. 31 is a diagram illustrating a band-rejection filter having two stages of AOTFs, according to an embodiment of the present invention.

FIG. 31 is a diagram illustrating the AOTF configuration shown in FIG. 23, which functions as a band-rejection filter, according to an embodiment of the present invention.

Figure 32:
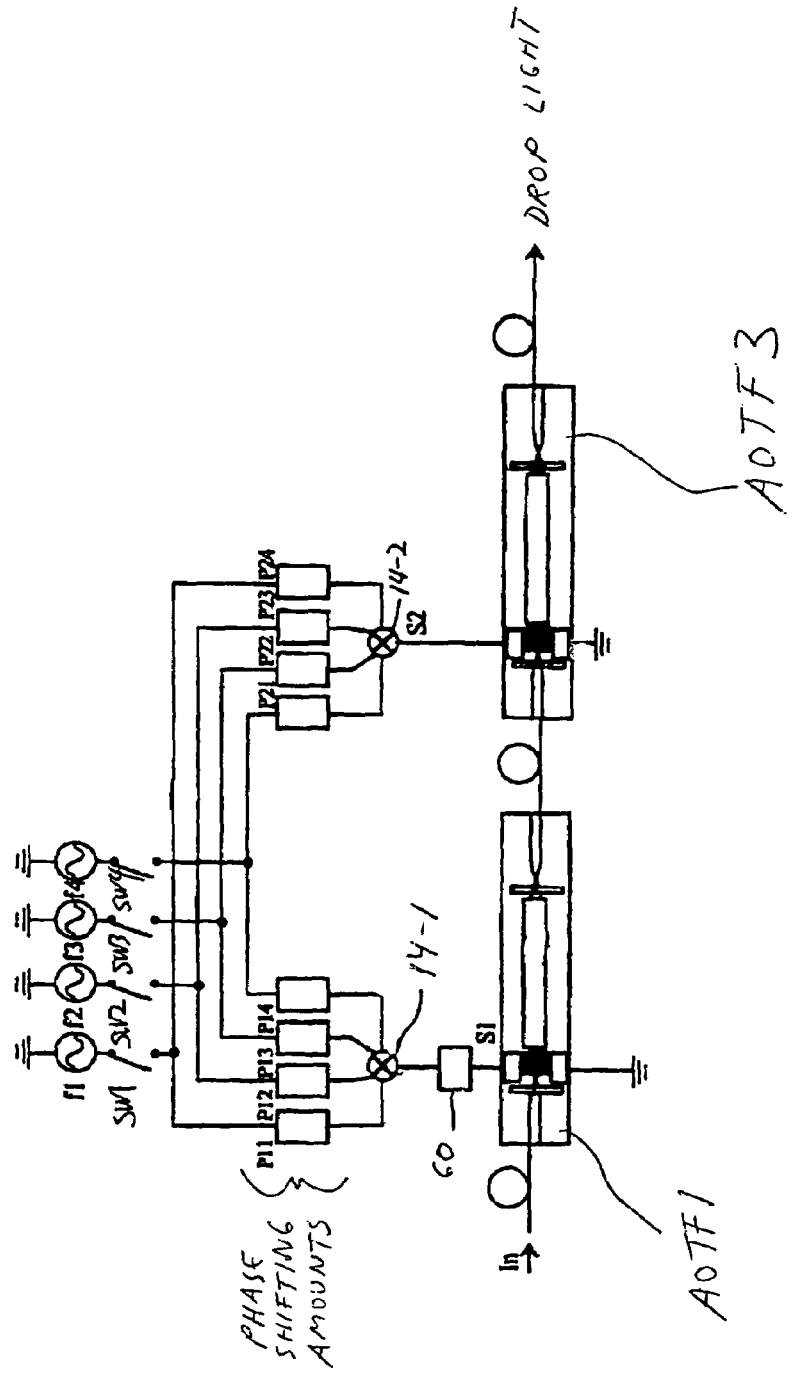
FIG. 32 is a diagram illustrating a band-pass filter having two stages of AOTFs, according to an embodiment of the present invention.

FIG. 32 is a diagram illustrating a variation of the AOTF configuration shown in FIG. 23, which functions as a band-pass filter, according to an embodiment of the present invention.

Figure 33:
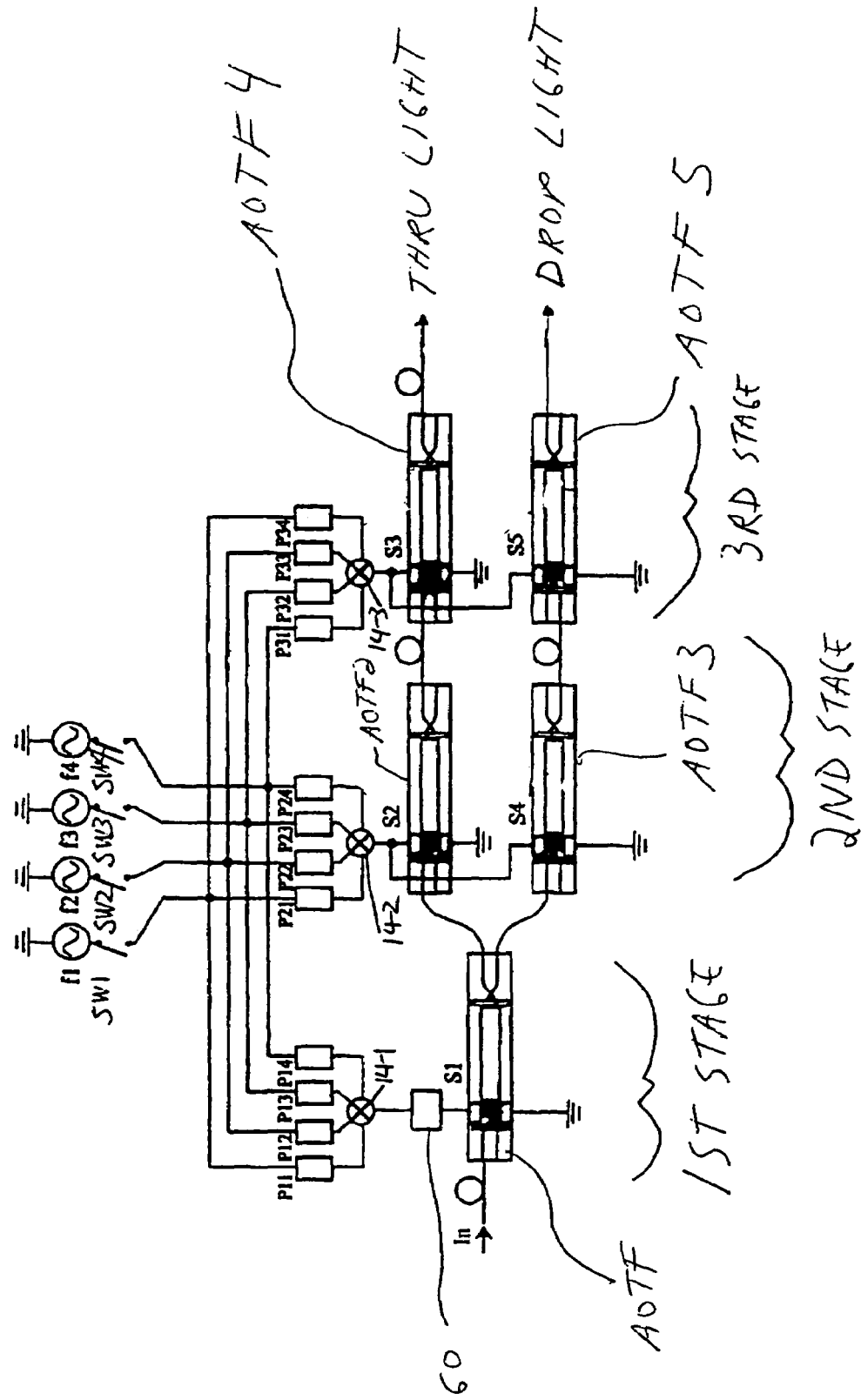
FIG. 33 is a diagram illustrating a band-pass/band-rejection filter having three stages of AOTFs, according to an embodiment of the present invention.

FIG. 33 is a diagram illustrating a variation of the configuration shown in FIG. 23, according to an embodiment of the present invention. Referring now to FIG. 33, a fourth AOTF 4 and a fifth AOTF 5 of a third stage follow second AOTF 2 and third AOTF 3 of the second stage in order to suppress time-based variations in the central frequencies in the band-pass/band-rejection operations.

FIG. 34 is a diagram illustrating an example of phase conditions of the configuration in FIG. 33, according to an embodiment of the present invention. More specifically, FIG. 34 shows phase conditions of phase shifters that are employed when switches SW1 and SW2 in the configuration shown in FIG. 33 are turned ON, and the RF signals of the frequencies f1 and f2 are applied to the first to fifth AOTFs. Phase shifter P22 that supplies the RF signals to second AOTF 2 and third AOTF 3 is set to provide an offset of 120 degrees to the phase of the frequency f2. Phase shifter P33 that supplies the RF signals to fourth AOTF 4 and fifth AOTF 5 is set to provide an offset of 240 degrees with respect to the phase of the frequency f2.

Figure 35:
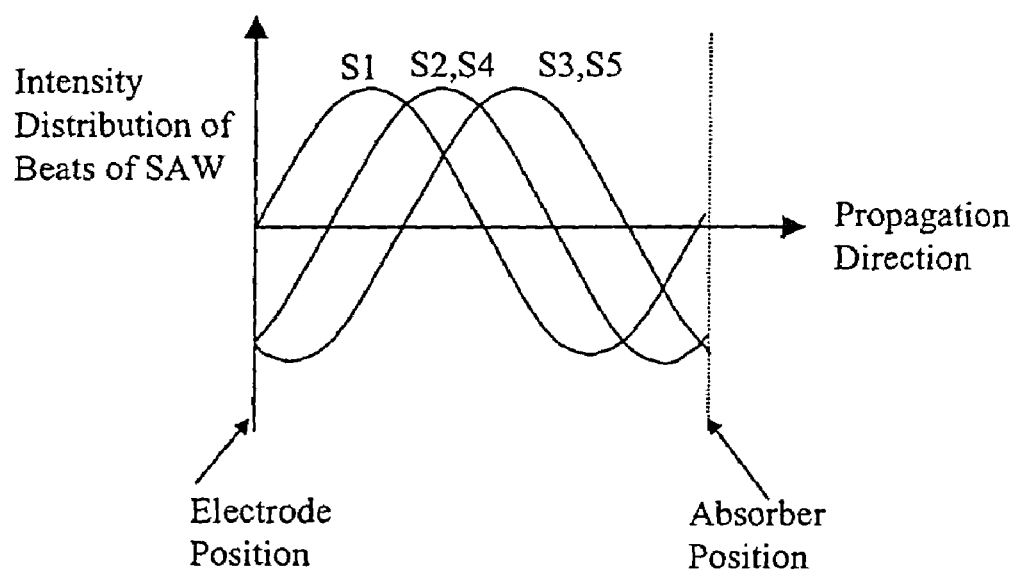
FIG. 35 is a diagram illustrating an intensity distribution of a beat of surface acoustic waves in the configuration shown in FIG. 33, according to an embodiment of the present invention.

FIG. 35 is a diagram illustrating a peak intensity distribution of the surface acoustic waves from the electrode to the SAW absorber under the phase condition shown in FIG. 34, according to an embodiment of the present invention. Thus, FIG. 35 illustrates the case for a three-stage AOTF configuration. Referring now to FIG. 35, S1 indicates an intensity distribution of the beat component of the surface acoustic waves in first AOTF 1. S2 and S4 respectively indicate intensity distributions of the beat components of the surface acoustic waves in second AOTF 2 and third AOTF 3. S3 and S5 respectively indicate intensity distributions of the beat components of the surface acoustic waves in fourth AOTF 4 and fifth AOTF 5. FIG. 35 illustrates a case when two channels are selected. The phase difference between beats is 60°.

Figure 36A:
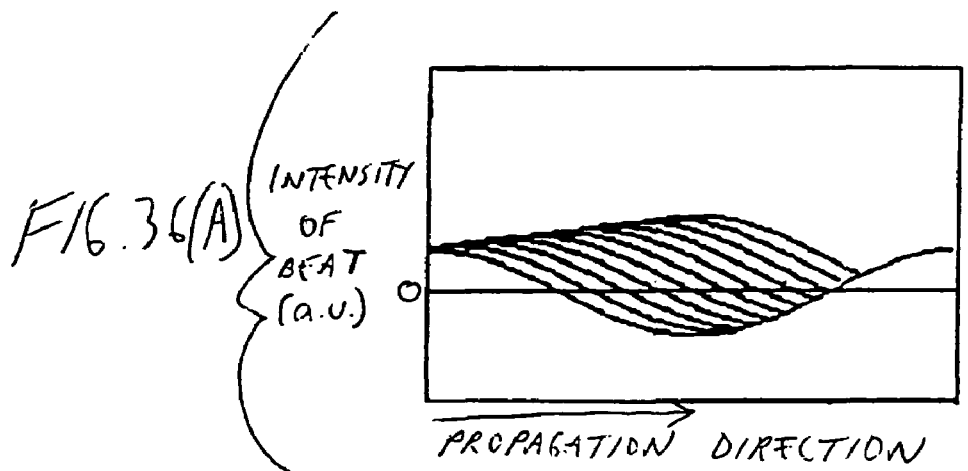
FIGS. 36(A), 36(B) and 36(C) are diagrams illustrating a variation in the beat component resulting from RF signals of two wavelengths in the configuration shown in FIG. 33, according to an embodiment of the present invention.
Figure 36B:
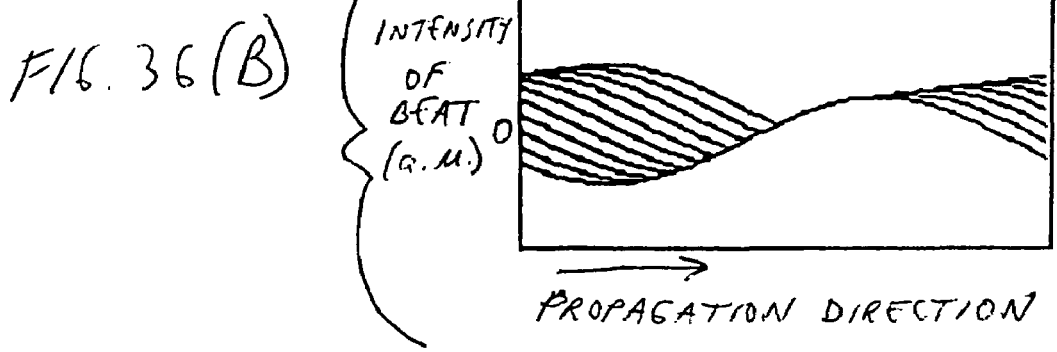
Figure 36C:
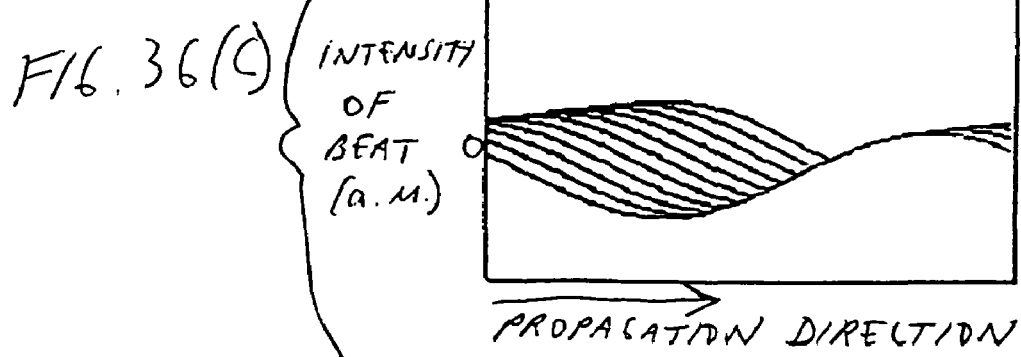

FIGS. 36(A), 36(B) and 36(C) are diagrams illustrating the phases of the peaks of the beat components of the RF signals in the respective AOTFs shown in FIG. 33 with the RF signals of f1 and f2 applied thereto, according to an embodiment of the present invention.

More specifically, FIG. 36(A) shows the phase of the peak of the beat component resulting from the RF signals in first AOTF 1 of the first stage. FIG. 36(B) shows the phases of the peaks of the beat components of the RF signals in second AOTF 2 and third AOTF 3 of the second stage. FIG. 36(C) shows the phases of the peaks of the beat components of the RF signals in fourth AOTF 4 and fifth AOTF 5 of the third stage.

Figure 37:
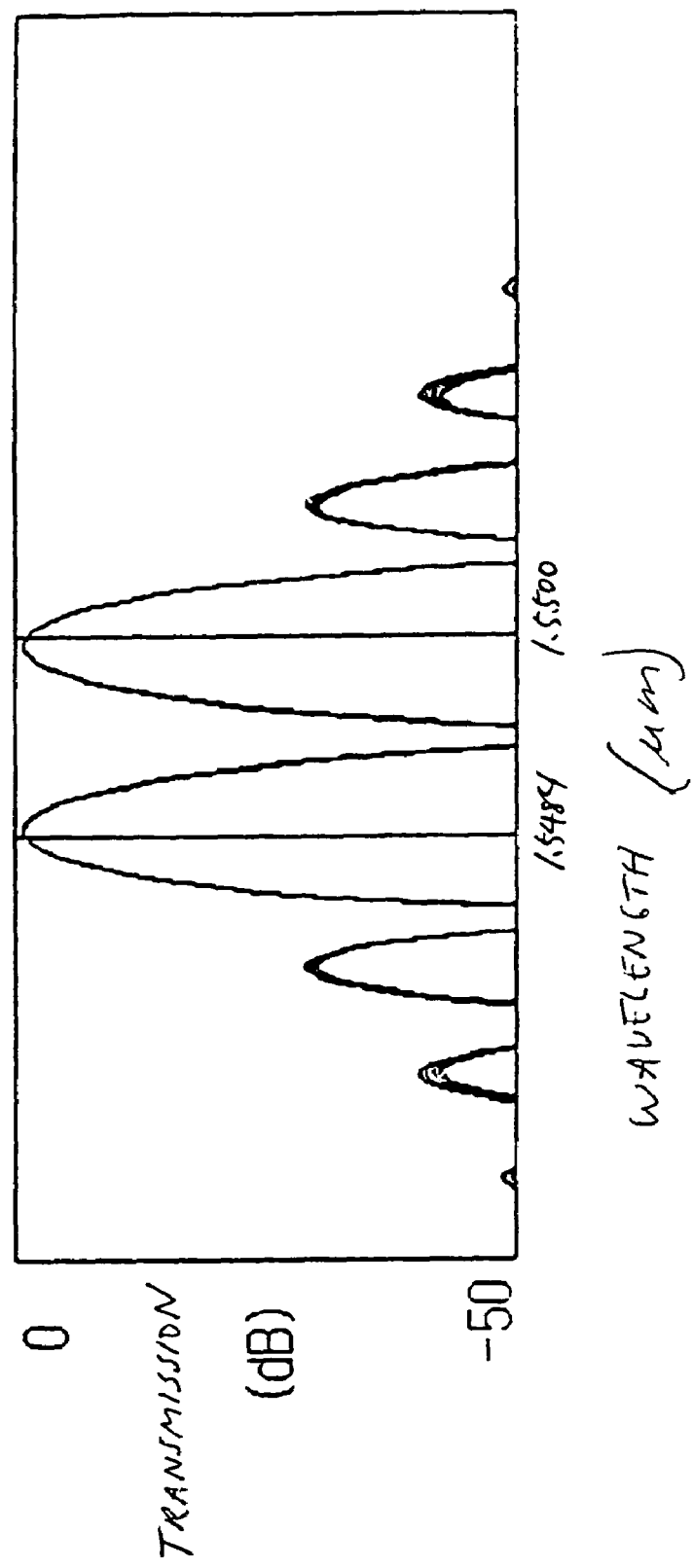
FIG. 37 is a graph illustrating a characteristic of a two-wavelength band-pass filter using the configuration shown in FIG. 33, according to an embodiment of the present invention.

FIG. 37 is a graph illustrating a band-pass characteristic obtained by integrating the characteristics of first AOTF 1 and third AOTF 3 shown in FIG. 33 with the RF signals of f1 and f2, and obtained at different times, according to an embodiment of the present invention.

Figure 38:
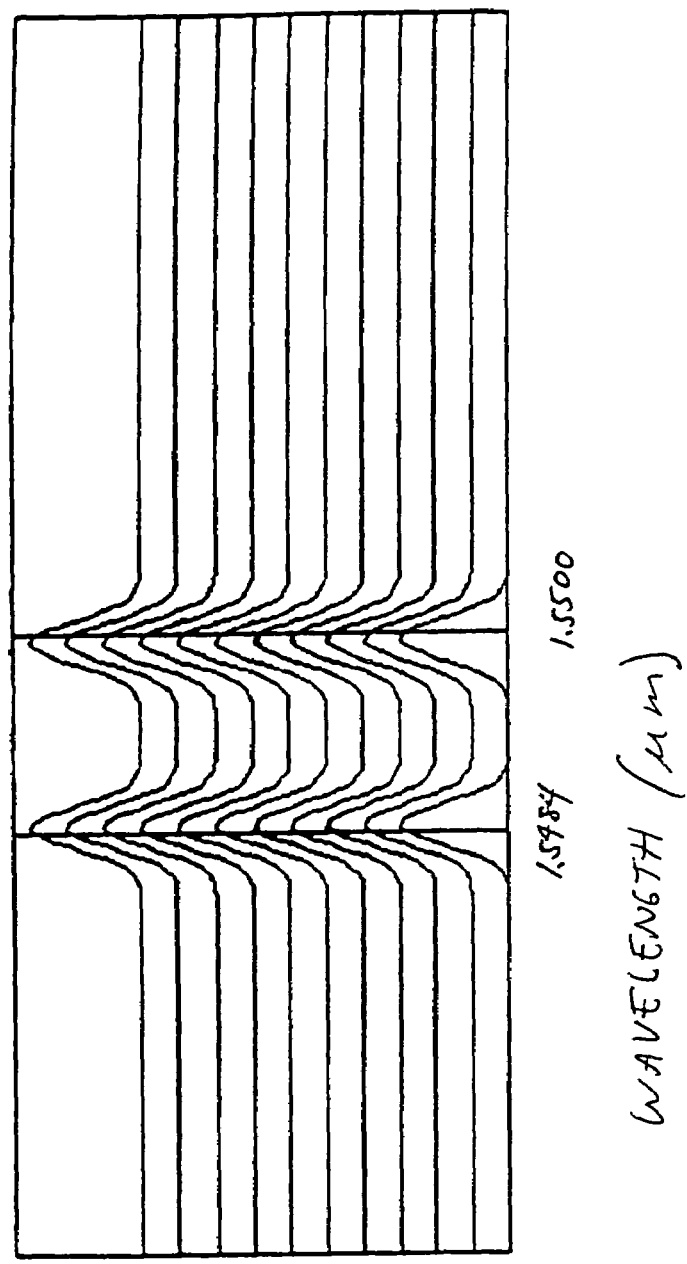
FIG. 38 is a graph illustrating a characteristic of the two-wavelength band-pass filter using the configuration shown in FIG. 33, according to an embodiment of the present invention.

FIG. 38 is a graph illustrating a characteristic obtained by extending the wavelength characteristic shown in FIG. 37 on a time basis, according to an embodiment of the present invention. The time-based variations in the characteristics of the band-pass filter shown in FIGS. 37 and 38 are the smallest among those shown FIGS. 4, 5, 18 and 19.

Figure 39:
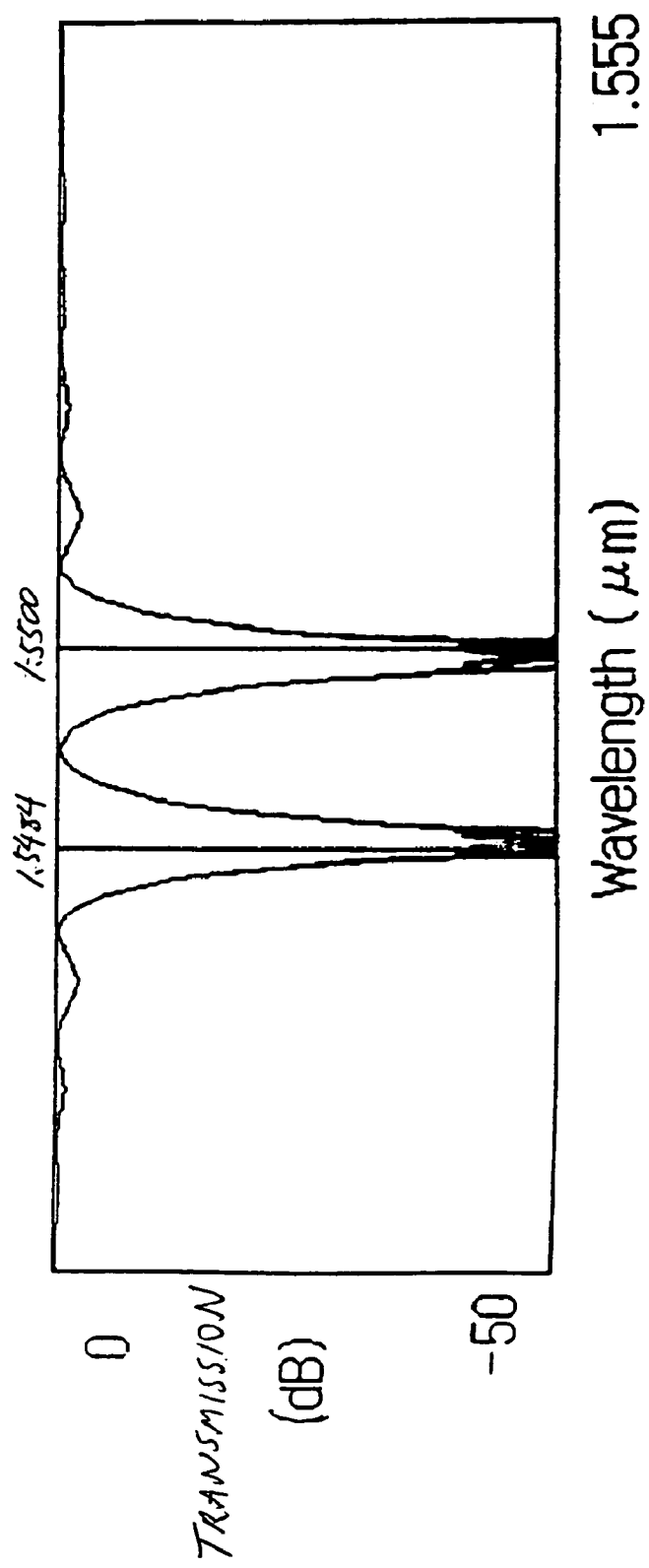
FIG. 39 is a graph illustrating a characteristic of a two-wavelength band-rejection filter using the configuration shown in FIG. 33, according to an embodiment of the present invention.

FIG. 39 is a graph illustrating a band-rejection characteristic obtained by integrating the characteristics of the second AOTF 2 and the fourth AOTF 4 shown in FIG. 33 with the RF signals of f1 and f2, and obtained at different times, according to an embodiment of the present invention.

Figure 40:
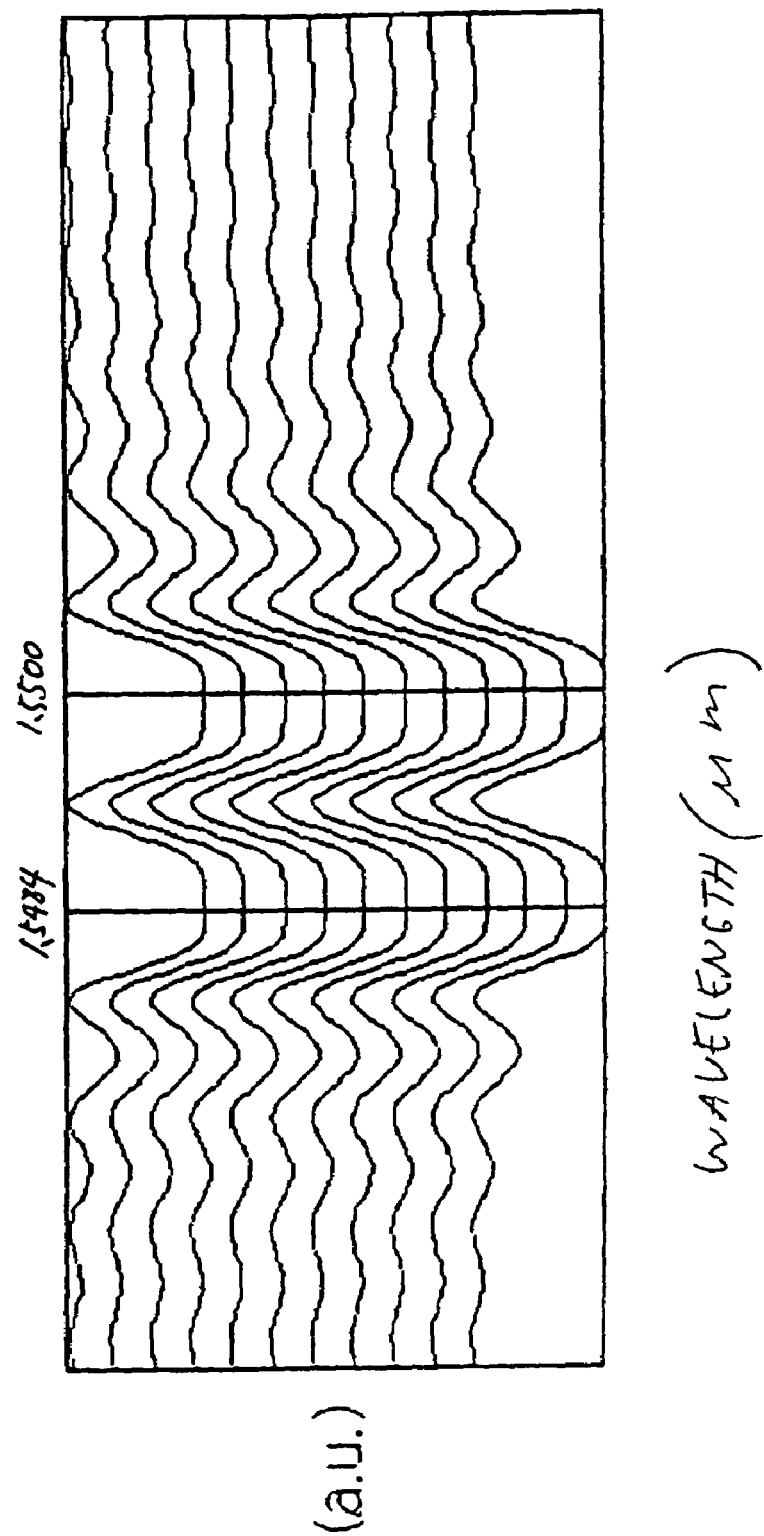
FIG. 40 is another diagram of the characteristic of the two-wavelength band-rejection filter using the configuration shown in FIG. 33, according to an embodiment of the present invention.

FIG. 40 is a graph illustrating a characteristic obtained by extending the wavelength characteristic shown in FIG. 39 on a time basis, according to an embodiment of the present invention. The time-based variations in the characteristics of the band-rejection filter shown in FIGS. 39 and 40 are the smallest among those shown FIGS. 6, 7, 20 and 21.

FIG. 41 is a diagram illustrating phase conditions of beat components of the RF signals in the respective stages obtained when the switches SW1 through SW4 in the configuration shown in FIG. 33 are turned ON, and four wavelengths are subjected to the band-pass or band-rejection operation, according to an embodiment of the present invention. As indicated in FIG. 41, the phase shifter P22 that supplies the RF signals to second AOTF 2 and third AOTF 3 is set to provide an offset of 120 degrees to the phase of the frequency f2. The phase shifter P23 is set to provide an offset of 240 degrees with respect to the phase of the frequency f3. The phase shifter P33 that supplies the RF signals to fourth AOTF 4 and fifth AOTF 5 is set to provide and offset of 240 degrees with respect to the phase of the frequency f2. The phase shifter P32 is set to provide an offset of 120 degrees with respect to the phase of the frequency f2.

FIGS. 42(A), 42(B) and 42(C) are graphs illustrating time-based peak variations in the beat components of the RF signals applied to the respective AOTFs under the above phase conditions, according to an embodiment of the present invention.

More specifically, FIG. 42(A) shows the phase of the peak of the beat component of the RF signals in the first AOTF 1 of the first stage. FIG. 42(B) shows the phases of the peaks of the beat components of the RF signals in the second AOTF 2 and the third AOTF 3 of the second stage. FIG. 42(C) shows the phases of the peaks of the beat components of the RF signals in the fourth AOTF 4 and the fifth AOTF 5 of the third stage.

Figure 43:
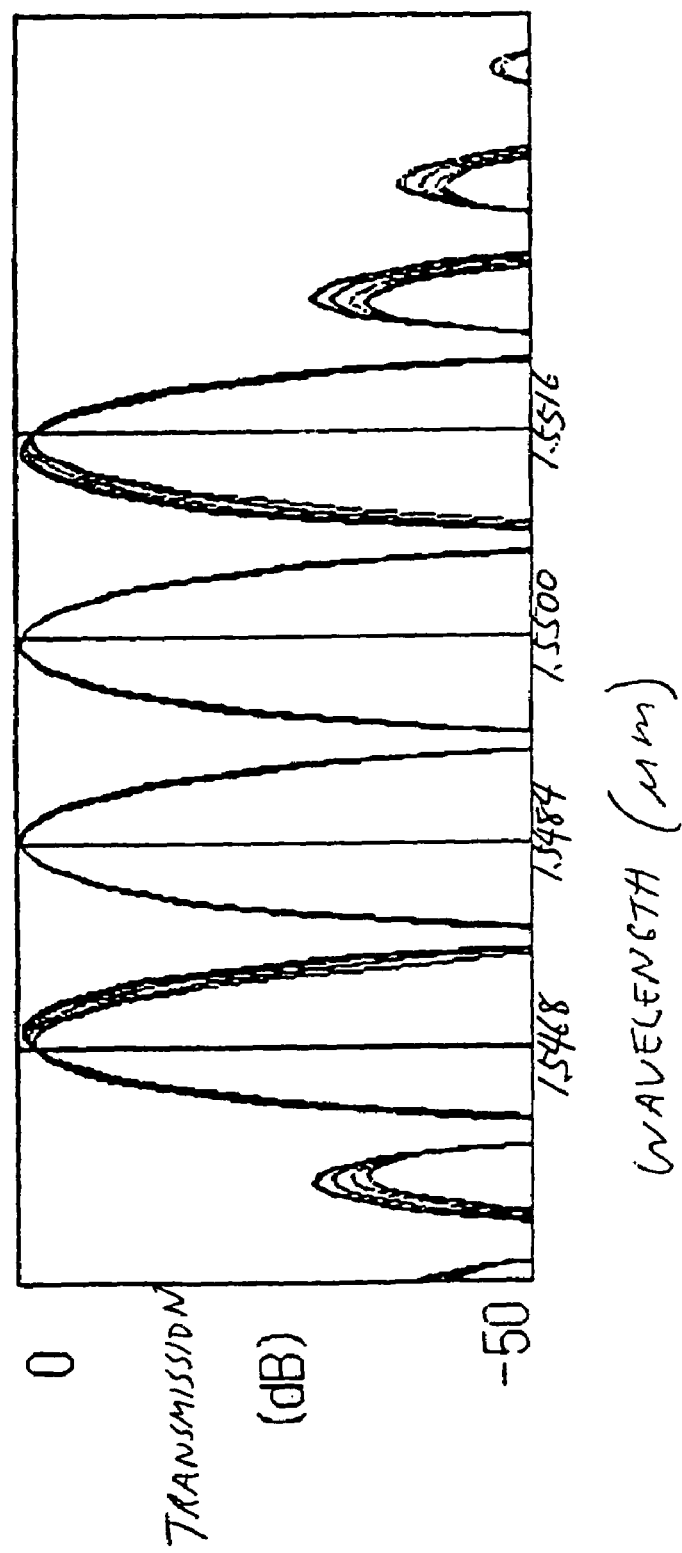
FIG. 43 is a graph illustrating a characteristic of a four-wavelength band-pass filter using the configuration shown in FIG. 33, according to an embodiment of the present invention.

FIG. 43 is a graph illustrating a wavelength characteristic obtained by integrating the time-based band-pass filter characteristics of the first, third and fifth AOTFs in the configuration shown in FIG. 33 with the phase conditions of FIG. 42, according to an embodiment of the present invention.

Figure 44:
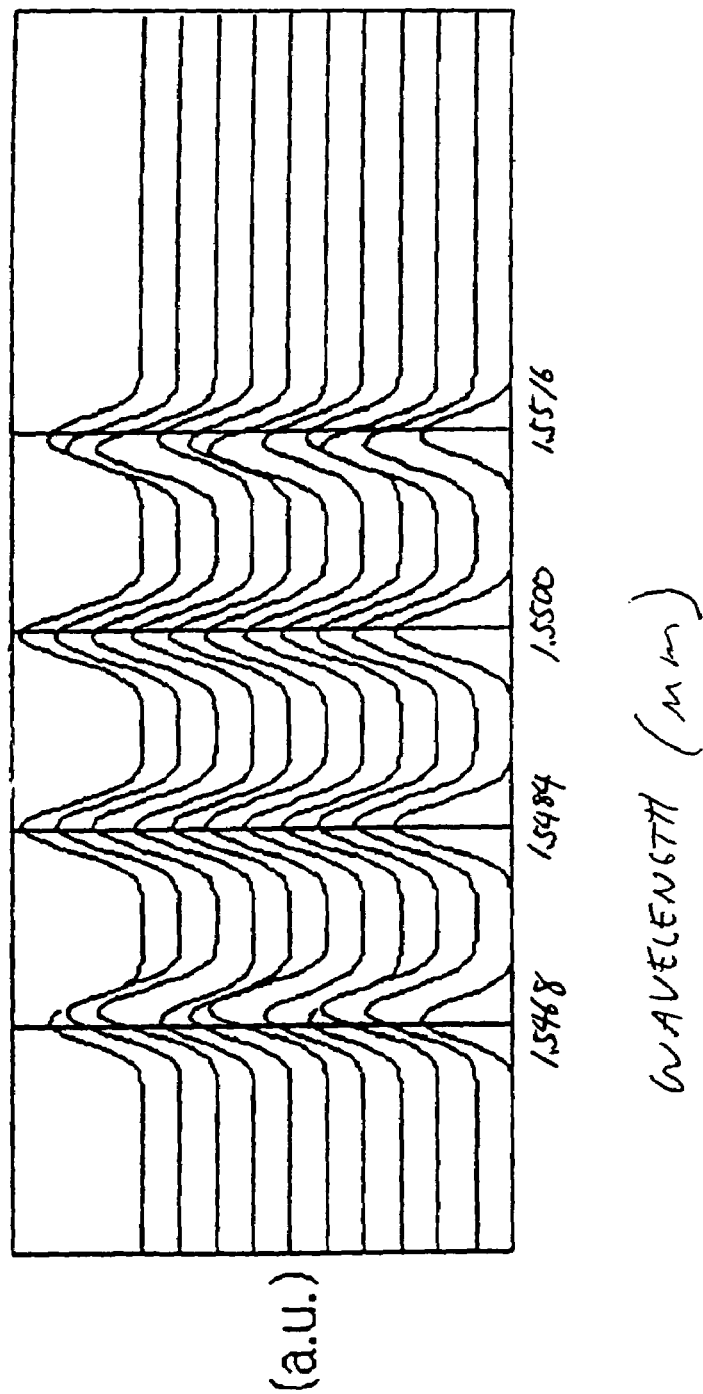
FIG. 44 is a graph illustrating the characteristic of the four-wavelength band-pass filter using the configuration shown in FIG. 33, according to an embodiment of the present invention.

FIG. 44 is a graph illustrating a characteristic obtained by extending the wavelength characteristic of FIG. 43 on the time basis, according to an embodiment of the present invention.

It can be seen that time-based variations in the characteristics of the band-pass filter shown in FIGS. 43 and 44 are less than those shown in FIGS. 8, 9, 26 and 27.

Figure 45:
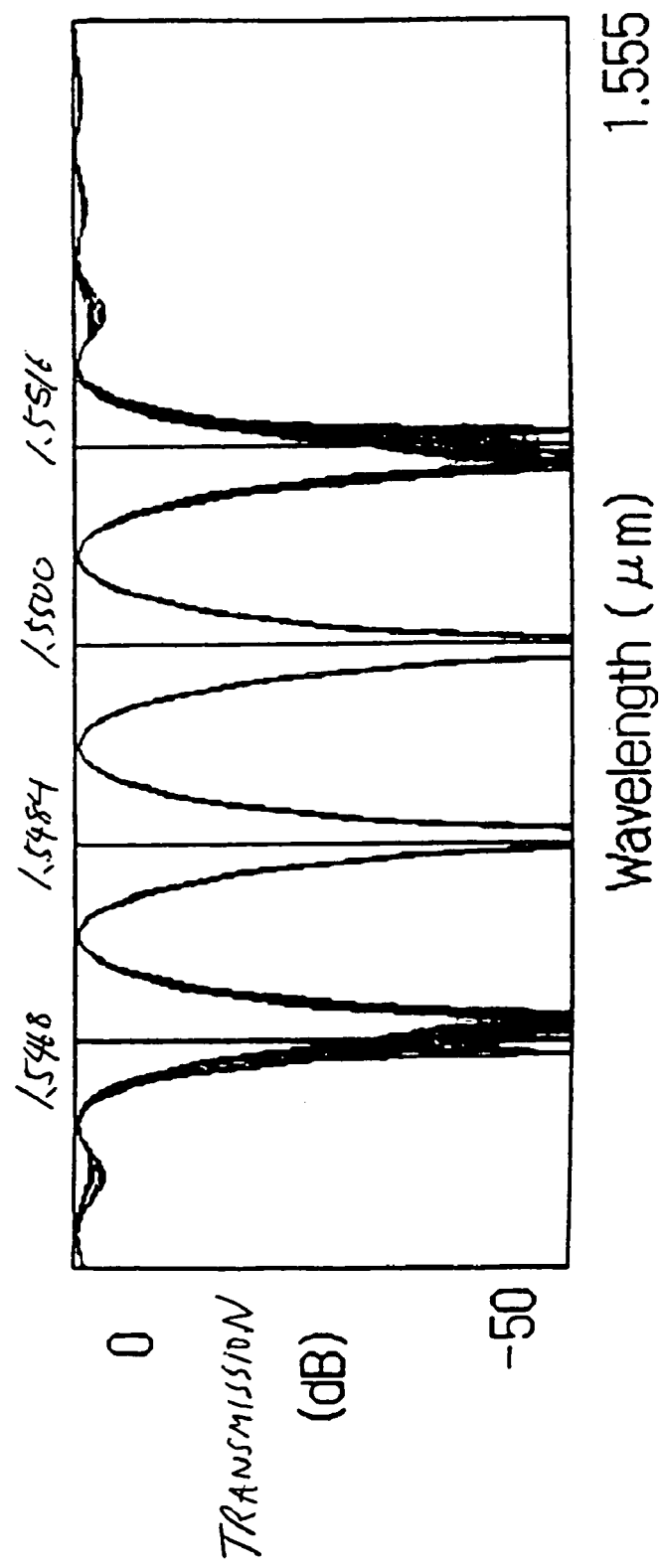
FIG. 45 is a graph illustrating a characteristic of a four-wavelength band-rejection filter using the configuration shown in FIG. 33, according to an embodiment of the present invention.

FIG. 45 is a graph illustrating a wavelength characteristic obtained by integrating the time-based band-rejection filter characteristics of the first, second and fourth AOTFs in the configuration shown in FIG. 33 with the phase conditions of FIG. 41, according to an embodiment of the present invention.

Figure 46:
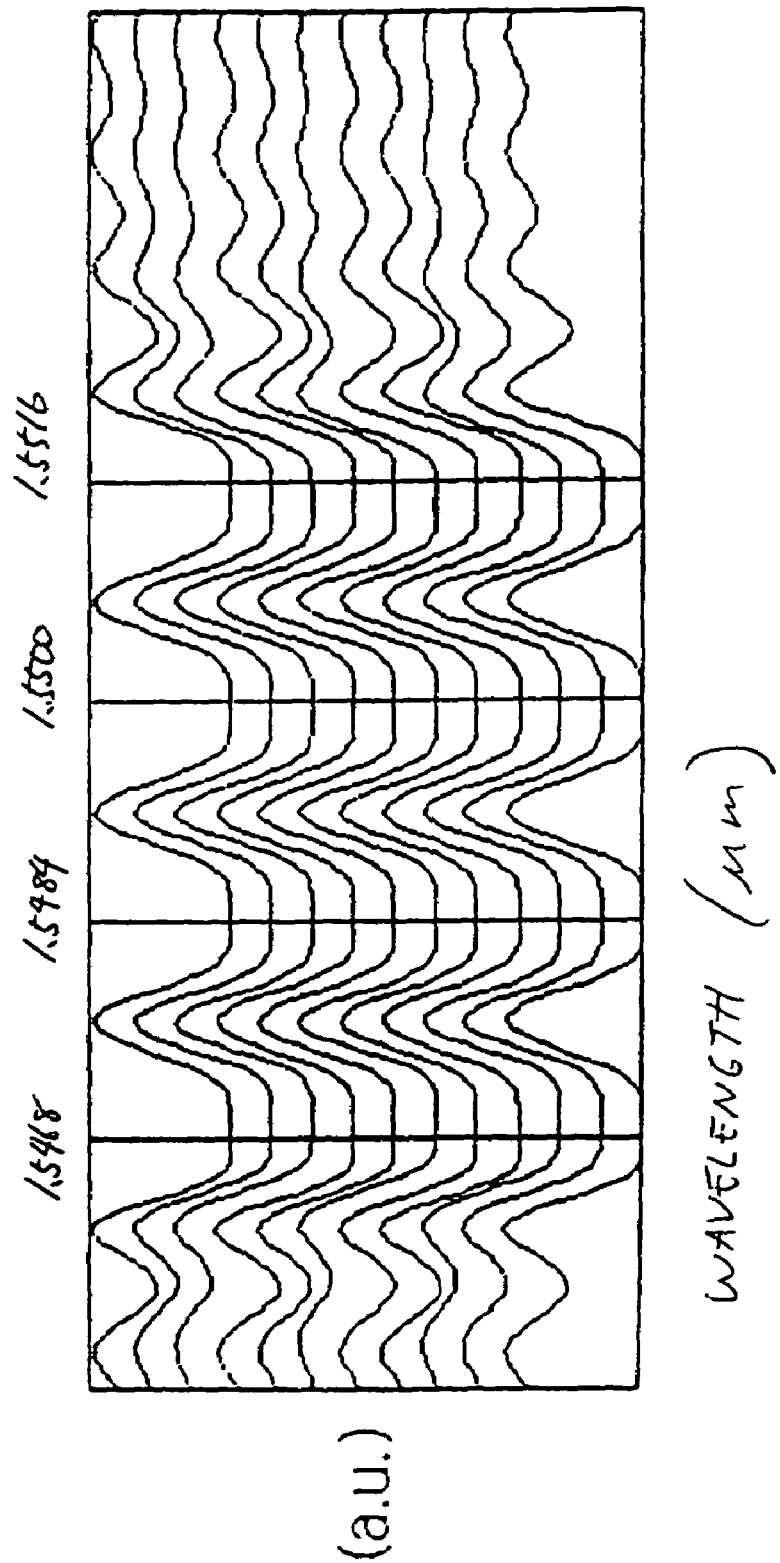
FIG. 46 is a graph illustrating a characteristic of the four-wavelength band-rejection filter using the configuration shown in FIG. 33, according to an embodiment of the present invention.

FIG. 46 is a diagram illustrating a characteristic obtained by extending the wavelength characteristic of FIG. 45 on a time basis, according to an embodiment of the present invention.

It can be seen that time-based variations in the characteristics of the band-pass filter shown in FIGS. 45 and 46 are less than those shown in FIGS. 10, 11, 28 and 29.

FIG. 47 is a diagram illustrating an example of phase relationships among RF signals respectively applied to AOTFs in a case where an increased number of wavelengths are to be selected in the configuration shown in FIG. 33, according to an embodiment of the present invention. As indicated in FIG. 47, the phases of the RF signals applied to second AOTF 2 and third AOTF 3 are increased by 120 degrees each time the number of wavelengths is increased by one, while the phases of the RF signals applied to fourth AOTF 4 and fifth AOTF 5 are decreased by 120 degrees each time the number of wavelengths is decreased by one. Thus, the peaks of the beat components of the RF signals can be shifted between the AOTFs, as shown in FIG. 42. Thus, it is possible to reduce time-based variations around the central frequencies in the band-pass/band-rejection characteristics.

Figure 48:
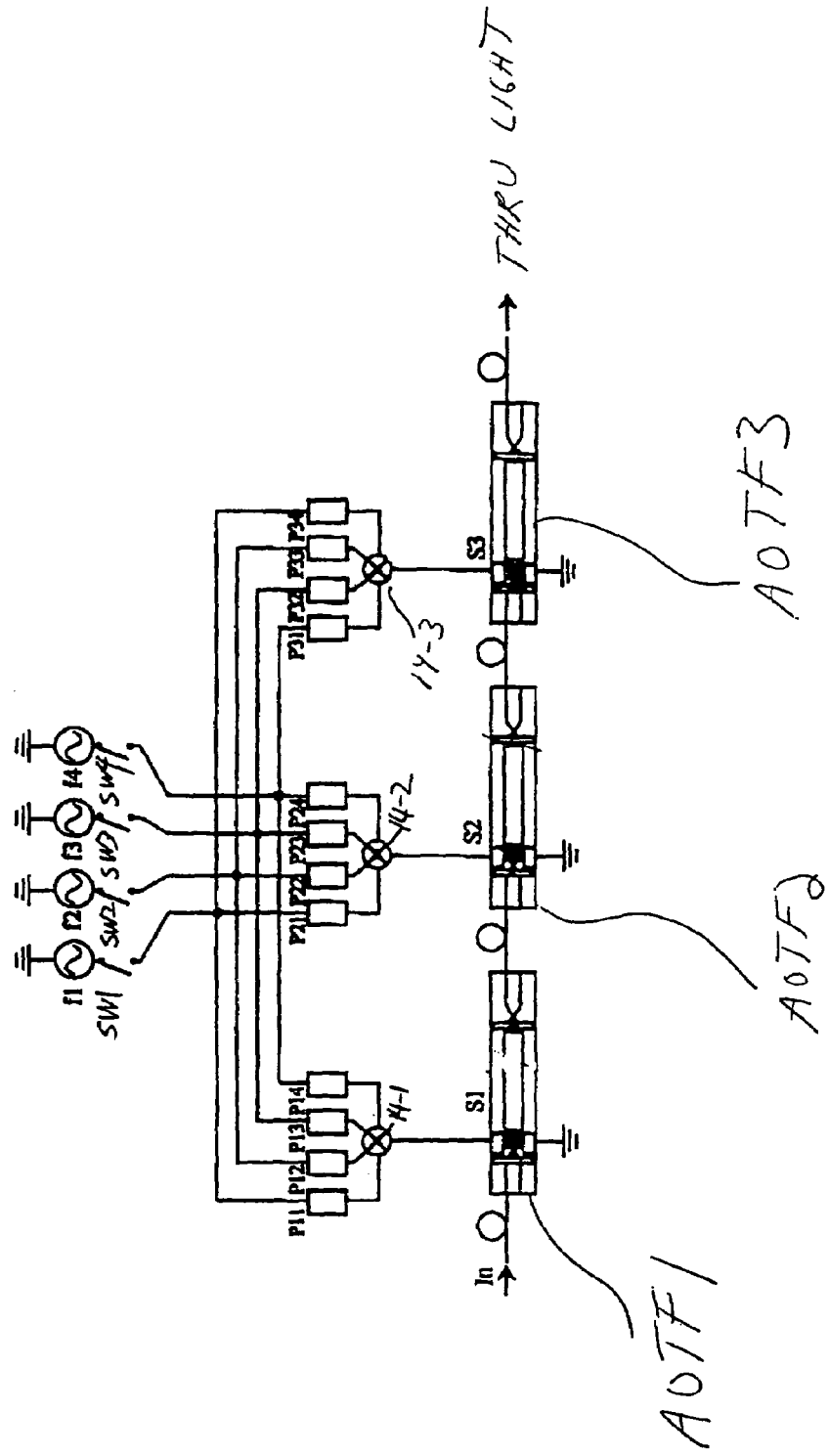
FIG. 48 is a diagram illustrating a band-rejection filter having a three-stage arrangement, according to an embodiment of the present invention.

FIG. 48 is a diagram illustrating a variation of the configuration shown in FIG. 33, operating as a band-rejection filter, according to an embodiment of the present invention.

Figure 49:
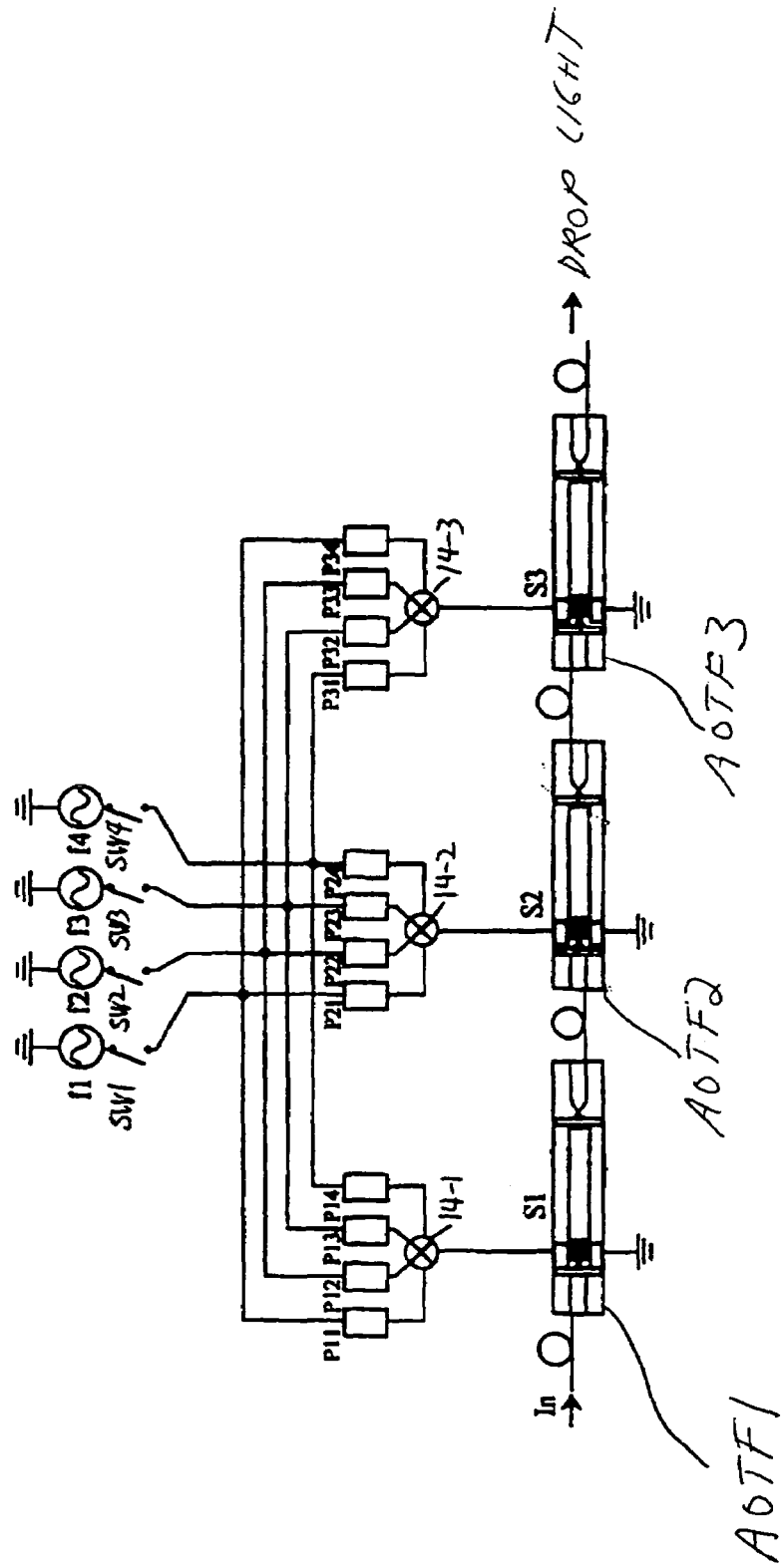
FIG. 49 is a diagram illustrating a band-pass filter having a three-stage arrangement, according to an embodiment of the present invention.

FIG. 49 is a diagram illustrating another variation of the configuration shown in FIG. 33, operating as a band-pass filter, according to an embodiment of the present invention.

Figure 50:
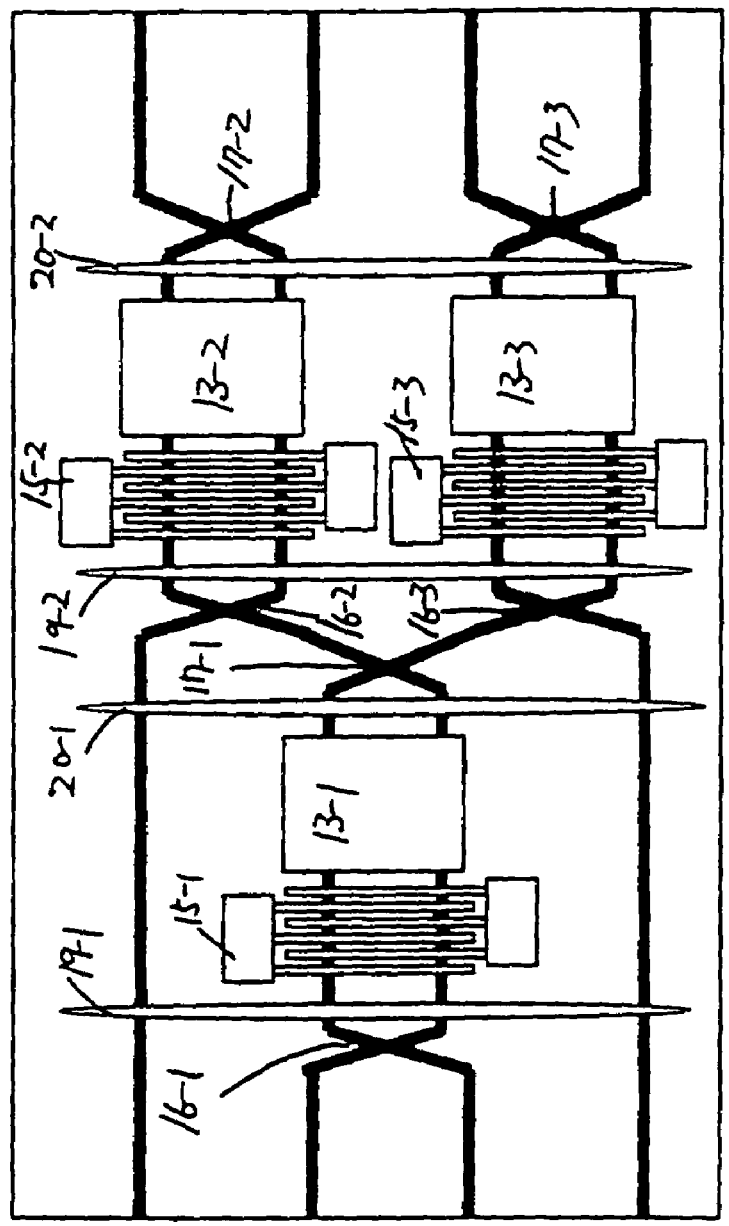
FIG. 50 is a diagram illustrating the configuration shown in FIG. 14 is formed on a single substrate, according to an embodiment of the present invention.

FIG. 50 is a diagram illustrating the configuration shown in FIG. 33 formed on a single substrate, such as, for example, a LiNbO3 substrate, according to an embodiment of the present invention.

Figure 51:
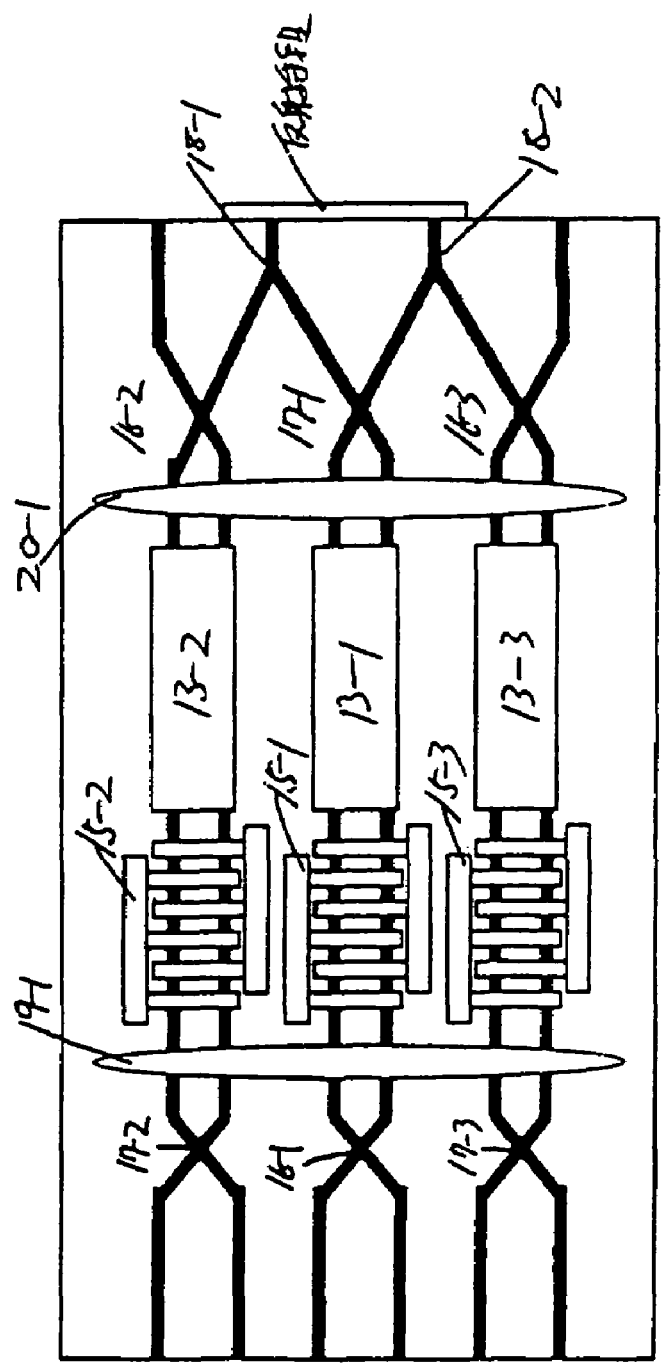
FIG. 51 is an additional diagram illustrating the configuration shown in FIG. 14 formed on a single substrate, according to an embodiment of the present invention.

FIG. 51 is a diagram illustrating a variation of the configuration shown in FIG. 50, directed to down sizing of the device by providing a mirror to an end surface of the substrate in order to return the lights, according to an embodiment of the present invention. Referring now to FIG. 51, a reflection device includes optical waveguide reflectors 18-1 and 18-2 and is provided to prevent lights from being returned to first AOTF 1.

FIGS. 52(A), 52(B), 52(C) and 52(D) are diagrams illustrating a configuration of a waveguide type reflector and a configuration of the ordinary waveguide type PBS, according to an embodiment of the present invention.

Figures 52A, 52B, 52C, 52D:
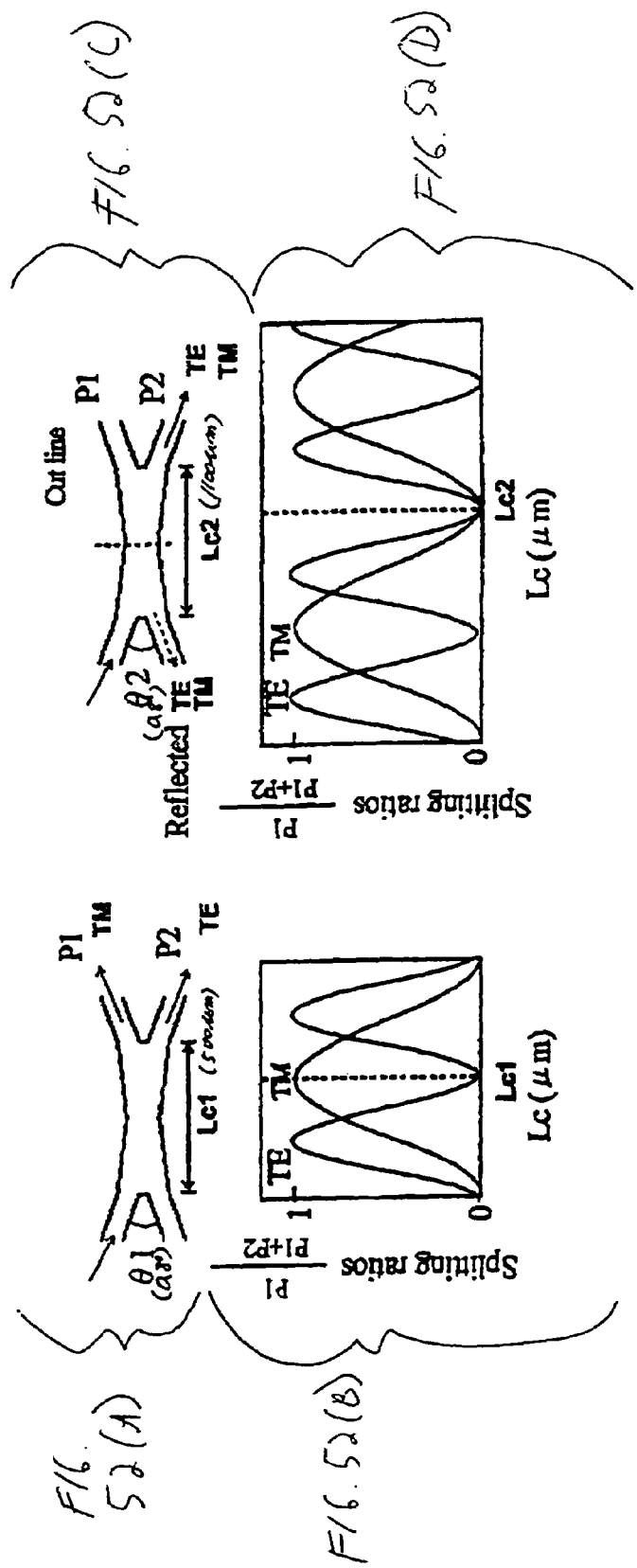
FIGS. 52(A), 52(B), 52(C) and 52(D) are diagrams illustrating a reflection waveguide, according to an embodiment of the present invention.

More specifically, FIG. 52(A) shows the configuration of the waveguide type PBS. When the length of a crossing path where the optical waveguides cross at an opening angle $\theta 1$ is changed, a polarization characteristic as shown in FIG. 52(B) is obtained. Hence, in order to form the PBS, the length of the crossing path may be set to a length Lc1 in which the maximum splitting ratio of the TE mode and minimum splitting ratio of the TM mode are available.

The above concept as applied to a waveguide reflector shown in FIG. 52(C). When the length of a crossing path where the optical waveguides cross at an opening angle $\theta 2$ is changed, a polarization characteristic as shown in FIG. 52(D) is obtained. Hence, in order to guide the light to only the waveguide P2, the length of the crossing path may be set to a length Lc2 in which the both the modes are coupled to the identical waveguide P2. It is thus possible to prevent the reflected light from returning to the waveguide to which the above light enters by cutting the waveguide at the position equal to half the length Lc2 and providing a reflecting device such as a reflection film to the end surface of the waveguide obtained by cutting.

When the opening angles $\theta 1$ and $\theta 2$ are approximately 0.8°, the length Lc1 is approximately 400 μm and the length Lc2 is approximately 1100 μm. As the opening angles $\theta 1$ and $\theta 2$ become greater, the lengths Lc1 and Lc2 tend to become longer.

Figure 53:
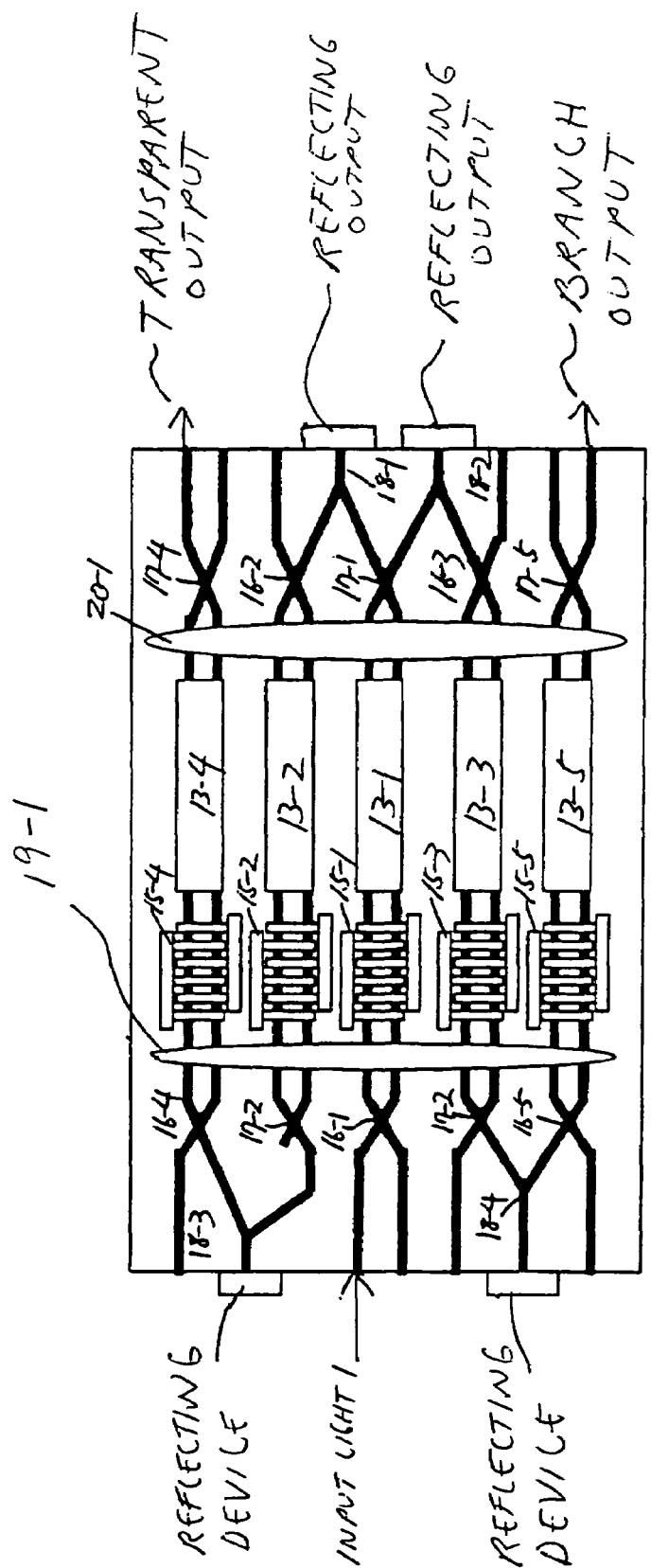
FIG. 53 is a diagram illustrating the configuration shown in FIG. 33 is formed on a single substrate, according to an embodiment of the present invention.

FIG. 53 is a diagram illustrating a configuration directed to realizing the configuration shown in FIG. 33 by using the waveguide type reflector shown, for example, in FIGS. 52(C) and 52(D), according to an embodiment of the present invention.

Figure 54:
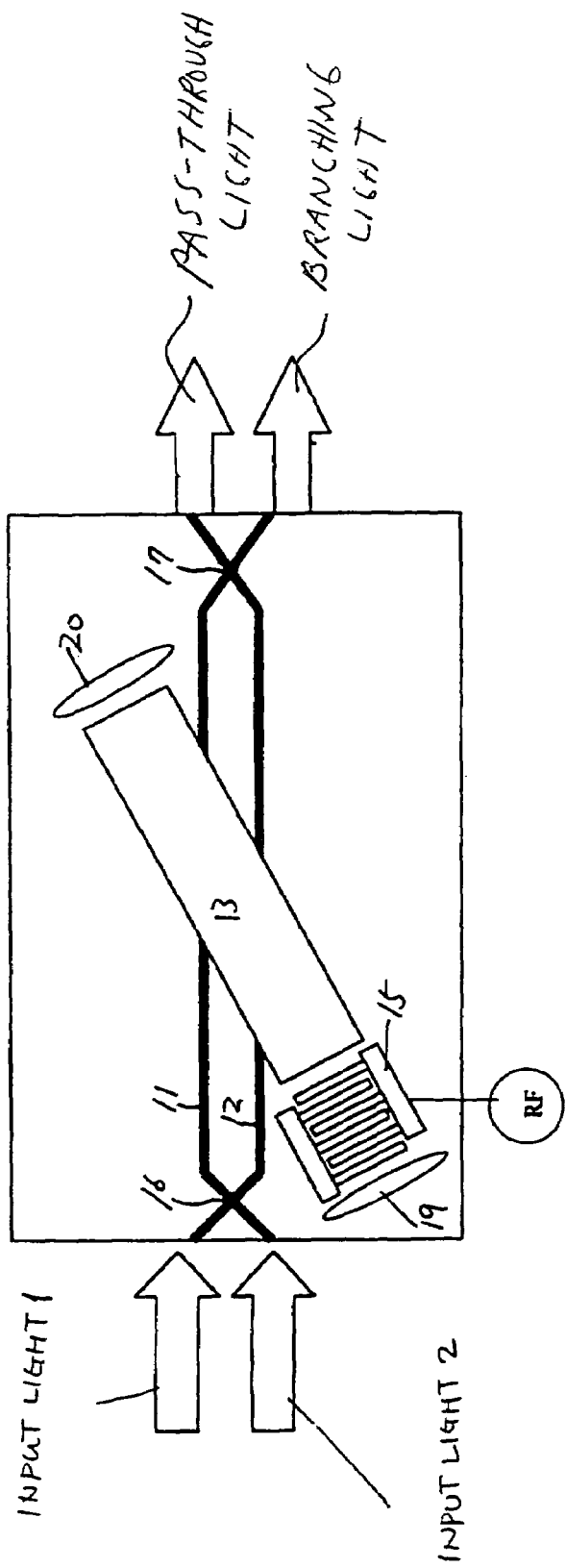
FIG. 54 is a diagram of an AOTF having a SAW containing layer, according to an embodiment of the present invention.
Figure 55:
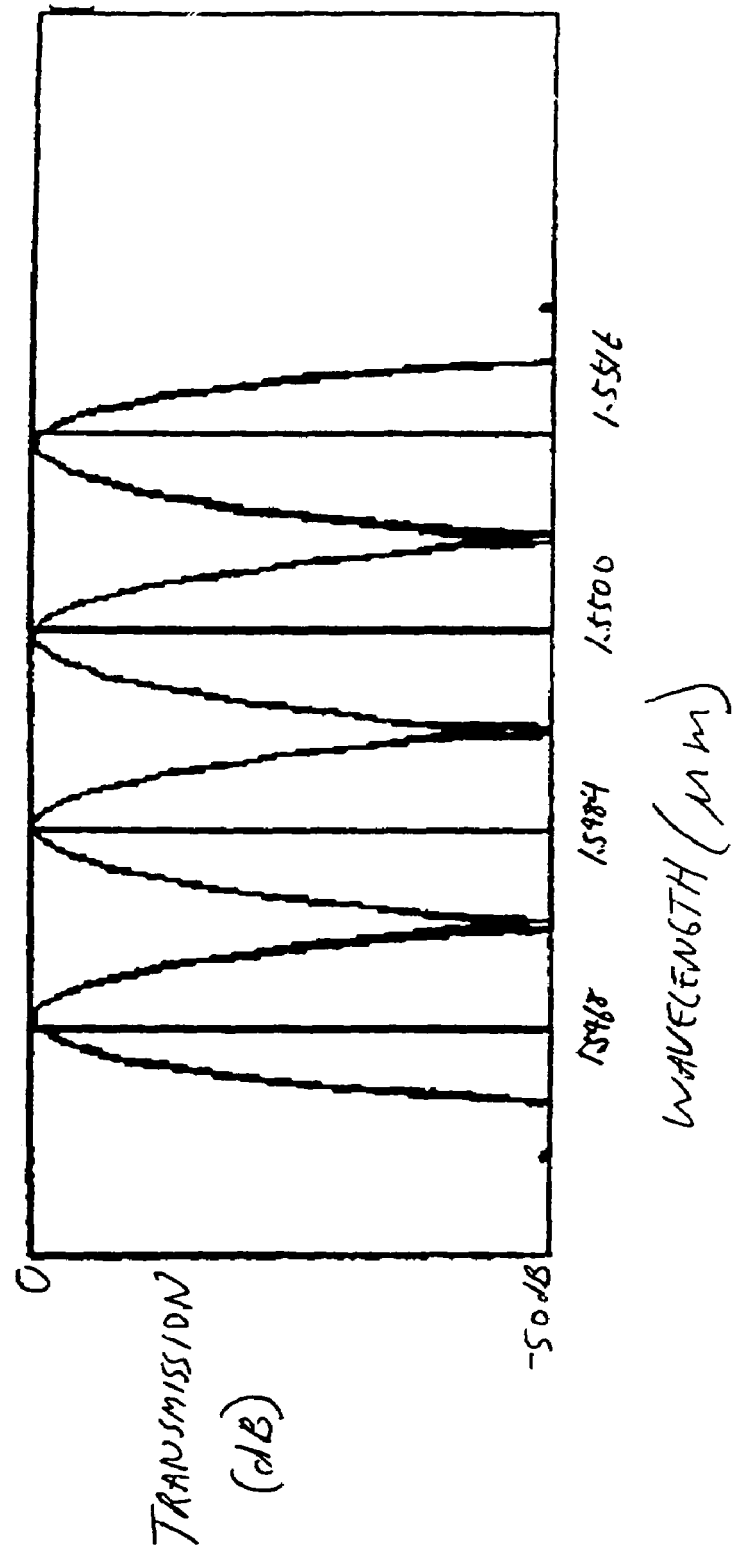
FIG. 55 is a graph illustrating a characteristic of a four-wavelength band-pass filter by using the configuration shown in FIG. 33 to which the AOTF shown in FIG. 54 is applied, according to an embodiment of the present invention.
Figure 56:
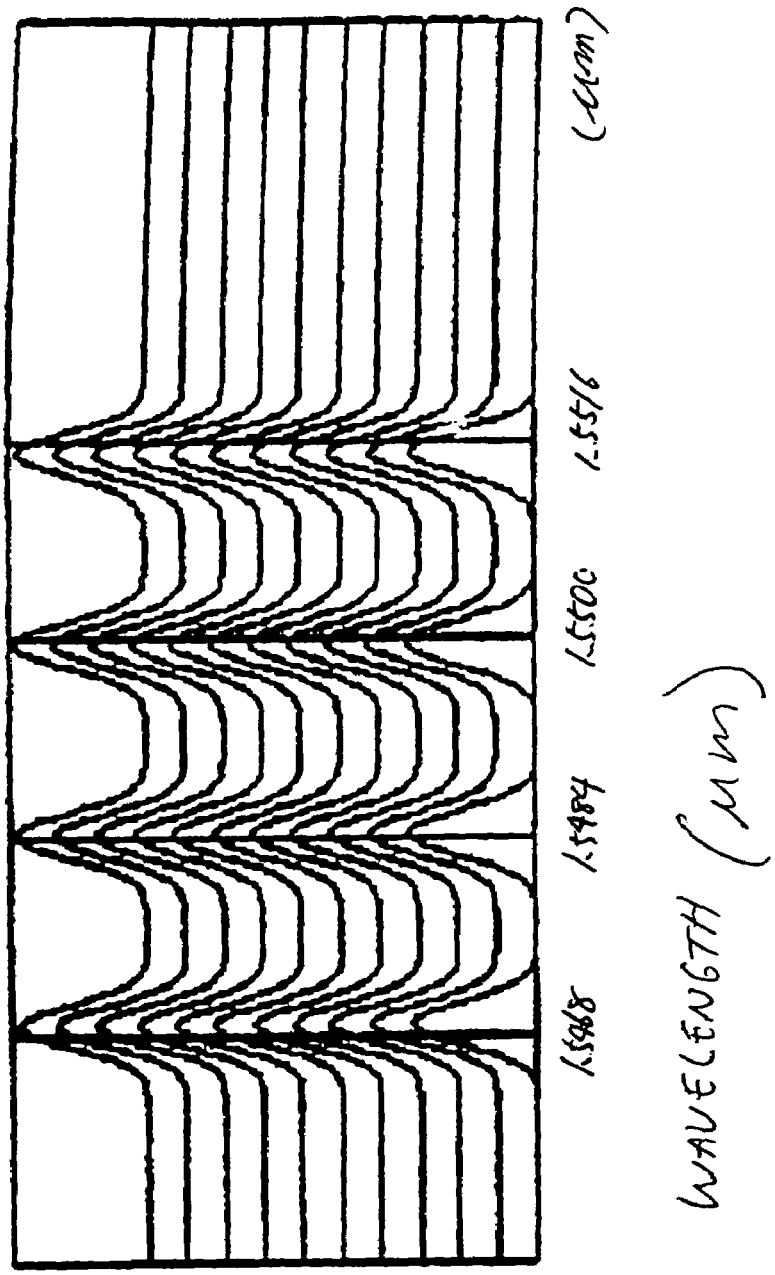
FIG. 56 is a graph illustrating a characteristic of a four-wavelength band-pass filter by using the configuration shown in FIG. 33 to which the AOTF shown in FIG. 54 is applied, according to an embodiment of the present invention.
Figure 57:
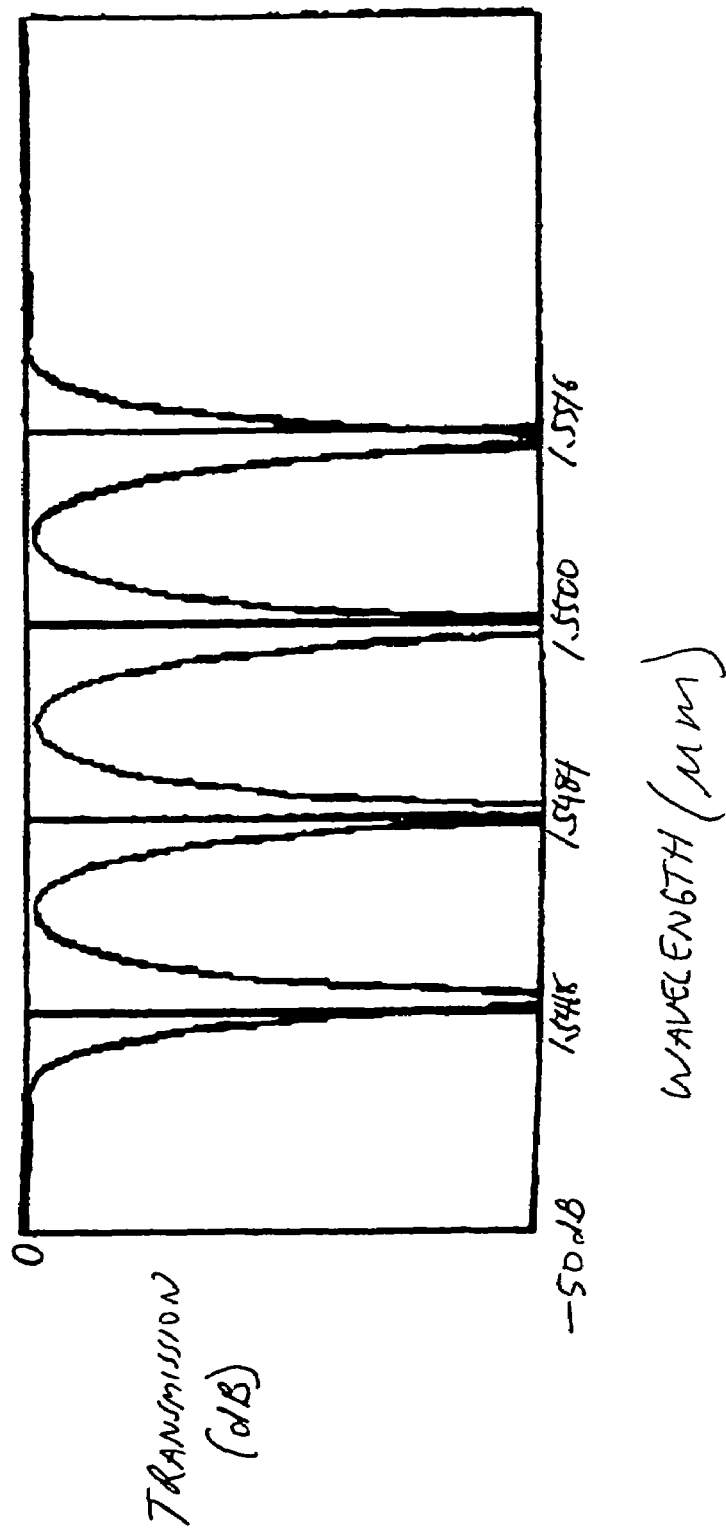
FIG. 57 is a graph illustrating a characteristic of a four-wavelength band-rejection filter by using the configuration shown in FIG. 33 to which the AOTF shown in FIG. 54 is applied, according to an embodiment of the present invention.
Figure 58:
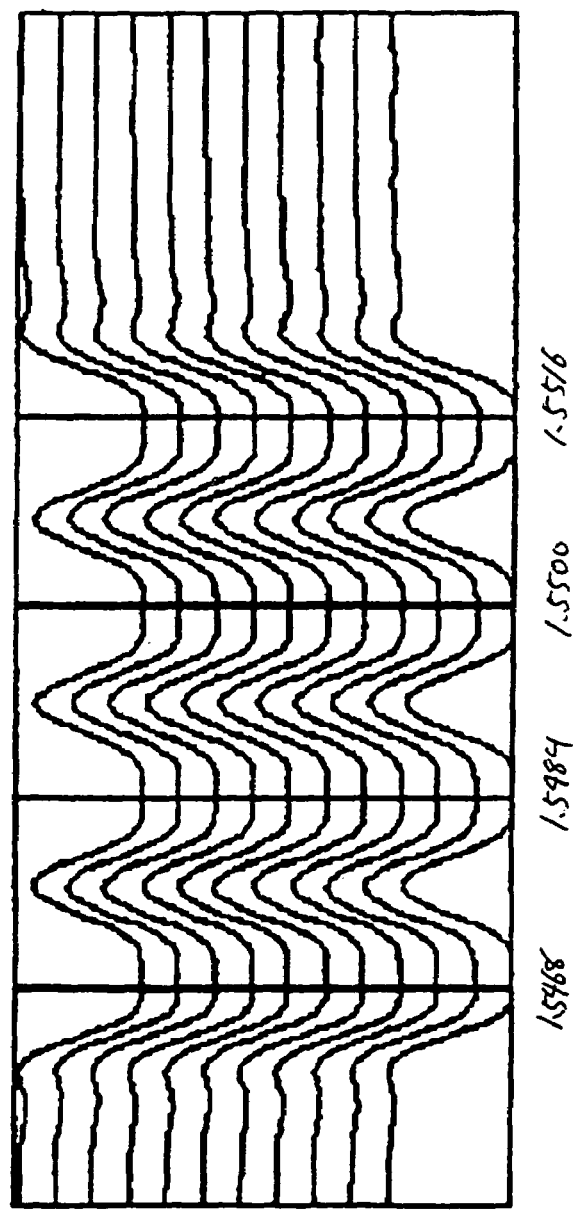
FIG. 58 is a graph illustrating a characteristic of a four-wavelength band-rejection filter by using the configuration shown in FIG. 33 to which the AOTF shown in FIG. 54 is applied, according to an embodiment of the present invention.

FIG. 54 is a diagram of an AOTF having a SAW containing layer, according to an embodiment of the present invention.

FIGS. 55 through 58 are graphs illustrating characteristics obtained by a modification of the configuration shown in FIG. 33 in which an AOTF is used such that a layer for containing the SAW is obliquely provided with respect to the waveguides, as shown in FIG. 54, according to an embodiment of the present invention.

As compared to the characteristics shown in FIGS. 43 through 46, it can be seen that side lobes are not substantially observed in the characteristics shown in FIGS. 55 through 58.

It is possible to reduce side lobes by applying the AOTF shown in FIG. 54 to the first through fifth AOTFs used in FIGS. 14, 23, 31, 32, 48, 49, 50, 51 and 53.

As described above, by cascading AOTFs and shifting the phases of the beat components caused by the RF signals commonly applied to the AOTFs, the positions in which the light is most greatly attenuated are different, in the respective AOTFs, from each other on the time basis. Hence, it is possible to reduce variations in the central frequencies in the band-pass/band-rejection operations in the AOTFs. If the power of the input light is constant, it is possible to reduce variations in the power of light caused in the band-pass/band-rejection operations of the AOTFs.

Figure 59:
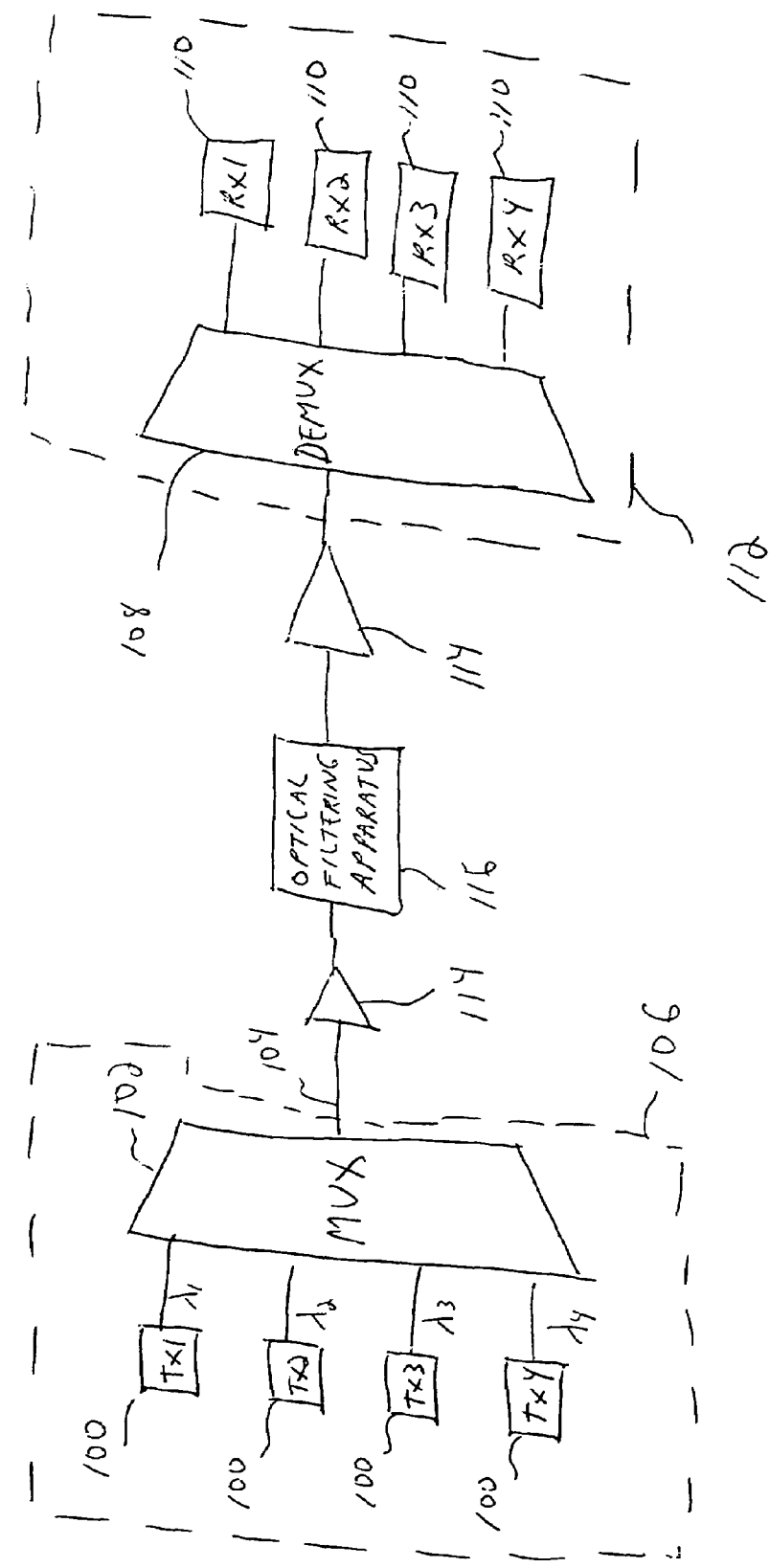
FIG. 59 is a diagram illustrating an optical communication system employing a band-pass/band-rejection filter according to the above embodiments of the present invention.

FIG. 59 is a diagram illustrating a WDM optical communication system employing a band-pass/band-rejection filter according to the above embodiments of the present invention. Referring now to FIG. 59, a plurality of individual transmitters (TX) 100 transmit optical signals at different wavelengths. The optical signals are then multiplexed together by a multiplexer (MUX) 102 into a WDM signal which is transmitted through an optical fiber transmission line 104. Thus, individual transmitters 100 and multiplexer 102 together form a transmitter 106 transmitting a WDM signal through transmission line 104. A demultiplexer (DEMUX) 108 demultiplexes the WDM signal into individual optical signals received by respective receivers (RX) 110. Thus, demultiplexer 108 and receivers 110 together from a receiver 112 receiving the transmitted WDM signal through transmission line 104. Typically, optical amplifiers, such as optical amplifier 114, would be positioned along transmission line 104.

An optical filtering apparatus 116 filters the WDM signal as the WDM signal travels through transmission line 104. Optical filtering apparatus 116 can have any of the cascaded optical filter arrangements shown herein. For example, optical filtering apparatus 116 can have a configuration as illustrated, for example, in FIG. 14 or 33. Thus, optical filtering apparatus 116 can be used, for example, as part of an ADM node which adds/drops wavelengths from the WDM signal propagating through transmission line 104.

In FIG. 59, optical filtering apparatus 116 is positioned between transmitter 106 and receiver 112. However, optical filtering apparatus 116 is not intended to be limited to this positioned, and can be located in various other positions depending on the intended use of optical filtering apparatus 116.

Moreover, FIG. 59 illustrates examples of transmitters and receivers. However, the present invention is not intended to be limited to these examples. Instead, there are many different configurations of transmitters and receivers.

According to the above embodiments of the present invention, a plurality of AOTFs are cascaded, each generating a surface acoustic wave in an optical waveguide by applying an RF signal to an electrode provided on a substrate and selectively outputting a light having a wavelength corresponding to the RF signal. Each of the plurality of AOTFs is supplied with respective RF signals. A phase of a beat generated by the RF signals applied to one of the AOTFs is different from that of a beat generated by the RF signals applied to another one of the AOTFs. As indicated above, according to various embodiments of the present invention, a phase difference between RF signals applied to the AOTFs is equal to a value obtained by dividing 360° by the number of stages of the AOTFs. Thus, the difference in phase of the beats generated by the RF signals applied to first and second cascaded AOTFs in first and second stages, respectively, is equal to a value obtained by dividing 180° by the number of stages of cascaded AOTFs. Therefore, in accordance with the above embodiments of the present invention, the phase difference depends on the number of stages of AOTFs, not on the number of wavelengths, or channels, in a WDM signal.

According to the above embodiments of the present invention, all of the AOTFs cascaded together can be formed on a single substrate. Typically, such a substrate would be, for example, a LiNbO3 substrate. However, the present invention is not intended to be limited to this substrate material, and other substrate materials can be used in accordance with semiconductor design principles.

Moreover, according to the above embodiments of the present invention, if the AOTFs are formed on a substrate, a reflection device can be provided on an end surface of the substrate, for reflecting the lights resulting from the bandpass and band-rejection operations of the first AOTF so that reflected lights can be applied to subsequent AOTFs, such as to second and third AOTFs. A distance from the reflection device to an output waveguide of the first AOTF and another distance from a position in which the second and third AOTFs are coupled to the reflection device can be set equal to a distance in which reflected lights are not coupled with the first AOTF.

According to various of the above embodiments of the present invention, the AOTFs weight surface acoustic waves applied to waveguides.

According to the present invention, AOTFs are connected in a multiple-stage formation and the phases of the beat components generated by the RF signals applied commonly to the AOTFs are different. Hence, the AOTFs are caused to have different times when the light is most greatly attenuated. It is thus possible to reduce variations in the central frequencies in the band-pass/band-rejection operation of the AOTFs. When the input light has a constant power, variations in the power of the light after the band-pass/band-rejection operation can be reduced.

Generally, the present invention is applicable to optical filters having filtering characteristics which are controlled by RF signals applied thereto. For example, the present invention is applicable to mode conversion type AOTFs which convert TM to TE, and convert TE to TM. Thus, the present invention is also applicable to fiber type AOTFs.

The above-embodiments of the present invention relate to the "beat" generated by an RF signal applied to an optical filter. Generally, a "beat" refers to a variation in the intensity of a composite wave which is formed from two distinct waves with different frequencies. Generally, for example, in an AOTF, the beat is a variation in the envelope of the amplitude versus position characteristics of a surface acoustic wave (SAW). The concept of "beat" in an optical filter, such as an AOTF, is well-known.

Various of the above embodiments of the present invention describe specific RF frequencies for RF signals applied to an optical filter, and describe specific frequencies of selected wavelengths. However, the present invention in not intended to be limited to any specific frequencies for the RF signals, or to any specific frequencies for the selected wavelengths.

Further, various of the above embodiments of the present invention describe specific examples of phase shift amounts for RF signals applied to different stages of an AOTF configuration. However, the present is not intended to be limited to these examples of phase shift amounts.

Although a few preferred embodiments of the present invention have been shown and described, it would be appreciated by those skilled in the art that changes may be made in these embodiments without departing form the principles and spirit of the invention, the scope of which is defined in the claims and their equivalents.

What is claimed is:

1. An apparatus comprising:
  first and second optical filters cascaded together so that the second optical filter filters light output from the first optical filter, the first and second optical filters having filtering characteristics controlled in accordance RF signals applied thereto, wherein a phase of a beat generated by the RF signals applied to the first optical filter is different than a phase of a beat generated by the RF signals applied to the second optical filter.

2. An apparatus as in claim 1, wherein the difference in phase of the beats generated by the RF signals applied to the first and second optical filters is equal to a value obtained by dividing 180° by the number of stages of cascaded optical filters.

3. An apparatus as in claim 1, wherein the first and second optical filters are acousto-optical tunable filters.

4. An apparatus comprising:
  first and second acousto-optical tunable filters (AOTF) cascaded together so that the second AOTF filters light output from the first AOTF, the first and second AOTFs having filtering characteristics controlled in accordance with RF signals applied thereto, wherein a phase of a beat generated by the RF signals applied to the first AOTF is different than a phase of a beat generated by the RF signals applied to the second AOTF.

5. An apparatus as in claim 4, wherein the difference in phase of the beats generated by the RF signals applied to the first and second AOTFs is equal to a value obtained by dividing 180° by the number of stages of cascaded AOTFs.

6. An apparatus comprising:
  a first optical filter selectively outputting a light having a wavelength corresponding to an RF signal controlling the first optical filter; and a second optical filter receiving the light output from the first optical filter and selectively outputting a light having a wavelength corresponding to an RF signal controlling the second optical filter, wherein a phase of a beat generated by the RF signal controlling the first optical filter is different than a phase of a beat generated by the RF signal controlling the second optical filter.

7. An apparatus as in claim 6, wherein the first and second optical filters are acousto-optical tunable filters.

8. An apparatus comprising:
a first optical filter receiving an input light including a plurality of wavelengths and filtering the input light to output a light having a respective wavelength of the plurality of wavelengths and selected in accordance with an RF signal controlling the first optical filter; and
a second optical filter filtering the light output from the first optical filter to output a light having a wavelength selected in accordance with an RF signal controlling the second optical filter, wherein a phase of a beat generated by the RF signal controlling the first optical filter is different than a phase of a beat generated by the RF signal controlling the second optical filter.

9. An apparatus as in claim 8, wherein the first and second optical filters are acousto-optical tunable filters.

10. An apparatus comprising:
a first optical filter filtering an input light including a plurality of wavelengths to output first and second output lights, the first output light excluding a wavelength of the plurality of wavelengths selected in accordance with RF signals applied to the first optical filter for controlling filtering characteristics of the first optical filter, and the second output light including said selected wavelength;
a second optical filter filtering the first output light in accordance with RF signals applied to the second optical filter for controlling filtering characteristics of the second optical filter; and
a third optical filter filtering the second output light in accordance with RF signals applied to the third optical filter for controlling filtering characteristics of the third optical filter, wherein a phase of a beat generated by the RF signals applied to the first optical filter is different than a phase of a beat generated by the RF signals applied to the second optical filter and a phase of a beat generated by the RF signals applied to the third optical filter.

11. An apparatus as in claim 10, wherein the beats generated by the RF signals applied to the second and third optical filters have the same phase.

12. An apparatus as in claim 10, wherein the second optical filter filters the first output light with filtering characteristics which reject said selected wavelength, in accordance with the RF signals applied to the second optical filter.

13. An apparatus as in claim 12, wherein the third optical filter filters the second output light with filtering characteristics which pass said selected wavelength, in accordance with the RF signals applied to the third optical filter.

14. An apparatus as in claim 10, wherein the third optical filter filters the second output light with filtering characteristics which pass said selected wavelength, in accordance with the RF signals applied to the third optical filter.

15. An apparatus as in claim 10, wherein
the first output light from the first optical filter excludes at least two wavelengths of the plurality of wavelengths and which are selected in accordance with the RF signals applied to the first optical filter, and the second output light from the first optical filter includes said selected at least two wavelengths.

16. An apparatus as in claim 10, wherein
the first, second and third optical filters are acousto-optical tunable filters formed on a single substrate,
the substrate has at least one reflecting device thereon, and
the first, second and third optical filters, and the at least one reflecting device, are arranged on the substrate so that
the first output light reflects from the first optical filter to the second optical filter to be filtered by the second optical filter, and
the second output light reflects from the first optical filter to the third optical filter to be filtered by the third optical filter.

17. An apparatus as in claim 16, wherein the first, second and third optical filters, and the at least one reflecting device, are arranged on the substrate relative to each other so that
the first output light reflecting from the first optical filter to the second optical filter does not reflect back to the first optical filter, and
the second output light reflecting from the first optical filter to the third optical filter does not reflect back to the first optical filter.

18. An apparatus comprising:
a first acousto-optical tunable filter (AOTF) filtering an input light including a plurality of wavelengths to output first and second output lights, the first output light excluding a wavelength of the plurality of wavelengths selected in accordance with RF signals applied to the first AOTF for controlling filtering characteristics of the first AOTF, and the second output light including said selected wavelength;
a second AOTF filtering the first output light in accordance with RF signals applied to the second AOTF for controlling filtering characteristics of the second AOTF; and
a third AOTF filtering the second output light in accordance with RF signals applied to the third AOTF for controlling filtering characteristics of the third AOTF, wherein a phase of a beat generated by the RF signals applied to the first AOTF is different from a phase of a beat generated by the RF signals applied to the second AOTF and from a phase of a beat generated by the RF signals applied to the third AOTF.

19. An apparatus as in claim 18, wherein the second AOTF filters the first output light with filtering characteristics which reject said selected wavelength, in accordance with the RF signals applied to the second AOTF.

20. An apparatus as in claim 19, wherein the third AOTF filters the second output light with filtering characteristics which pass said selected wavelength, in accordance with the RF signals applied to the third AOTF.

21. An apparatus as in claim 18, wherein the third AOTF filters the second output light with filtering characteristics which pass said selected wavelength, in accordance with the RF signals applied to the third AOTF.

22. An apparatus as in claim 18, wherein
the first output light from the first AOTF excludes at least two wavelengths of the plurality of wavelengths and which are selected in accordance with the RF signals applied to the first AOTF, and
the second output light from the first AOTF includes said selected at least two wavelengths.

23. An apparatus as in claim 18, wherein
the first, second and third AOTFs are formed on a single substrate, the substrate has at least one reflecting device thereon, and
the first, second and third AOTFs, and the at least one reflecting device, are arranged on the substrate so that
the first output light reflects from the first AOTF to the second AOTF to be filtered by the second AOTF, and
the second output light reflects from the first AOTF to the third AOTF to be filtered by the third AOTF.

24. An apparatus as in claim 23, wherein the first, second and third AOTFs, and the at least one reflecting device, are arranged on the substrate relative to each other so that
the first output light reflecting from the first AOTF to the second AOTF does not reflect back to the first AOTF, and
the second output light reflecting from the first AOTF to the third AOTF does not reflect back to the first AOTF.

25. An apparatus comprising:
a first optical filter filtering an input light including a plurality of wavelengths to output first and second output lights, the first output light excluding a wavelength of the plurality of wavelengths selected in accordance with an RF signal applied to the first optical filter for controlling filtering characteristics of the first optical filter, and the second output light including said selected wavelength;
a second optical filter filtering the first output light in accordance with an RF signal applied to the second optical filter for controlling filtering characteristics of the second optical filter;
a third optical filter filtering the second output light in accordance with an RF signal applied to the third optical filter for controlling filtering characteristics of the third optical filter; and
a phase controller controlling phases of the RF signals applied to the first, second and third optical filters with respect to each other.

26. An apparatus as in claim 25, wherein the phase controller controls the phases so that a phase of a beat generated by the RF signal applied to the first optical filter is different from a phase of a beat generated by the RF signal applied to the second optical filter and from a phase of a beat generated by the RF signal applied to the third optical filter.

27. An apparatus as in claim 26, wherein:
the second optical filter filters the first output light with filtering characteristics which reject said selected wavelength, in accordance with the RF signal applied to the second optical filter,
the third optical filter filters the second output light with filtering characteristics which pass said selected wavelength, in accordance with the RF signal applied to the third optical filter, and
the apparatus further comprises
a fourth optical filter filtering the filtered, first output light from the second optical filter with filtering characteristics which reject said selected wavelength, in accordance with an RF signal applied to the fourth optical filter for controlling filtering characteristics of the fourth optical filter, and
a fifth optical filter filtering the filtered, second output light from the third optical filter with filtering characteristics which pass said selected wavelength, in accordance with an RF signal applied to the fifth optical filter for controlling filtering characteristics of the fifth optical filter.

28. An apparatus as in claim 27, wherein the phase controller controls phases of the RF signals applied to the first, second, third, fourth and fifth optical filters with respect to each other.

29. An apparatus as in claim 26, wherein the phase controller controls the phases of the RF signals applied to the second and third optical filters to be equal.

30. An apparatus as in claim 26, wherein the second optical filter filters the first output light with filtering characteristics which reject said selected wavelength, in accordance with the RF signal applied to the second optical filter.

31. An apparatus as in claim 30, wherein the third optical filter filters the second output light with filtering characteristics which pass said selected wavelength, in accordance with the RF signal applied to the third optical filter.

32. An apparatus as in claim 26, wherein the third optical filter filters the second output light with filtering characteristics which pass said selected wavelength, in accordance with the RF signal applied to the third optical filter.

33. An apparatus as in claim 25, wherein
the first, second and third optical filters are formed on a single substrate,
the substrate has at least one reflecting device thereon, and
the first, second and third optical filters, and the at least one reflecting device, are arranged on the substrate so that
the first output light reflects from the first optical filter to the second optical filter to be filtered by the second optical filter, and
the second output light reflects from the first optical filter to the third optical filter to be filtered by the third optical filter.

34. An apparatus as in claim 33, wherein the first, second and third optical filters, and the at least one reflecting device, are arranged on the substrate relative to each other so that
the first output light reflecting from the first optical filter to the second optical filter does not reflect back to the first optical filter, and
the second output light reflecting from the first optical filter to the third optical filter does not reflect back to the first optical filter.

35. An apparatus comprising:
first and second optical filters cascaded together so that the second optical filter filters light output from the first optical filter, the first and second optical filters having filtering characteristics controlled in accordance with first and second RF signals, respectively, wherein the first RF signal has a different phase than the second RF signal.

36. An apparatus as in claim 35, wherein a phase of a beat generated by the first RF signal is different than a phase of a beat generated by the second RF signal.

37. An apparatus as in claim 36, wherein the difference in phase of the beats generated by the first and second RF signals is equal to a value obtained by dividing 180° by the number of stages of cascaded optical filters.

38. An apparatus as in claim 35, wherein the first and second RF signals are at the same frequency.

39. An apparatus comprising:
first and second acousto-optical tunable filters (AOTF) cascaded together so that the second AOTF filters light output from the first AOTF, the first and second AOTFs having filtering characteristics controlled in accordance with first and second RF signals, respectively, wherein the first RF signal has a different phase than the second RF signal.

40. An apparatus as in claim 39, wherein a phase of a beat generated by the first RF signal is different than a phase of a beat generated by the second RF signal.

41. An apparatus as in claim 40, wherein the difference in phase of the beats generated by the first and second RF signals is equal to a value obtained by dividing 180° by the number of stages of cascaded AOTFs.

42. An apparatus as in claim 39, wherein the first and second RF signals are at the same frequency.

43. An apparatus comprising:
a first optical filter selectively outputting a light having a wavelength corresponding to an RF signal controlling the first optical filter; and
a second optical filter receiving the light output from the first optical filter and selectively outputting a light having a wavelength corresponding to an RF signal controlling the second optical filter, wherein a phase of the RF signal for controlling the first optical filter is different than a phase of the RF signal for controlling the second optical filter.

44. An apparatus as in claim 43, wherein the first and second optical filters are acousto-optical tunable filters.

45. An apparatus as in claim 43, wherein a phase of a beat generated by the RF signal controlling the first optical filter is different than a phase of a beat generated by the RF signal controlling the second optical filter.

46. An apparatus as in claim 43, further comprising:
a phase shifter causing the phase of the RF signal controlling the first optical filter to be different than a phase of the RF signal controlling the second optical filter.

47. An apparatus as in claim 43, wherein the RF signal controlling the first optical filter is at the same frequency as the RF signal controlling the second optical filter.

48. An apparatus comprising:
a first optical filter receiving an input light including a plurality of wavelengths and filtering the input light to output a light having a respective wavelength of the plurality of wavelengths and selected in accordance with an RF signal controlling the first optical filter; and
a second optical filter filtering the light output from the first optical filter to output a light having a wavelength selected in accordance with an RF signal controlling the second optical filter, wherein a phase of the RF signal for controlling the first optical filter is different than a phase of the RF signal for controlling the second optical filter.

49. An apparatus as in claim 48, wherein the first and second optical filters are acousto-optical tunable filters.

50. An apparatus as in claim 48, wherein a phase of a beat generated by the RF signal controlling the first optical filter is different than a phase of a beat generated by the RF signal controlling the second optical filter.

51. An apparatus as in claim 48, further comprising:
a phase shifter causing the phase of the RF signal controlling the first optical filter to be different than a phase of the RF signal controlling the second optical filter.

52. An apparatus as in claim 48, wherein the RF signal controlling the first optical filter is at the same frequency as the RF signal controlling the second optical filter.

53. An apparatus comprising:
a first optical filter filtering an input light including a plurality of wavelengths to output first and second output lights, the first output light excluding a wavelength of the plurality of wavelengths selected in accordance with an RF signal controlling filtering characteristics of the first optical filter, and the second output light including said selected wavelength;
a second optical filter filtering the first output light in accordance with an RF signal controlling filtering characteristics of the second optical filter; and
a third optical filter filtering the second output light in accordance with an RF signal controlling filtering characteristics of the third optical filter, wherein the RF signals controlling filtering characteristics of the second and third optical filters each have a different phase than that of the RF signal controlling filtering characteristics of the first optical filter.

54. An apparatus as in claim 53, wherein the RF signals for controlling filtering characteristics of the second and third optical filters have the same phase.

55. An apparatus as in claim 53, wherein the second optical filter filters the first output light with filtering characteristics which reject said selected wavelength, in accordance with the RF signal controlling the second optical filter.

56. An apparatus as in claim 55, wherein the third optical filter filters the second output light with filtering characteristics which pass said selected wavelength, in accordance with the RF signal controlling the third optical filter.

57. An apparatus as in claim 53, wherein the third optical filter filters the second output light with filtering characteristics which pass said selected wavelength, in accordance with the RF signal controlling the third optical filter.

58. An apparatus as in claim 53, wherein the RF signals controlling the first, second and third optical filters are at the same frequency.

59. An apparatus as in claim 53, wherein the first, second and third optical filters are acousto-optical tunable filters.

60. An apparatus as in claim 53, wherein
the first, second and third optical filters are formed on a single substrate,
the substrate has at least one reflecting device thereon, and
the first, second and third optical filters, and the at least one reflecting device, are arranged on the substrate so that
the first output light reflects from the first optical filter to the second optical filter to be filtered by the second optical filter, and
the second output light reflects from the first optical filter to the third optical filter to be filtered by the third optical filter.

61. An apparatus as in claim 60, wherein the first, second and third optical filters, and the at least one reflecting device, are arranged on the substrate relative to each other so that
the first output light reflecting from the first optical filter to the second optical filter does not reflect back to the first optical filter, and
the second output light reflecting from the first optical filter to the third optical filter does not reflect back to the first optical filter.

62. An apparatus comprising:
a first acousto-optical tunable filter (AOTF) filtering an input light including a plurality of wavelengths to output first and second output lights, the first output light excluding a wavelength of the plurality of wavelengths selected in accordance with an RF signal controlling filtering characteristics of the first AOTF, and the second output light including said selected wavelength;
a second AOTF filtering the first output light in accordance with an RF signal controlling filtering characteristics of the second AOTF; and
a third AOTF filtering the second output light in accordance with an RF signal controlling filtering characteristics of the third AOTF, wherein the RF signals controlling filtering characteristics of the second and third AOTFs each have a different phase than that of the RF signal controlling filtering characteristics of the first AOTF.

63. An apparatus as in claim 62, wherein the RF signals for controlling filtering characteristics of the second and third AOTFs have the same phase.

64. An apparatus as in claim 62, wherein a phase of a beat generated by the RF signals controlling filtering characteristics of the second and third AOTFs is different than a phase of a beat generated by the RF signal controlling filtering characteristics of the first AOTF.

65. An apparatus as in claim 62, wherein the RF signals controlling filtering characteristics of the first, second and third AOTFs are at the same frequency.

66. An apparatus as in claim 62, wherein the second AOTF filters the first output light with filtering characteristics which reject said selected wavelength, in accordance with the RF signal controlling the second AOTF.

67. An apparatus as in claim 66, wherein the third AOTF filters the second output light with filtering characteristics which pass said selected wavelength, in accordance with the RF signal controlling the third AOTF.

68. An apparatus as in claim 62, wherein the third AOTF filters the second output light with filtering characteristics which pass said selected wavelength, in accordance with the RF signal controlling the third AOTF.

69. An apparatus as in claim 62, wherein
the first, second and third AOTFs are formed on a single substrate,
the substrate has at least one reflecting device thereon, and
the first, second and third AOTFs, and the at least one reflecting device, are arranged on the substrate so that
the first output light reflects from the first AOTF to the second AOTF to be filtered by the second AOTF, and
the second output light reflects from the first AOTF to the third AOTF to be filtered by the third AOTF.

70. An apparatus as in claim 69, wherein the first, second and third AOTFs, and the at least one reflecting device, are arranged on the substrate relative to each other so that
the first output light reflecting from the first AOTF to the second AOTF does not reflect back to the first AOTF, and
the second output light reflecting from the first AOTF to the third AOTF does not reflect back to the first AOTF.

71. An apparatus comprising:
a first optical filter filtering an input light including a plurality of wavelengths to output first and second output lights, the first output light excluding a wavelength of the plurality of wavelengths selected in accordance with an RF signal controlling filtering characteristics of the first optical filter, and the second output light including said selected wavelength;
a second optical filter filtering the first output light in accordance with an RF signal controlling filtering characteristics of the second optical filter;
a third optical filter filtering the second output light in accordance with an RF signal controlling filtering characteristics of the third optical filter; and
a phase controller controlling phases of the RF signals controlling filtering characteristics of the first, second and third optical filters with respect to each other.

72. An apparatus as in claim 71, wherein the phase controller controls the phases so that the phases of RF signals controlling filtering characteristics of the first and second optical filters are different than the phase of the RF signal controlling filtering characteristics of the first optical filter.

73. An apparatus as in claim 72, wherein the phase controller controls the phases of the RF signals for controlling filtering characteristics of the second and third optical filters to be equal.

74. An apparatus as in claim 71, wherein the RF signals for controlling filtering characteristics of the first, second and third optical filters are at the same frequency.

75. An apparatus as in claim 71, wherein the second optical filter filters the first output light with filtering characteristics which reject said selected wavelength, in accordance with the RF signal controlling the second optical filter.

76. An apparatus as in claim 75, wherein the third optical filter filters the second output light with filtering characteristics which pass said selected wavelength, in accordance with the RF signal controlling the third optical filter.

77. An apparatus as in claim 71, wherein the third optical filter filters the second output light with filtering characteristics which pass said selected wavelength, in accordance with the RF signal controlling the third optical filter.

78. An apparatus comprising:
a first optical filter receiving an input light including a plurality of wavelengths and filtering the input light to output a light having at least two wavelengths of the plurality of wavelengths and selected in accordance with RF signals controlling the first optical filter, the RF signals including at least two RF signals corresponding, respectively, to the selected at least two wavelengths and having frequencies suitable for causing the first optical filter to select the corresponding wavelengths; and
a second optical filter filtering the light output from the first optical filter to output a light having wavelengths selected in accordance with RF signals controlling the second optical filter, the RF signals controlling the second optical filter including at least one RF signal having a frequency which is the same as, but having a phase which is different than, that of an RF signal controlling the first optical filter.

79. An apparatus as in claim 78, wherein the first and second optical filters are acousto-optical tunable filters.

80. An apparatus comprising:
a plurality of acousto-optical tunable filters (AOTF) cascaded together, each AOTF generating a surface acoustic wave in an optical waveguide in accordance with an RF signal applied to the AOTF to selectively output a light having a wavelength corresponding to the RF signal, wherein a phase of a beat generated by the RF signal applied to one of the plurality of AOTFs is different from a phase of a beat generated by the RF signal applied to a different AOTF of the plurality of AOTFs.

81. An apparatus comprising:
a first optical filter filtering an input light including a plurality of wavelengths to output first and second output lights, the first output light excluding a wavelength of the plurality of wavelengths selected in accordance with an RF signal applied to the first optical filter for controlling filtering characteristics of the first optical filter, and the second output light including said selected wavelength;
a second optical filter filtering the first output light with filtering characteristics which reject said selected wavelength in accordance with an RF signal applied to the second optical filter for controlling filtering characteristics of the second optical filter;
a third optical filter filtering the second output light with filtering characteristics which pass said selected wavelength in accordance with an RF signal applied to the third optical filter for controlling filtering characteristics of the third optical filter;

a fourth optical filter filtering the filtered, first output light from the second optical filter with filtering characteristics which reject said selected wavelength in accordance with an RF signal applied to the fourth optical filter for controlling filtering characteristics of the fourth optical filter;

a fifth optical filter filtering the filtered, second output light from the third optical filter with filtering characteristics which pass said selected wavelength in accordance with an RF signal applied to the fifth optical filter for controlling filtering characteristics of the fifth optical filter; and a phase controller controlling phases of the RF signals applied to the first, second, third, fourth and fifth optical filters with respect to each other.

82. An apparatus as in claim 81, wherein the phase controller controls the phases so that the phase of the RF signal applied to the first optical filter is different from the phases of the RF signals applied to the second, third, fourth and fifth optical filters.

83. An apparatus as in claim 82, wherein the phases of the RF signals applied to the second and third optical filters are equal, and the phases of the RF signals applied to the fourth and fifth optical filters are equal.

84. An apparatus as in claim 82, wherein the first, second, third, fourth and fifth optical filters are acousto-optical tunable filters.

85. An apparatus as in claim 81, wherein the first, second, third, fourth and fifth optical filters are acousto-optical tunable filters.

86. A method comprising:

cascading first and second optical filters together so that the second optical filter filters light output from the first optical filter, the first and second optical filters having filtering characteristics controlled in accordance RF signals applied thereto; and causing a phase of the RF signal applied to the first optical filter to be different than a phase of the RF signal applied to the second optical filter.

87. A method as in claim 86, wherein a phase of a beat generated by the RF signal applied to the first optical filter is different than a phase of a beat generated by the RF signal applied to the second optical filter.

88. A method comprising:

cascading first and second optical filters together so that the second optical filter filters light output from the first optical filter, the first and second optical filters having filtering characteristics controlled in accordance RF signals applied thereto; and causing a phase of a beat generated by the RF signals applied to the first optical filter to be different than a phase of a beat generated by the RF signals applied to the second optical filter.

89. An optical communication system comprising:

a transmission line;

a transmitter transmitting a wavelength division multiplexed (WDM) signal including a plurality of channels through the transmission line;

a receiver receiving the transmitted WDM signal through the transmission line; and an optical filtering apparatus filtering the WDM signal as the WDM signal travels through the transmission line from the transmitter to the receiver to selectively filter at least one channel from the WDM signal, the optical filtering apparatus including first and second acousto-optical tunable filters (AOTF) cascaded together so that first AOTF filters the WDM signal and produces a corresponding filtered output light, and the second AOTF filters the filtered output light from the first AOTF, the first and second AOTFs having filtering characteristics controlled in accordance with first and second RF signals, respectively, wherein the first RF signal has a different phase than the second RF signal.

* * * * *

UNITED STATES PATENT AND TRADEMARK OFFICE
CERTIFICATE OF CORRECTION

PATENT NO. : 7,116,907 B1 Page 1 of 1
APPLICATION NO. : 09/248103
DATED : October 3, 2006
INVENTOR(S) : Tadao Nakazawa et al.

It is certified that error appears in the above-identified patent and that said Letters Patent is hereby corrected as shown below:

On the Title Page, Item -56-

(Other Publications), Line 5, change "Dec." to --Dec.,--.

(Other Publications), Line 9, after "May" insert --,--.

(Other Publications), Line 17, change "Jun." to --Jun.,--.

Signed and Sealed this

Twenty-second Day of May, 2007

JON W. DUDAS
*Director of the United States Patent and Trademark Office*